United States Patent
Jha et al.

(10) Patent No.: US 11,665,047 B2
(45) Date of Patent: May 30, 2023

(54) EFFICIENT EVENT-TYPE-BASED LOG/EVENT-MESSAGE PROCESSING IN A DISTRIBUTED LOG-ANALYTICS SYSTEM

(71) Applicant: VMWARE, INC., Palo Alto, CA (US)

(72) Inventors: Ritesh Jha, Bangalore (IN); Nikhil Jaiswal, Bangalore (IN); Jobin Raju George, Bangalore (IN); Pushkar Patil, Bangalore (IN); Vaidic Joshi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 166 days.

(21) Appl. No.: 17/151,706

(22) Filed: Jan. 19, 2021

(65) Prior Publication Data

US 2022/0158889 A1    May 19, 2022

(30) Foreign Application Priority Data

Nov. 18, 2020    (IN) .............................. 202041050278

(51) Int. Cl.
*H04L 41/069* (2022.01)
*G06F 9/54* (2006.01)
*H04L 67/10* (2022.01)
*G06F 16/245* (2019.01)

(52) U.S. Cl.
CPC ............ *H04L 41/069* (2013.01); *G06F 9/542* (2013.01); *G06F 9/546* (2013.01); *G06F 16/245* (2019.01); *H04L 67/10* (2013.01)

(58) Field of Classification Search
CPC ..... H04L 41/069; H04L 67/10; G06F 16/245; G06F 9/542; G06F 9/546
USPC .................................................. 709/223, 224
See application file for complete search history.

(56) References Cited

U.S. PATENT DOCUMENTS

| | | | | |
|---|---|---|---|---|
| 5,390,326 A | * | 2/1995 | Shah | H04L 41/0677 714/717 |
| 6,738,813 B1 | * | 5/2004 | Reichman | H04L 43/00 709/224 |
| 7,788,722 B1 | * | 8/2010 | Njemanze | H04L 63/1408 726/22 |
| 9,049,105 B1 | * | 6/2015 | Feinstein | H04L 41/069 |
| 9,860,208 B1 | * | 1/2018 | Ettema | H04L 63/0227 |
| 11,552,997 B2 | * | 1/2023 | Williams | H04L 9/0891 |
| 2002/0053033 A1 | * | 5/2002 | Cooper | H04L 63/166 709/220 |
| 2002/0069200 A1 | * | 6/2002 | Cooper | H04L 63/0227 707/999.009 |
| 2002/0091942 A1 | * | 7/2002 | Cooper | H04L 41/0609 709/229 |
| 2002/0093527 A1 | * | 7/2002 | Sherlock | H04L 41/069 715/736 |

(Continued)

*Primary Examiner* — Thu Ha T Nguyen

(57) ABSTRACT

The current document is directed to methods and systems that efficiently process log/event messages within and among distributed computer facilities. Various different types of initial processing steps may be applied to a stream of log/event messages received by a message-collector system or a message-ingestion-and-processing system. By including a pre-processing step two identify the type of a received log/event message, and by specifying initial-processing-step criteria with respect to log/event-message types, significant increases in the efficiency of log/event-message preprocessing by message-collector systems and message-ingestion-and-processing systems is achieved.

20 Claims, 48 Drawing Sheets

(56) References Cited

U.S. PATENT DOCUMENTS

| | | | |
|---|---|---|---|
| 2003/0061506 A1* | 3/2003 | Cooper | H04L 41/0893 726/4 |
| 2004/0015579 A1* | 1/2004 | Cooper | H04L 47/10 709/223 |
| 2004/0042470 A1* | 3/2004 | Cooper | H04L 63/1433 370/401 |
| 2007/0143851 A1* | 6/2007 | Nicodemus | H04L 63/1433 726/4 |
| 2008/0155386 A1* | 6/2008 | Jensen | H04L 67/1008 709/224 |
| 2010/0031358 A1* | 2/2010 | Elovici | H04L 43/00 714/48 |
| 2010/0058093 A1* | 3/2010 | Danieli | G06F 1/3209 713/340 |
| 2012/0287773 A1* | 11/2012 | Zang | H04L 69/40 370/216 |
| 2016/0210427 A1* | 7/2016 | Mynhier | G16H 10/60 |
| 2016/0359879 A1* | 12/2016 | Deen | H04L 43/16 |
| 2017/0134247 A1* | 5/2017 | Hoja | H04L 41/0631 |
| 2019/0081968 A1* | 3/2019 | Wang | H04L 63/102 |
| 2019/0116193 A1* | 4/2019 | Wang | G06N 20/00 |
| 2019/0171169 A1* | 6/2019 | Di Pietro | G05B 13/04 |
| 2019/0312903 A1* | 10/2019 | Zini | H04L 61/103 |
| 2019/0349404 A1* | 11/2019 | Jain | H04L 9/3278 |
| 2020/0007585 A1* | 1/2020 | Williams | H04W 12/37 |
| 2020/0177458 A1* | 6/2020 | Rahman | H04L 41/0631 |
| 2021/0182297 A1* | 6/2021 | Seshadri | G06F 16/24568 |
| 2021/0342836 A1* | 11/2021 | Cella | G06Q 30/0201 |
| 2022/0051219 A1* | 2/2022 | Sells | G06Q 20/381 |
| 2022/0350675 A1* | 11/2022 | Navali | G06F 9/45558 |
| 2022/0366494 A1* | 11/2022 | Cella | G06N 20/20 |
| 2022/0368696 A1* | 11/2022 | Karpovsky | H04L 63/0236 |

* cited by examiner

```
2013-12-02T10:44:24.095Z li-qe-esx5.vmware.com Rhttpproxy:
[28959B90 verbose 'Proxy Req 46691'] Connected to
localhost:8307

2013-12-02T10:44:24.094Z li-qe-esx5.vmware.com Rhttpproxy:
[FFFC2B90 verbose 'Proxy Req 46691'] new proxy client
TCP (local=127.0.0.1:80, peer=127.0.0.1:50155)

2013-12-02T10:44:24.093Z li-qe-esx5.vmware.com Rhttpproxy:
[288DB90 verbose 'Proxy Req 46685'] The client closed the
stream, not unexpectedly.

Dec  2 18:48:29 strata-vc 2013-12-02T18:48:30.273Z
[7FA94488700 info 'commonvpxLro' opID=1947d6f9] [VpxLRO] -
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59

2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'

2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)

2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction
```

FIG. 11

| criteria | action | parameters |
|---|---|---|
| includes (msg, "phrase_1") AND NOT includes (msg, "term_1") AND field (msg, field_type_1) == "phrase_2" OR includes (msg, "phrase_1") AND includes (msg, "term_2") | Forward | destinations = {add1, add2, add3, add4} |
| includes (msg, "phrase_3") AND field (msg, field_type_2) == "phrase_4" AND field (msg, field_type_3) > 10 | Sample | 1 : 10 |
| ... | ... | ... |
| field (msg, field_type_2367) == "phrase_3761" AND includes (msg, "term_4617") OR includes (msg, "phrase_3762") AND field (msg, field_type_2367) == "phrase_3763" | Drop | |

FIG. 19

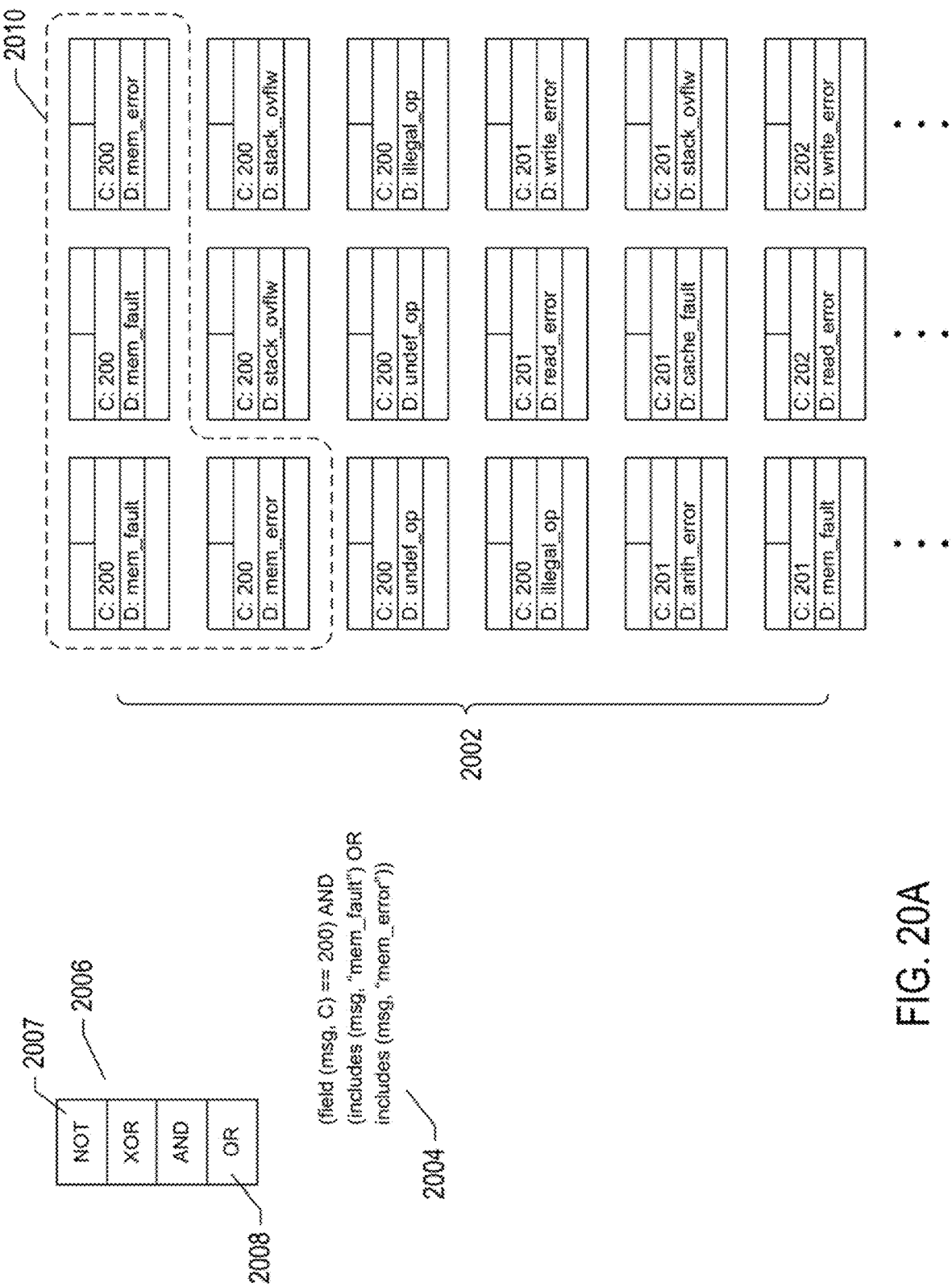

```
2020-07-30T 13:17:39 – 08:00   INFO   [TransApp]   :   T-comp   :   ID-a3651f8
```

⎴ Timestamp    ⎴ Level    ⎴ Application    ⎴ Action    ⎴ Transaction ID

YEAR       (?>\d\d){1,2}
MONTHNUM   (?:0?[1-9]|1[0-2])
MONTHDAY   (?:(?:0[1-9])|(?:[12][0-9])|(?:3[01])|[1-9])
HOUR       (?:2[0123]|[01]?[0-9])
MINUTE     (?:[0-5][0-9])
SECOND     (?:(?:[0-5]?[0-9]|60)(?:[:..][0-9]+)?)
ISO8601_TIMEZONE  (?:Z|[+-]?%{HOUR}(?::?%{MINUTE}))
TIMESTAMP_ISO8601 %{YEAR}-%{MONTHNUM}-%{MONTHDAY}[T]%{HOUR}:?%{MINUTE}(?::?%{SECOND})?%
                  {ISO8601_TIMEZONE}?

2412 —

LOGLEVEL ([Aa]lert|ALERT|[Tt]race|TRACE|[Dd]ebug|DEBUG|[Nn]otice|NOTICE|[Ii]nfo|INFO|[Ww]arn?
         (?:ing)?|WARN?(?:ING)?|[Ee]rr?(?:or)?|ERR?(?:OR)?|[Cc]rit?(?:ical)?|CRIT?(?:ICAL)
         ?|[Ff]atal|FATAL|[Ss]evere|SEVERE|emerg(?:ency)?|EMERG(?:ENCY)?|[Ee]merg(?:ency)?)

DATA .*?

```
grok {
    match=>{"message"=>"%{TIMESTAMP_ISO8601:timestamp}%{LOGLEVEL:log-level}
\[%{DATA:application}\]:%{DATA:action}:%{DATA:transaction-ID}"}
}
```
⎵  
2420

→

```
"transaction-ID"=>"ID-a3651f8",
"action"=>"T-comp",
"application"=>"TransApp",
"level"=>"INFO",
"timestamp"=>"2020-07-30T13:17:39-08:00"
```
⎵  
2424

ID/EVENT-MESSAGE PROCESSING IN A
DISTRIBUTED LOG-ANALYTICS SYSTEM

RELATED APPLICATIONS

Benefit is claimed under 35 U.S.C. 119(a)-(d) to Foreign Application Serial No. 202041050278 filed in India entitled "EFFICIENT EVENT-TYPE-BASED LOG/EVENT-MESSAGE PROCESSING IN A DISTRIBUTED LOG-ANALYTICS SYSTEM", on Nov. 18, 2020, by VMware, Inc., which is herein incorporated in its entirety by reference for all purposes.

TECHNICAL FIELD

The current document is directed to distributed-computer-systems and, in particular, to methods and systems that efficiently process log/event messages generated within distributed computer facilities.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computing systems are seeking new approaches to implementing automated management-and-administration facilities and functionalities.

SUMMARY

The current document is directed to methods and systems that efficiently process log/event messages generated within distributed computer facilities. Various different types of initial processing steps may be applied to a stream of log/event messages received by a message-collector system or a message-ingestion-and-processing system. By including a pre-processing step to identify the type of a received log/event message, and by specifying initial-processing-step-applicability criteria with respect to log/event-message types, significant increases in the efficiency of log/event-message preprocessing by message-collector systems and message-ingestion-and-processing systems is achieved.

BRIEF DESCRIPTION OF THE DRAWINGS

FIG. 11 shows a small, 11-entry portion of a log file from a distributed computer system.

FIG. 19 illustrates processing rules that specify various types of initial log/event-message processing.

FIGS. 20A-B provide a simple example of the types of errors that may be encountered when message-processing rules are manually specified or programmatically generated.

FIGS. 24A-C illustrate one approach to extracting fields from a log/event message.

DETAILED DESCRIPTION

Figure 1:
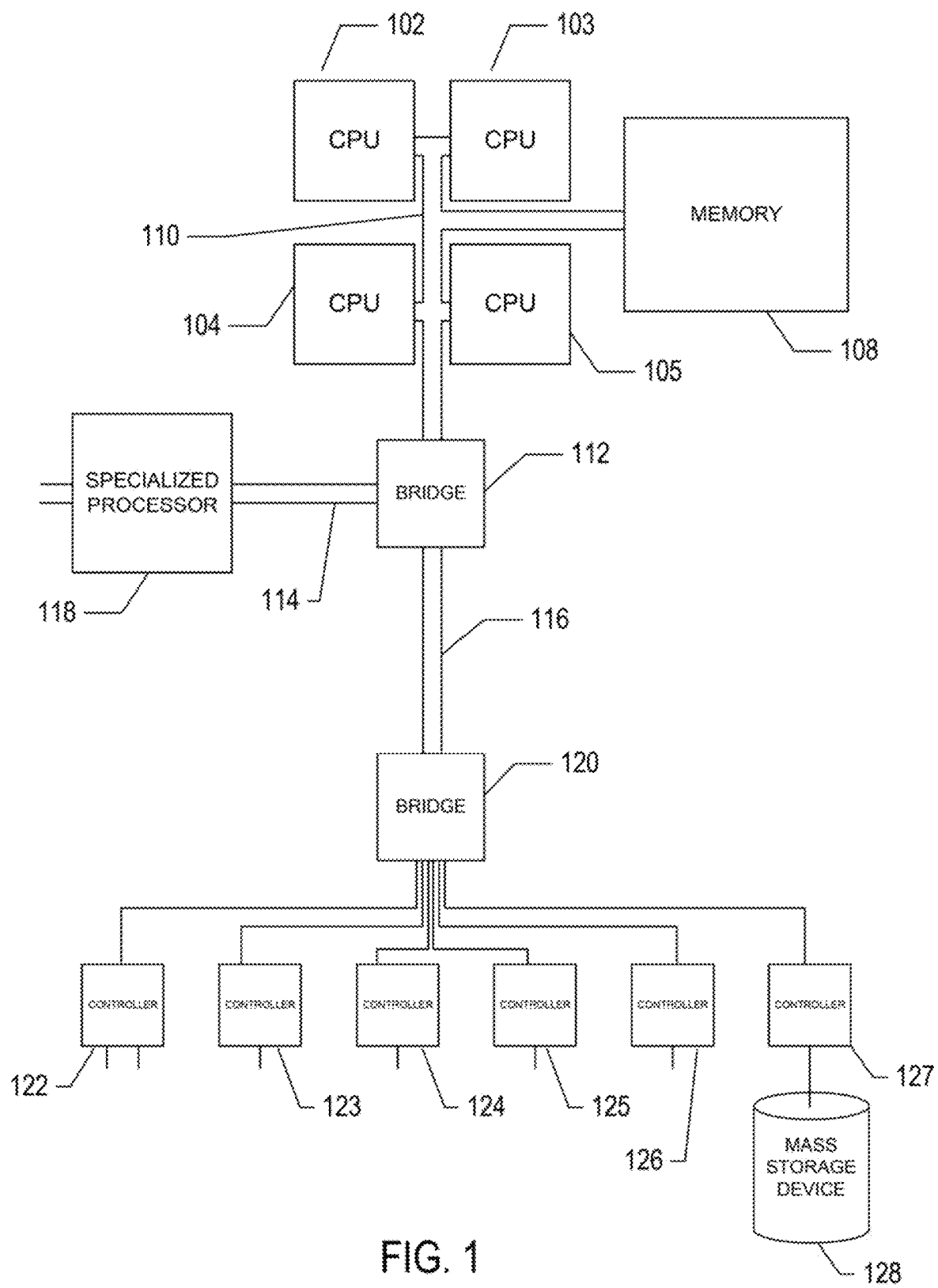
FIG. 1 provides a general architectural diagram for various types of computers.

The current document is directed to methods and systems that that efficiently process log/event messages generated within distributed computer facilities. In a first subsection, below, a detailed description of computer hardware, complex computational systems, and virtualization is provided with reference to FIGS. 1-10. In a second subsection, the currently disclosed methods and systems are discussed with reference to FIGS. 11-29E.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
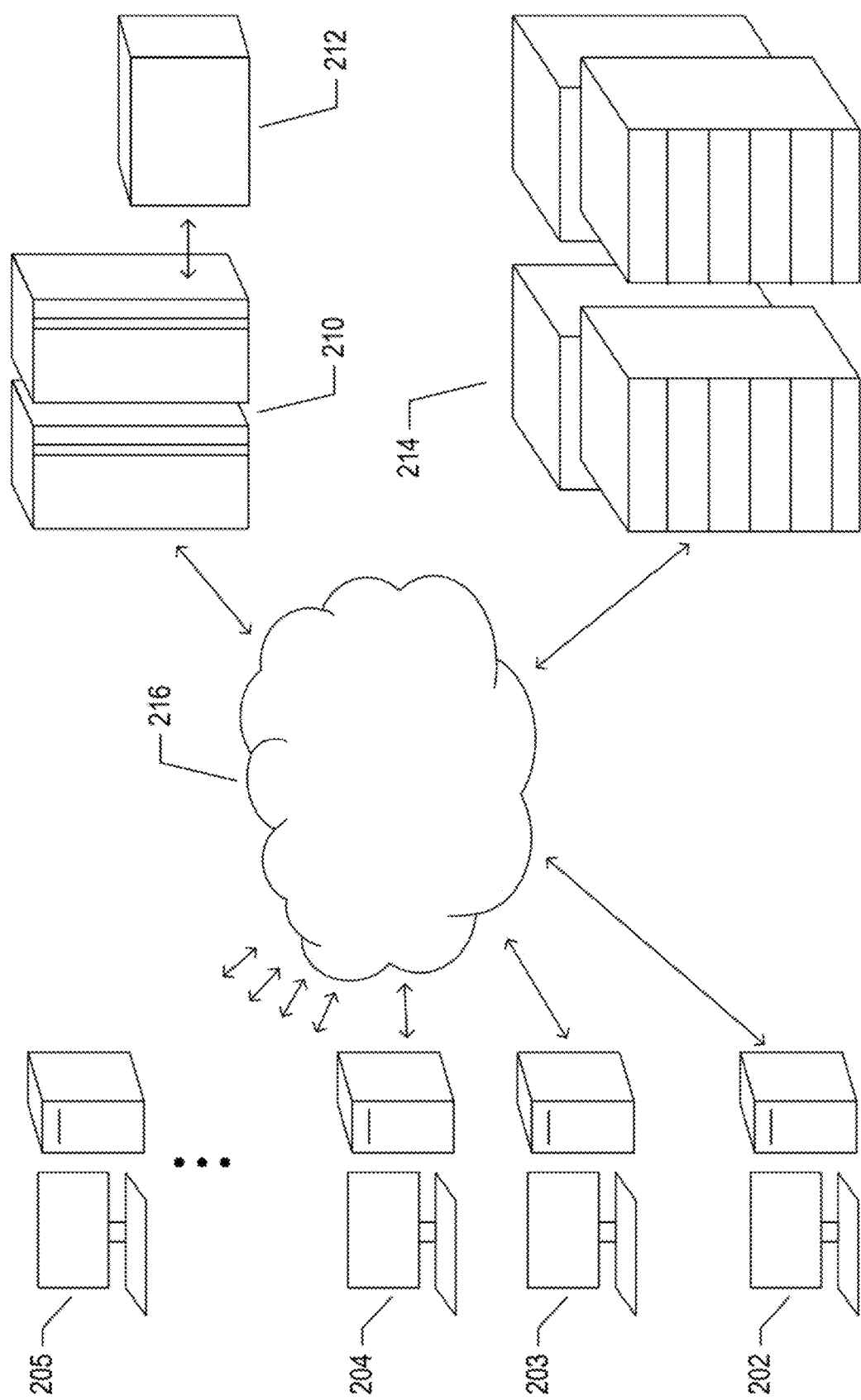
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
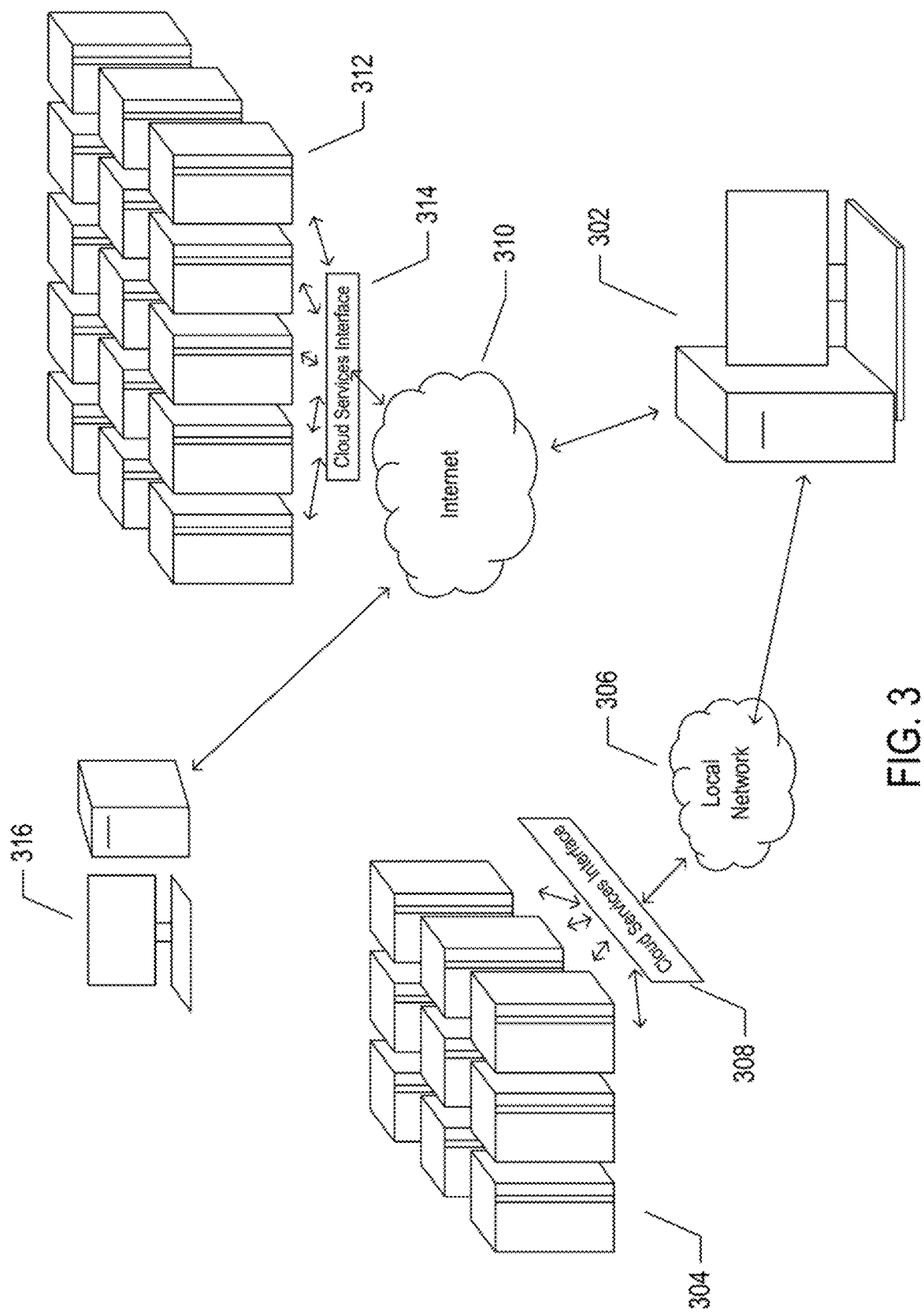
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
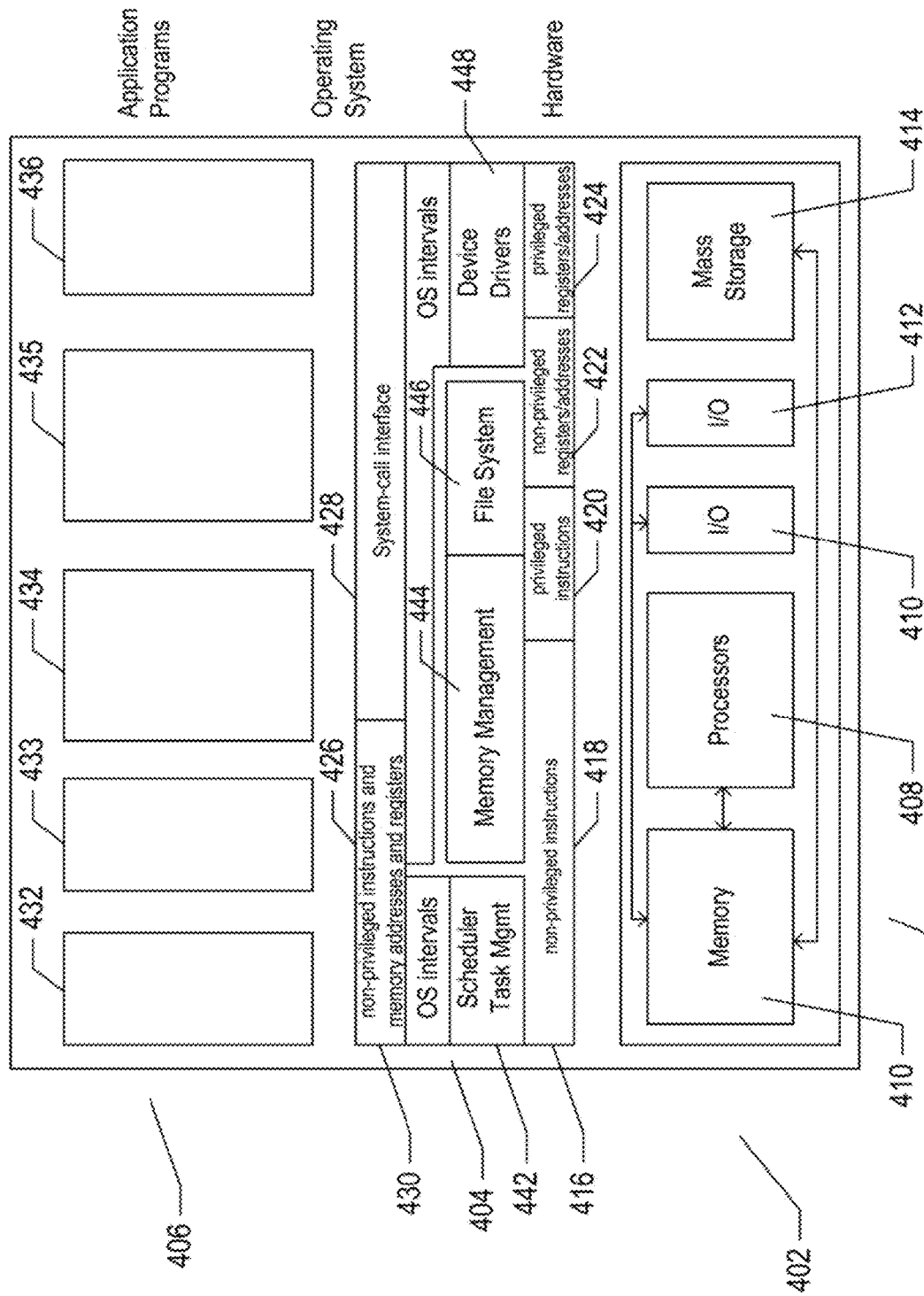
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
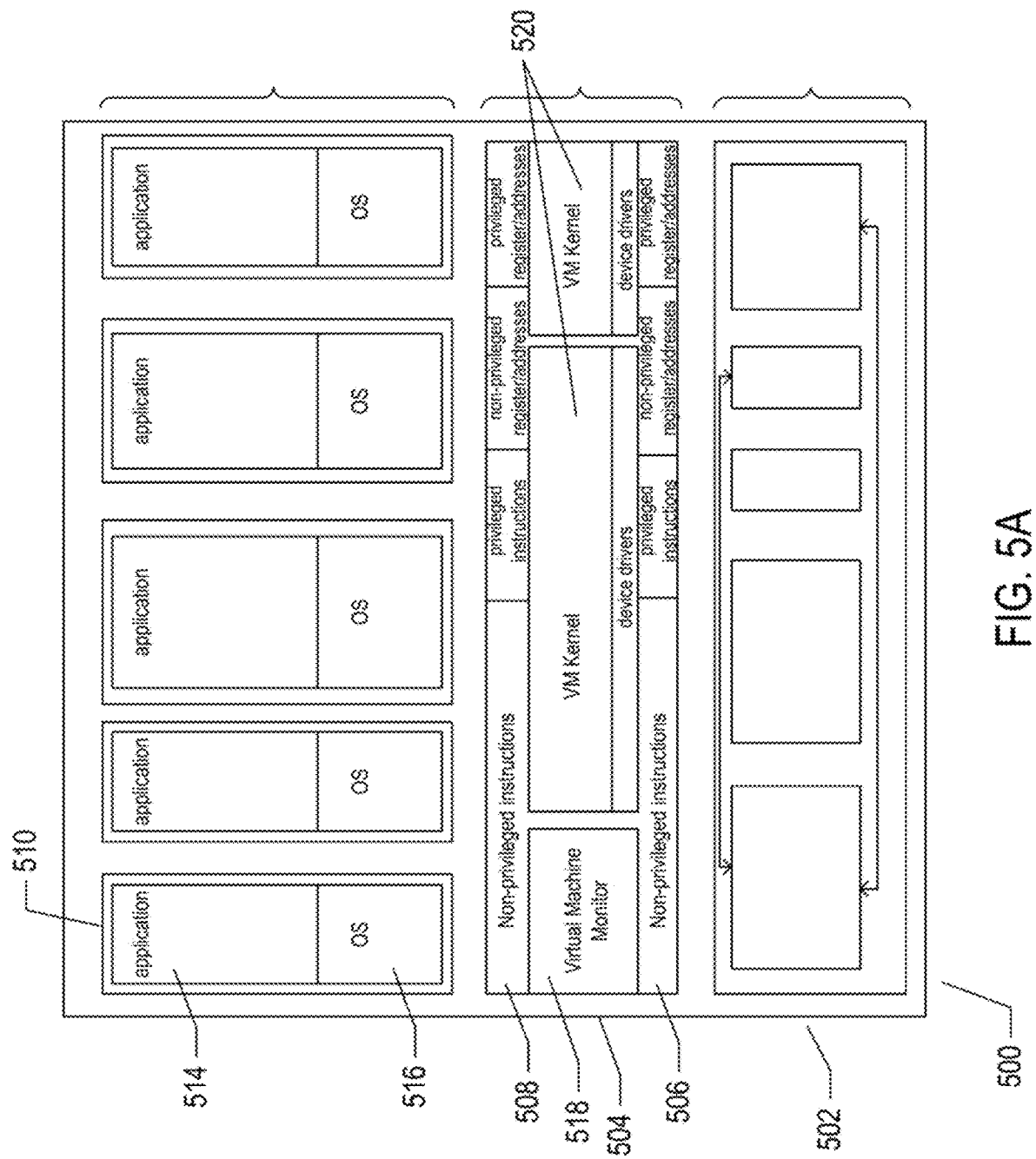
FIGS. 5A-D illustrate two types of virtual machine and virtual-machine execution environments.
Figure 5B:
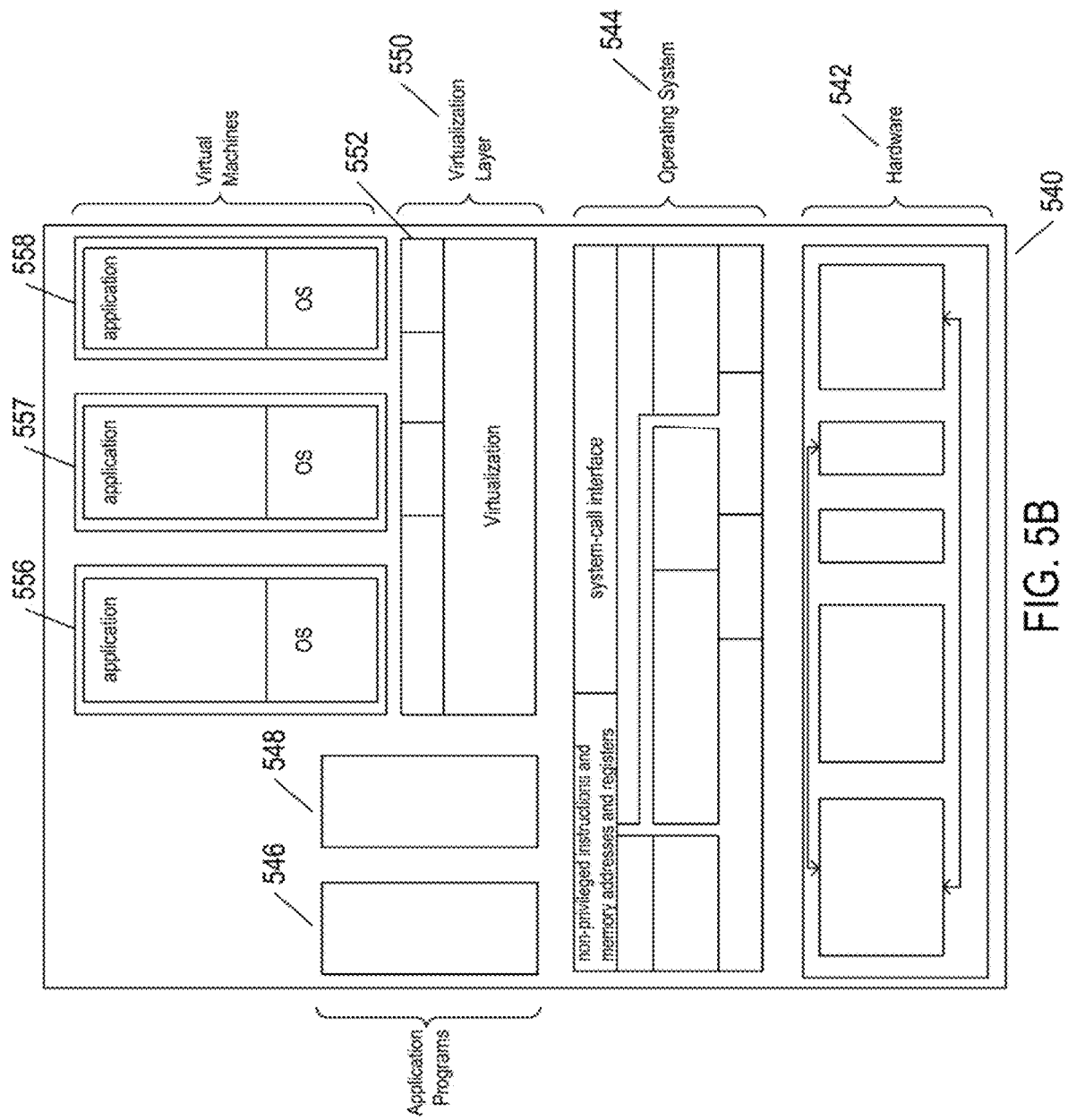

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
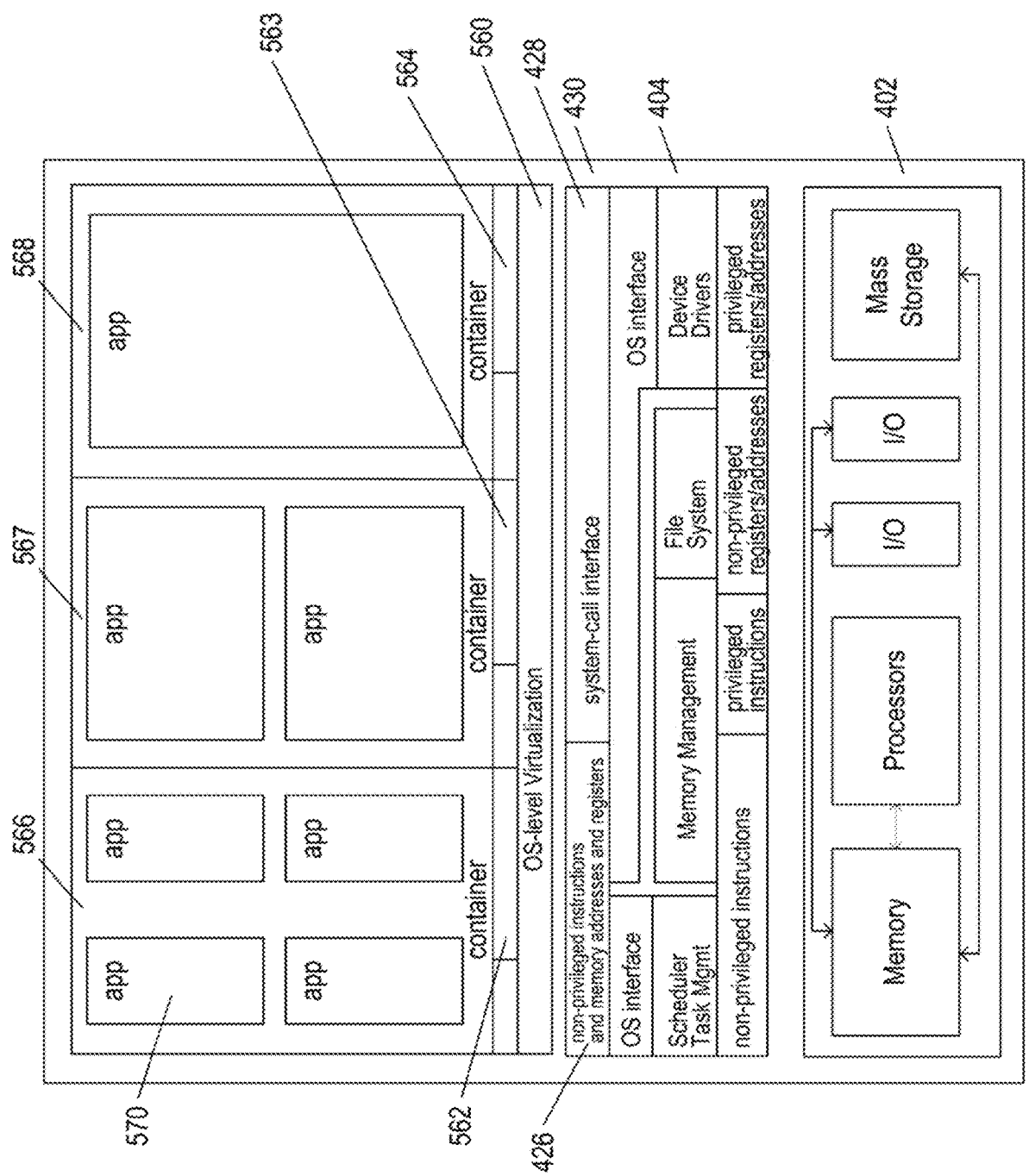

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
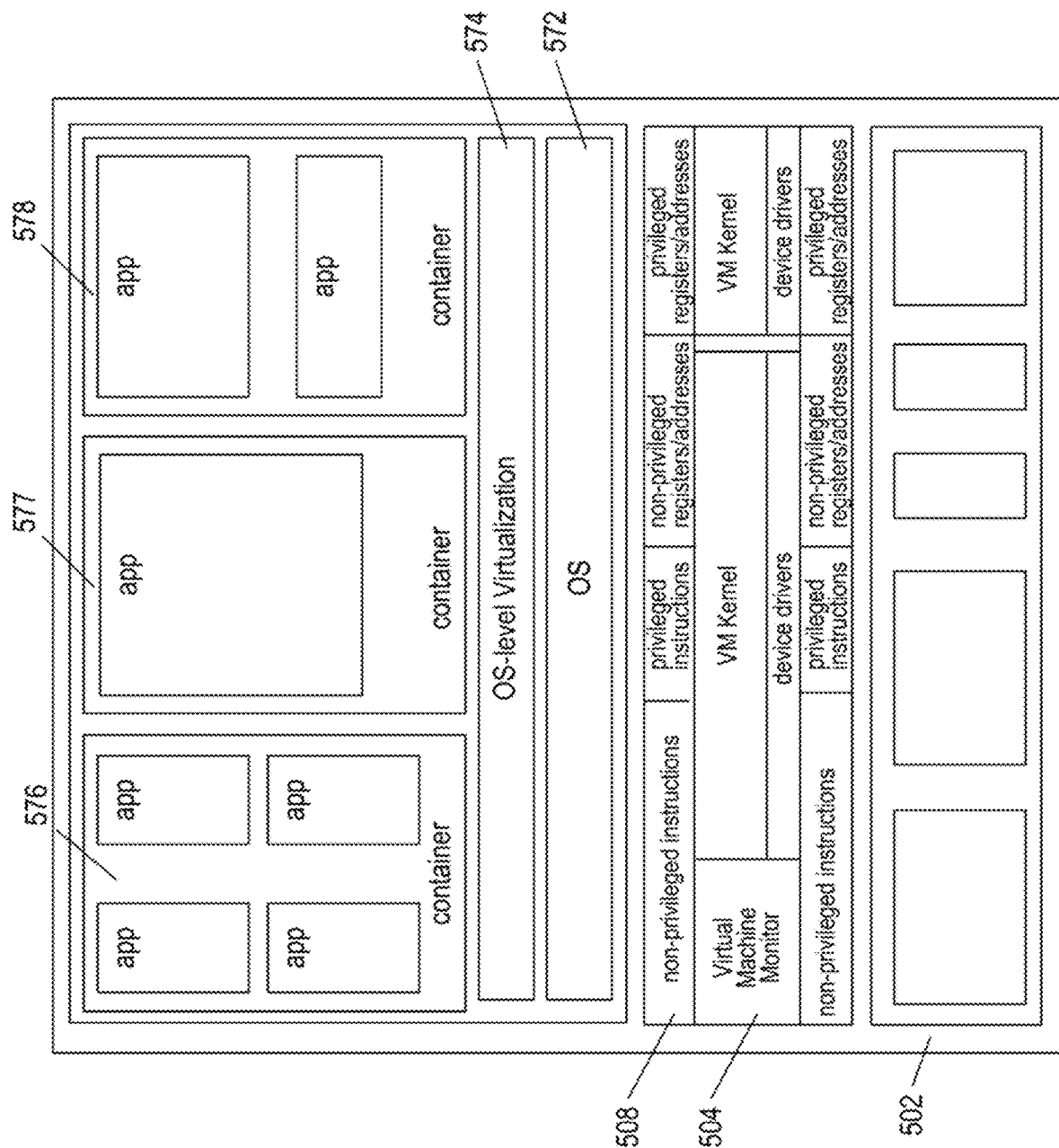

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
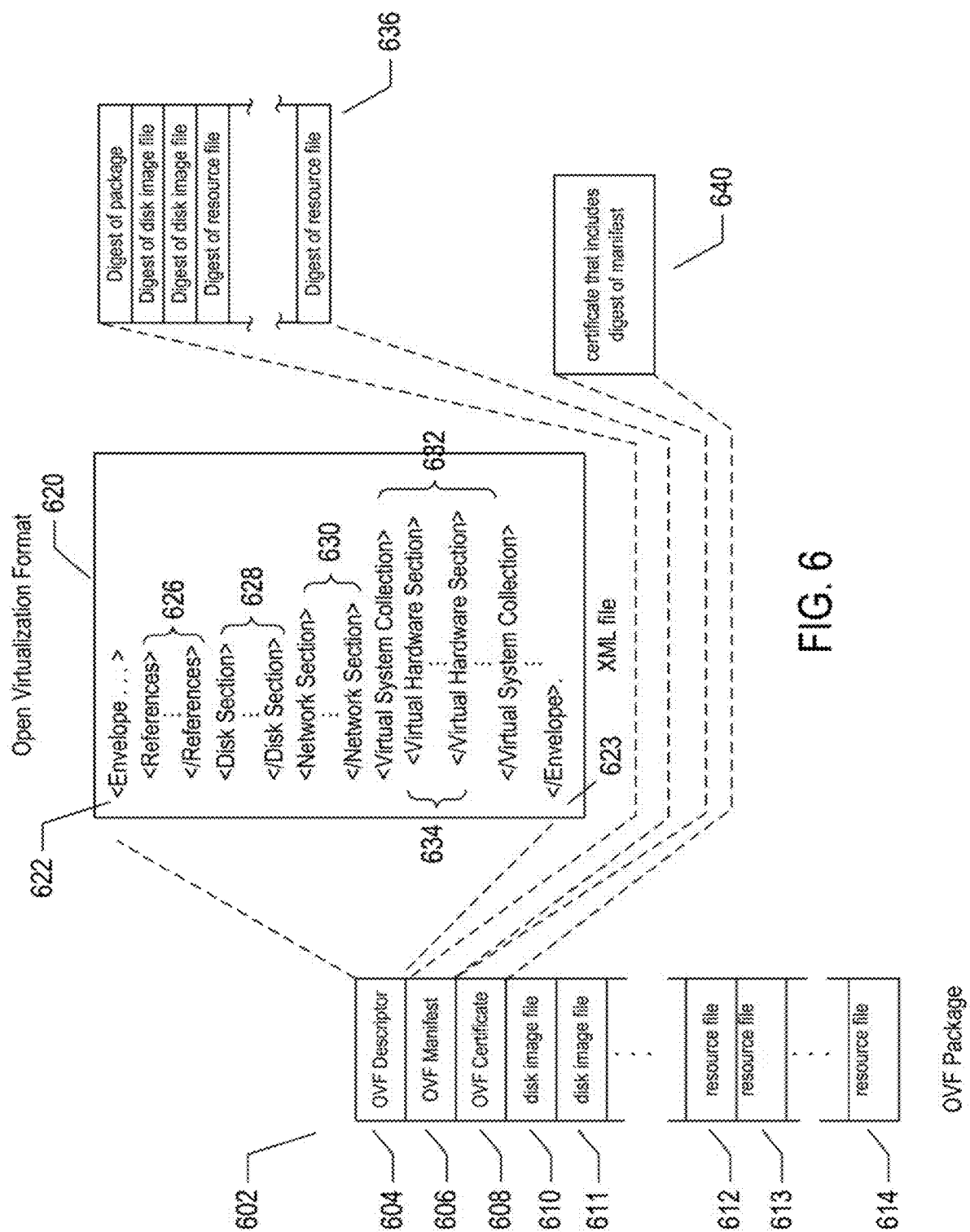
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
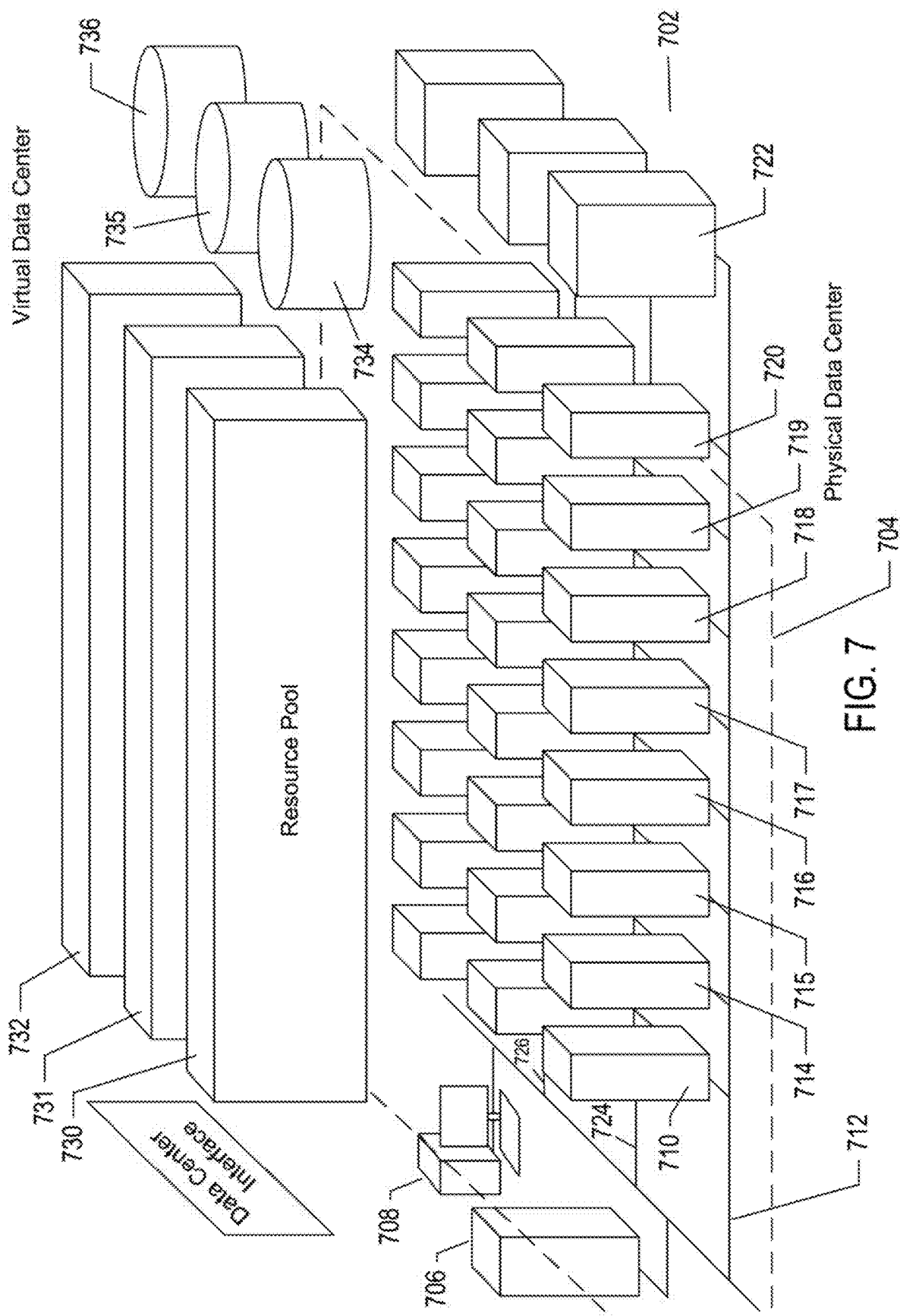
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
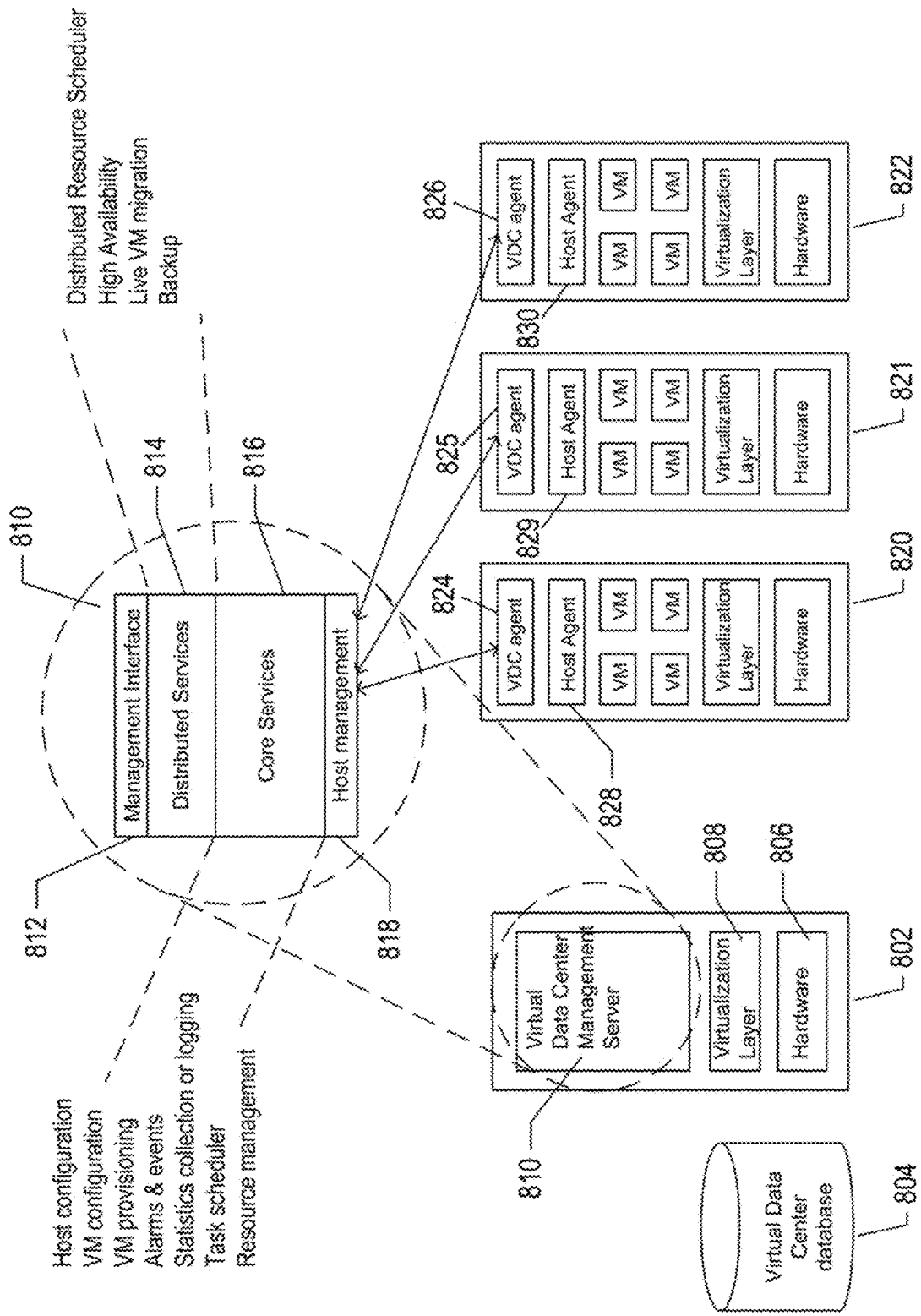
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
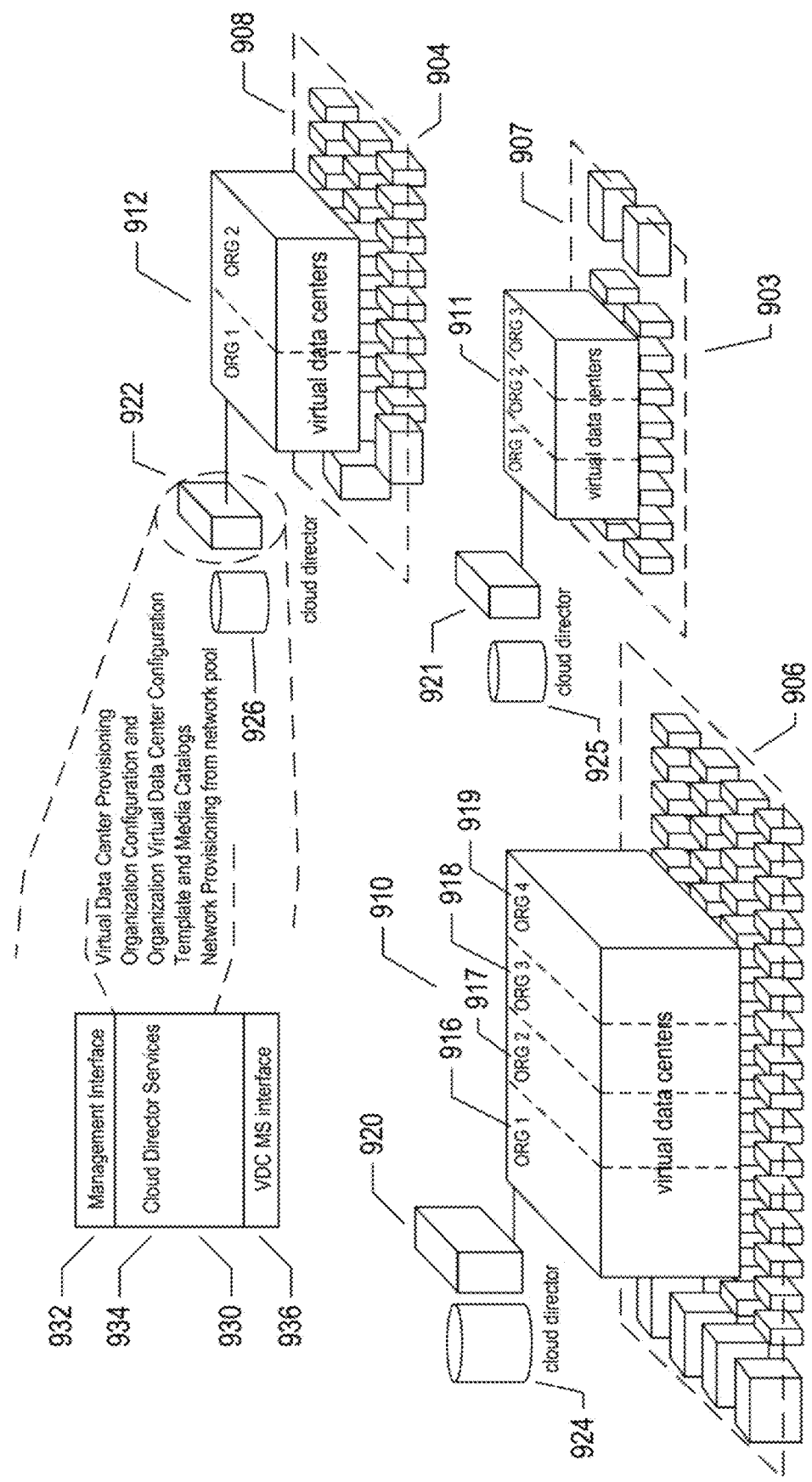
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
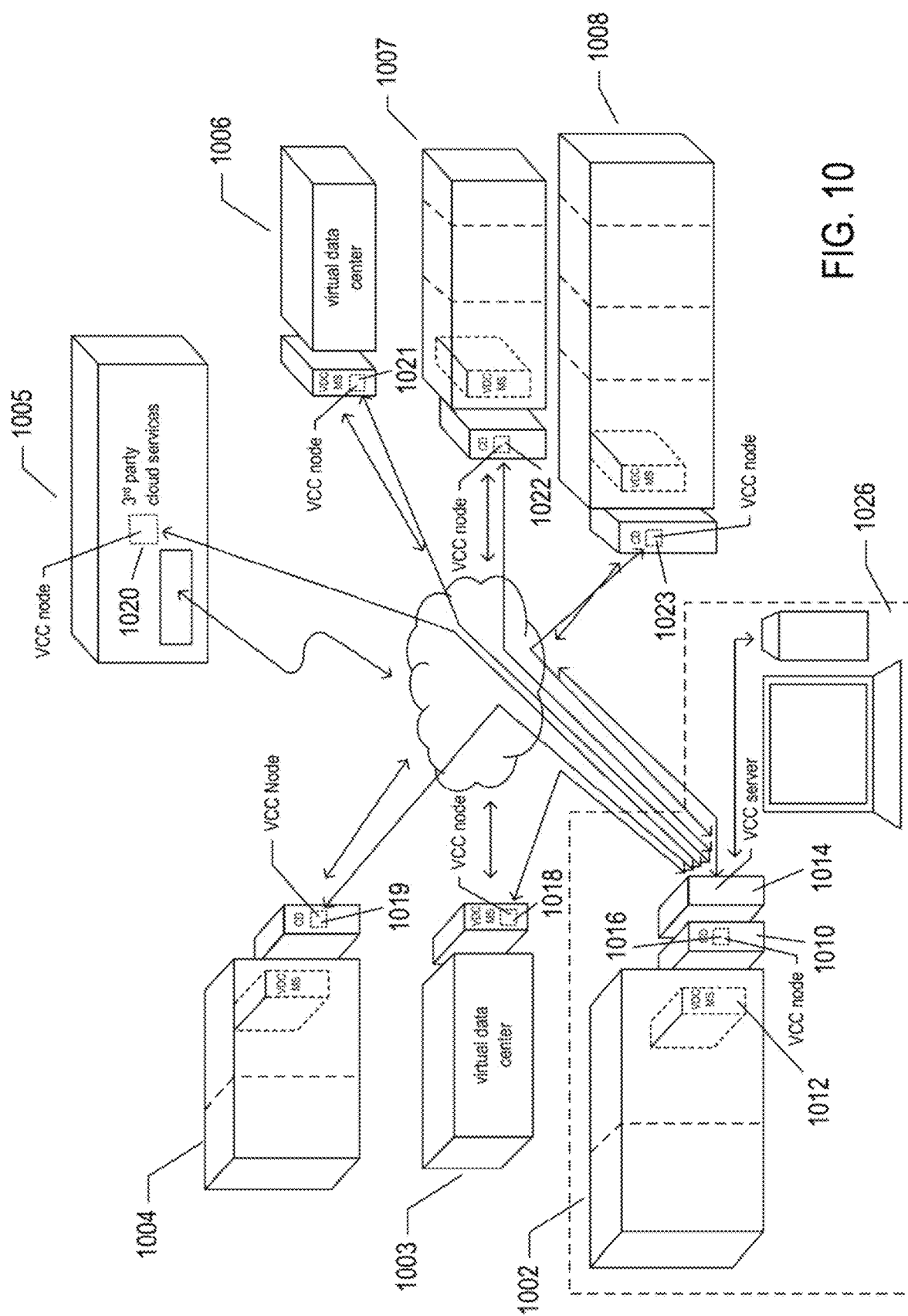
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Modern distributed computing systems feature a variety of different types of automated and semi-automated administration and management systems that detect anomalous operating behaviors of various components of the distributed computing systems, collect errors reported by distributed-computing-system components, and use the detected anomalies and collected errors to monitor and diagnose the operational states of the distributed computing systems in order to automatically undertake corrective and ameliorative actions and to alert human system administrators of potential, incipient, and already occurring problems. Log/event-message reporting, collecting, storing, and querying systems are fundamental components of administration and management subsystems. The phrase "log/event message" refers to various types of generally short log messages and event messages issued by message-generation-and-reporting functionality incorporated within many hardware components, including network routers and bridges, network-attached storage devices, network-interface controllers, virtualization layers, operating systems, applications running within servers and other types of computer systems, and additional hardware devices incorporated within distributed computing systems. The log/event messages generally include both text and numeric values and represent various types of information, including notification of completed actions, errors, anomalous operating behaviors and conditions, various types of computational events, warnings, and other such information. The log/event messages are transmitted to message collectors, generally running within servers of local data centers, which forward collected log/event messages to message-ingestion-and-processing systems that collect and store log/event messages in message databases. Log/event-message query-processing systems provide, to administrators and managers of distributed computing systems, query-based access to log/event messages in message databases. The message-ingestion-and-processing systems may additionally provide a variety of different types of services, including automated generation of alerts, filtering, and other message-processing services.

Large modern distributed computing systems may generate enormous volumes of log/event messages, from tens of gigabytes ("GB") to terabytes ("TB") of log/event messages per day. Generation, transmission, and storage of such large volumes of data represent significant networking-bandwidth, processor-bandwidth, and data-storage overheads for distributed computing systems, significantly decreasing the available networking bandwidth, processor bandwidth, and data-storage capacity for supporting client applications and services. In addition, the enormous volumes of log/event messages generated, transmitted, and stored on a daily basis result in significant transmission and processing latencies, as a result of which greater than desired latencies in alert generation and processing of inquiries directed to stored log/event messages are often experienced by automated and semi-automated administration tools and services as well as by human administrators and managers.

FIG. 11 shows a small, 11-entry portion of a log file from a distributed computer system. A log file may store log/event messages for archival purposes, in preparation for transmission and forwarding to processing systems, or for batch entry into a log/event-message database. In FIG. 11, each rectangular cell, such as rectangular cell 1102, of the portion of the log file 1104 represents a single stored log/event message. In general, log/event messages are relatively cryptic, including only one or two natural-language sentences or phrases as well as various types of file names, path names, network addresses, component identifiers, and, other alphanumeric parameters. For example, log entry 1102 includes a short natural-language phrase 1106, date 1108 and time 1110 parameters, as well as a numeric parameter 1112 which appears to identify a particular host computer.

Figure 12:
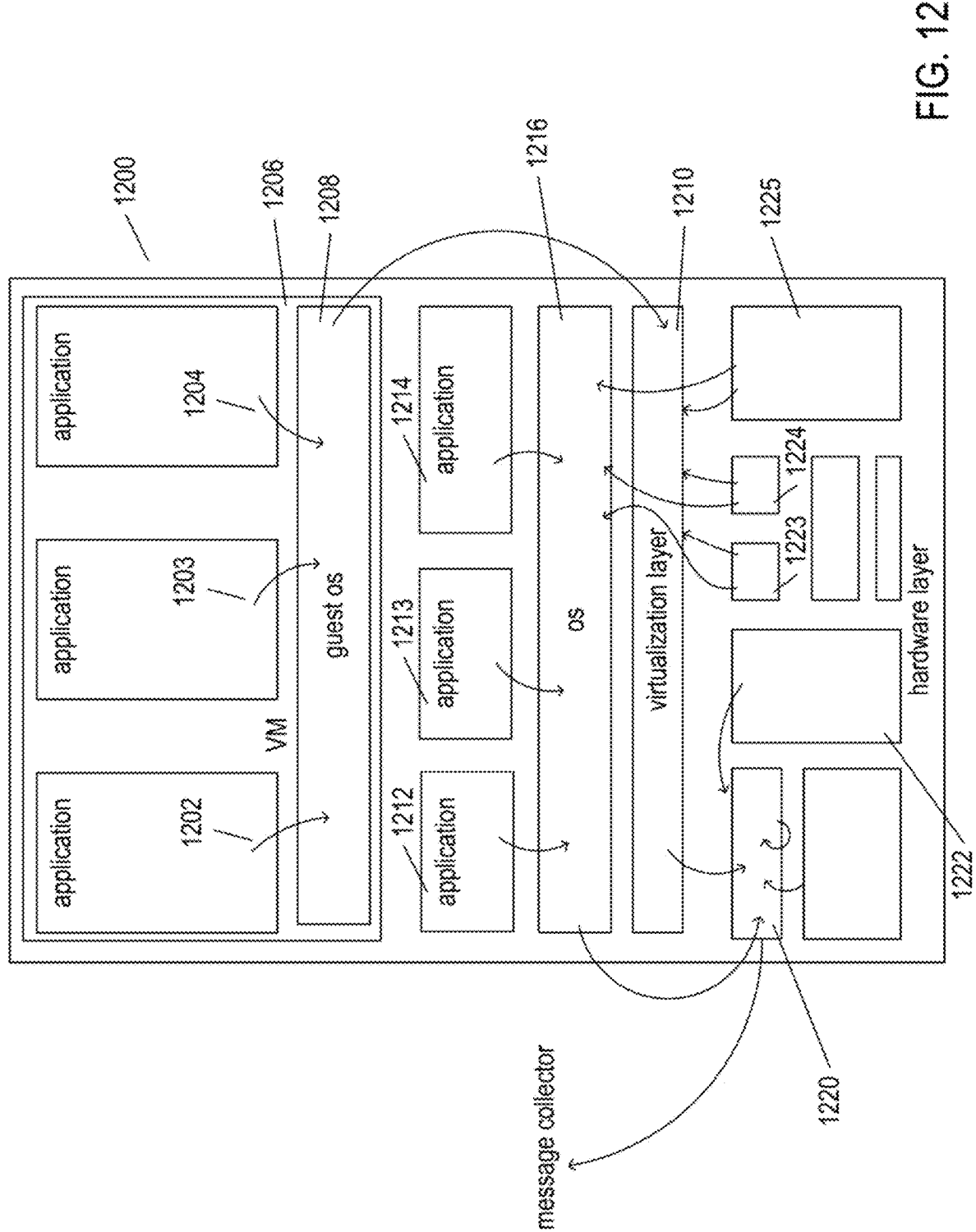
FIG. 12 illustrates generation of log/event messages within a server.

FIG. 12 illustrates generation of log/event messages within a server. A block diagram of a server 1200 is shown in FIG. 12. Log/event messages can be generated within application programs, as indicated by arrows 1202-1204. In this example, the log/event messages generated by applications running within an execution environment provided by a virtual machine 1206 are reported to a guest operating system 1208 running within the virtual machine. The application-generated log/event messages and log/event messages generated by the guest operating system are, in this example, reported to a virtualization layer 1210. Log/event messages may also be generated by applications 1212-1214 running in an execution environment provided by an operating system 1216 executing independently of a virtualization layer. Both the operating system 1216 and the virtualization layer 1210 may generate additional log/event messages and transmit those log/event messages along with log/event messages received from applications and the guest operating system through a network interface controller 1222 to a message collector. In addition, various hardware components and devices within the server 1222-1225 may generate and send log/event messages either to the operating system 1216 and/or virtualization layer 1210, or directly to the network interface controller 122 for transmission to the message collector. Thus, many different types of log/event messages may be generated and sent to a message collector from many different components of many different component levels within a server computer or other distributed-computer-system components, such as network-attached storage devices, networking devices, and other distributed-computer-system components.

Figure 13A:
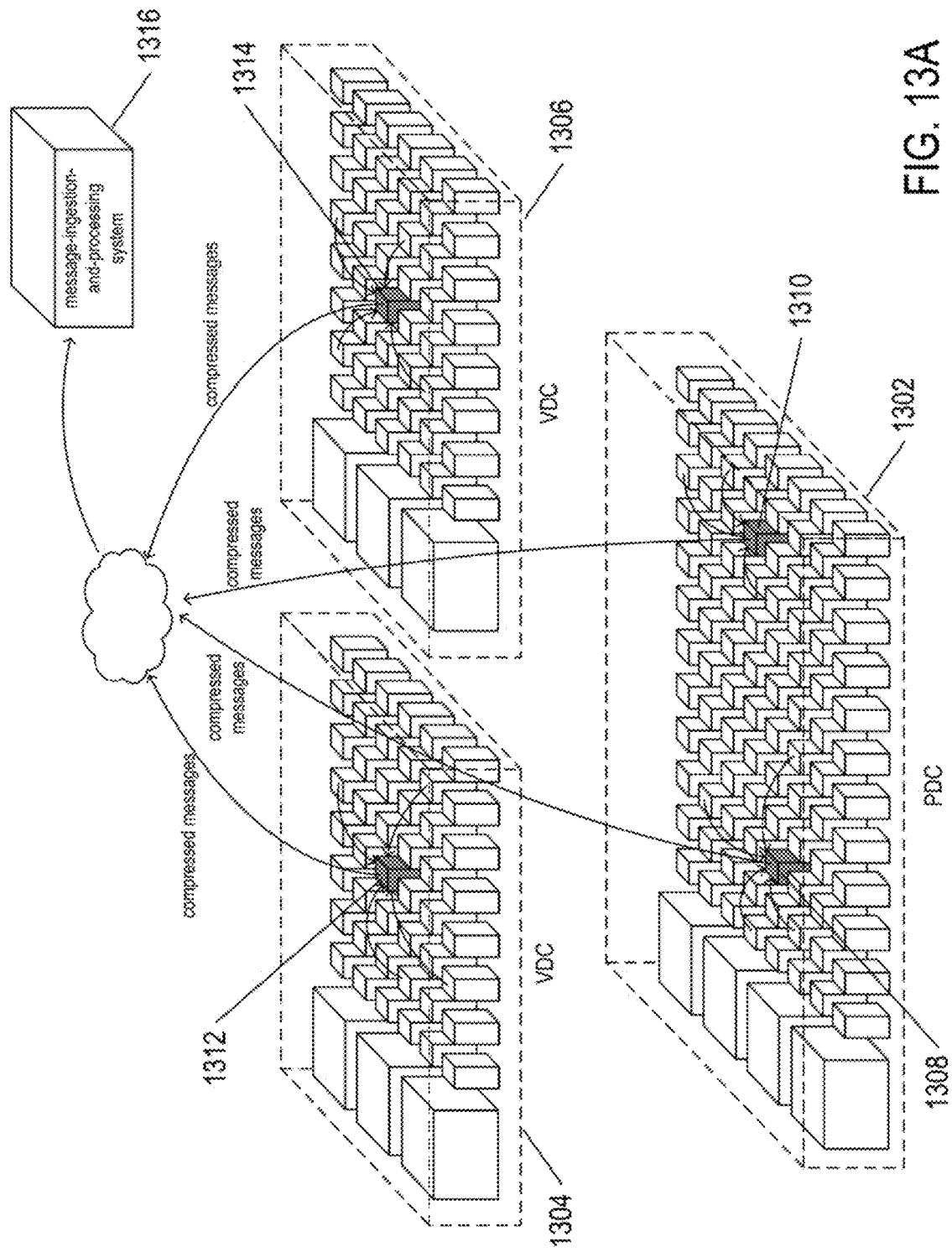
FIGS. 13A-B illustrate two different types of log/event-message collection and forwarding within distributed computer systems.
Figure 13B:
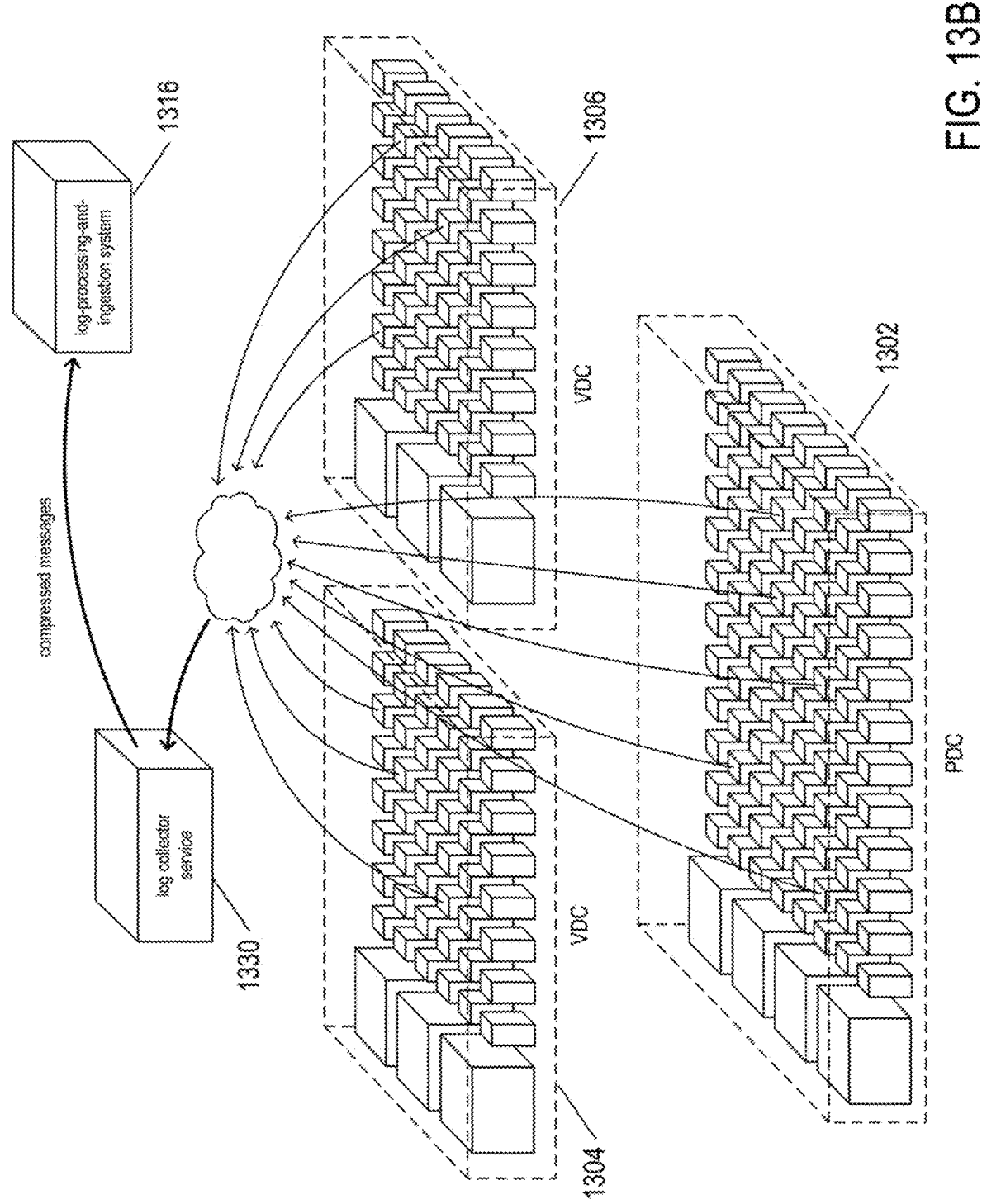

FIGS. 13A-B illustrate two different types of log/event-message collection and forwarding within distributed computer systems. FIG. 13A shows a distributed computing system comprising a physical data center 1302 above which two different virtual data centers 1304 and 1306 are implemented. The physical data center includes two message collectors running within two physical servers 1308 and 1310. Each virtual data center includes a message collector running within a virtual server 1312 and 1314. The message collectors compress batches of the collected messages and forward the compressed messages to a message-processing-and-ingestion system 1316. In certain cases, each distributed computing facility owned and/or managed by a particular organization may include one or more message-processing-and-ingestion systems dedicated to collection and storage of log/event messages for the organization. In other cases, they message-processing-and-ingestion system may provide log/event-message collection and storage for multiple distributed computing facilities owned and managed by multiple different organizations. In this example, log/event messages may be produced and reported both from the physical data center as well as from the higher-level virtual data centers implemented above the physical data center. In alternative schemes, message collectors within a distributed computing system may collect log/event messages generated both at the physical and virtual levels.

FIG. 13B shows the same distributed computing system 1302, 1304, and 1306 shown in FIG. 13A. However, in the log/event-message reporting scheme illustrated in FIG. 13B, log/event messages are collected by a remote message-collector service 1330 which then forwards the collected log/event messages to the message-processing-and-ingestion system 1316.

Figure 14:
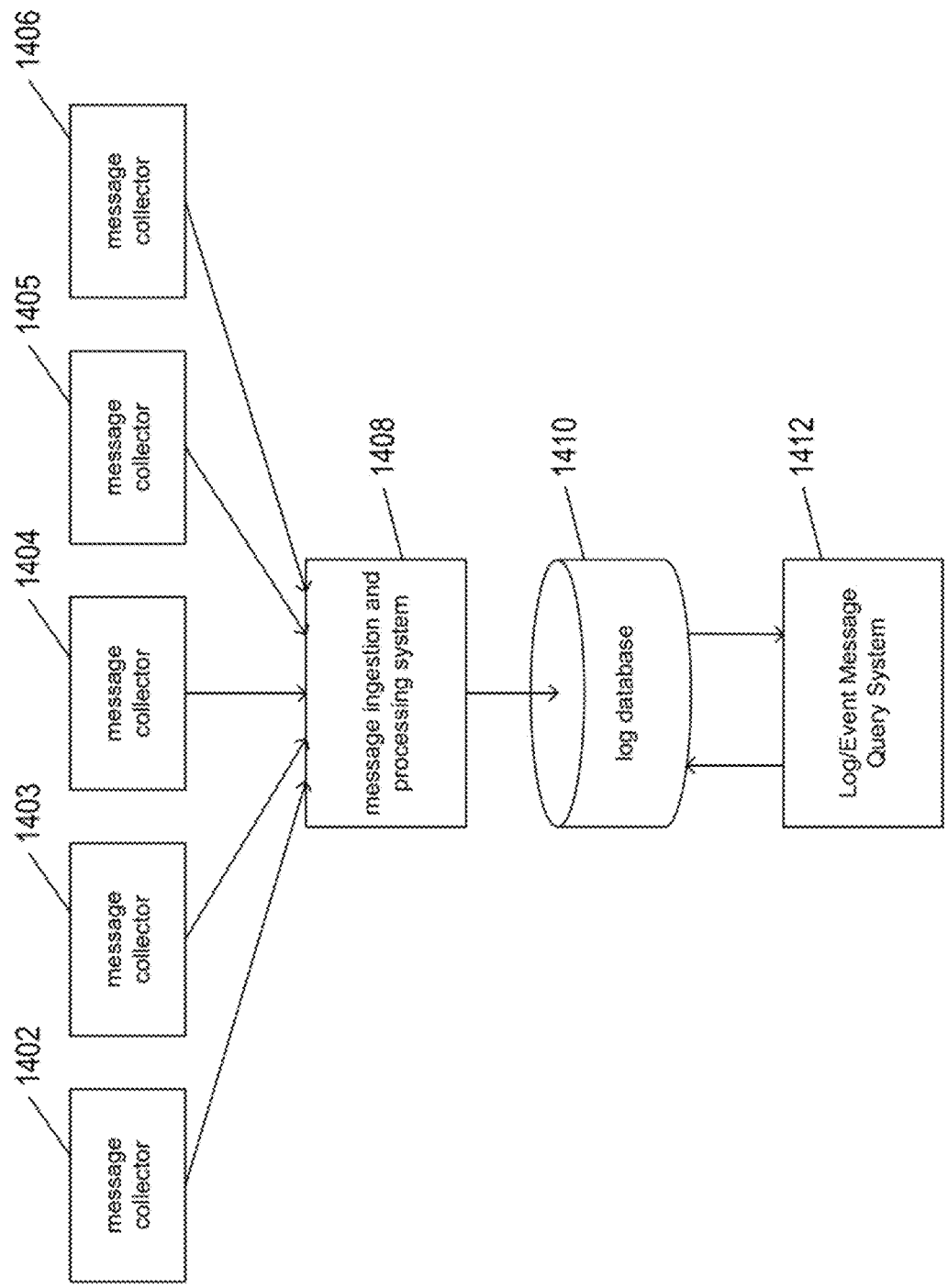
FIG. 14 provides a block diagram of a generalized log/event-message system incorporated within one or more distributed computing systems.

FIG. 14 provides a block diagram of a generalized log/event-message system incorporated within one or more distributed computing systems. The message collectors 1402-1406 receive log/event messages from log/event-message sources, including hardware devices, operating systems, virtualization layers, guest operating systems, and applications, among other types of log/event-message sources. The message collectors generally accumulate a number of log/event messages, compress them using any of commonly available data-compression methods, and send the compressed batches of log/event messages to a message-ingestion-and-processing system 1408. The message-ingestion-and-processing system decompresses received batches of messages, carry out any of various types of message processing, such as generating alerts for particular types of messages, filtering the messages, and normalizing the messages, prior to storing some or all of the messages in a message database 1410. A log/event-message query-processing system 1412 receives queries from distributed-computer-system administrators and managers, as well as from automated administration-and-management systems, and accesses the message database 1410 to retrieve stored log/event messages and/or information extracted from log/event messages specified by the receive queries for return to the distributed-computer-system administrators and managers and automated administration-and-management systems.

As discussed above, enormous volumes of log/event messages are generated within modern distributed computing systems. As a result, message collectors are generally processor-bandwidth bound and network-bandwidth bound. The volume of log/event-message traffic can use a significant portion of the intra-system and inter-system networking bandwidth, decreasing the network bandwidth available to support client applications and data transfer between local applications as well as between local applications and remote computational entities. Loaded networks generally suffer significant message-transfer latencies, which can lead to significant latencies in processing log/event messages and generating alerts based on processed log/event messages and to delayed detection and diagnosis of potential and incipient operational anomalies within the distributed computing systems. Message collectors may use all or significant portion of the network bandwidth and computational bandwidth of one or more servers within a distributed computer system, lowering the available computational bandwidth for executing client applications and services. Message-ingestion-and-processing systems are associated with similar network-bandwidth and processor-bandwidth overheads, but also use large amounts of data-storage capacities within the computing systems in which they reside. Because of the volume of log/event-message data stored within the message database, many of the more complex types of queries executed by the log/event-message query system against the stored log/event-message data may be associated with significant latencies and very high computational overheads. As the number of components within distributed computing systems increases, the network, processor-bandwidth, and storage-capacity overheads can end up representing significant portions of the total network bandwidth, computational bandwidth, and storage capacity of the distributed computing systems that generate log/event messages.

Figure 15:
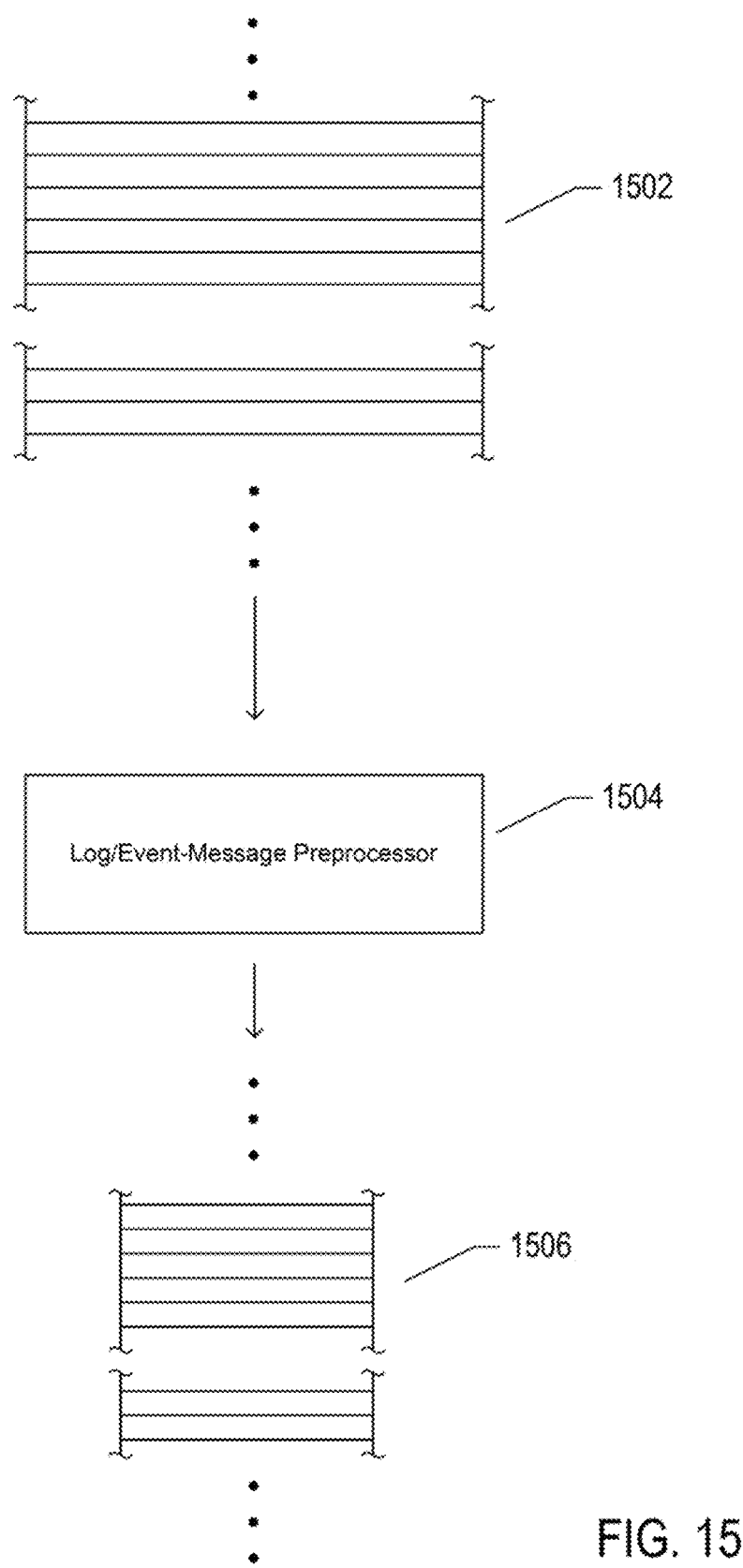
FIG. 15 illustrates log/event-message preprocessing.

One approach to addressing the above-discussed problems is to attempt to preprocess log/event messages in ways that decrease the volume of data in a log/event-message stream. FIG. 15 illustrates log/event-message preprocessing. As shown in FIG. 15, an input stream of log/event messages 1502 is preprocessed by a log/event-message preprocessor 1504 to generate an output stream 1506 of log/event messages that represents a significantly smaller volume of data. Preprocessing may include filtering received log/event messages, compressing received log/event messages, and applying other such operations to received log/event messages that result in a decrease in the data volume represented by the stream of log/event messages output from the preprocessing steps.

Figure 16:
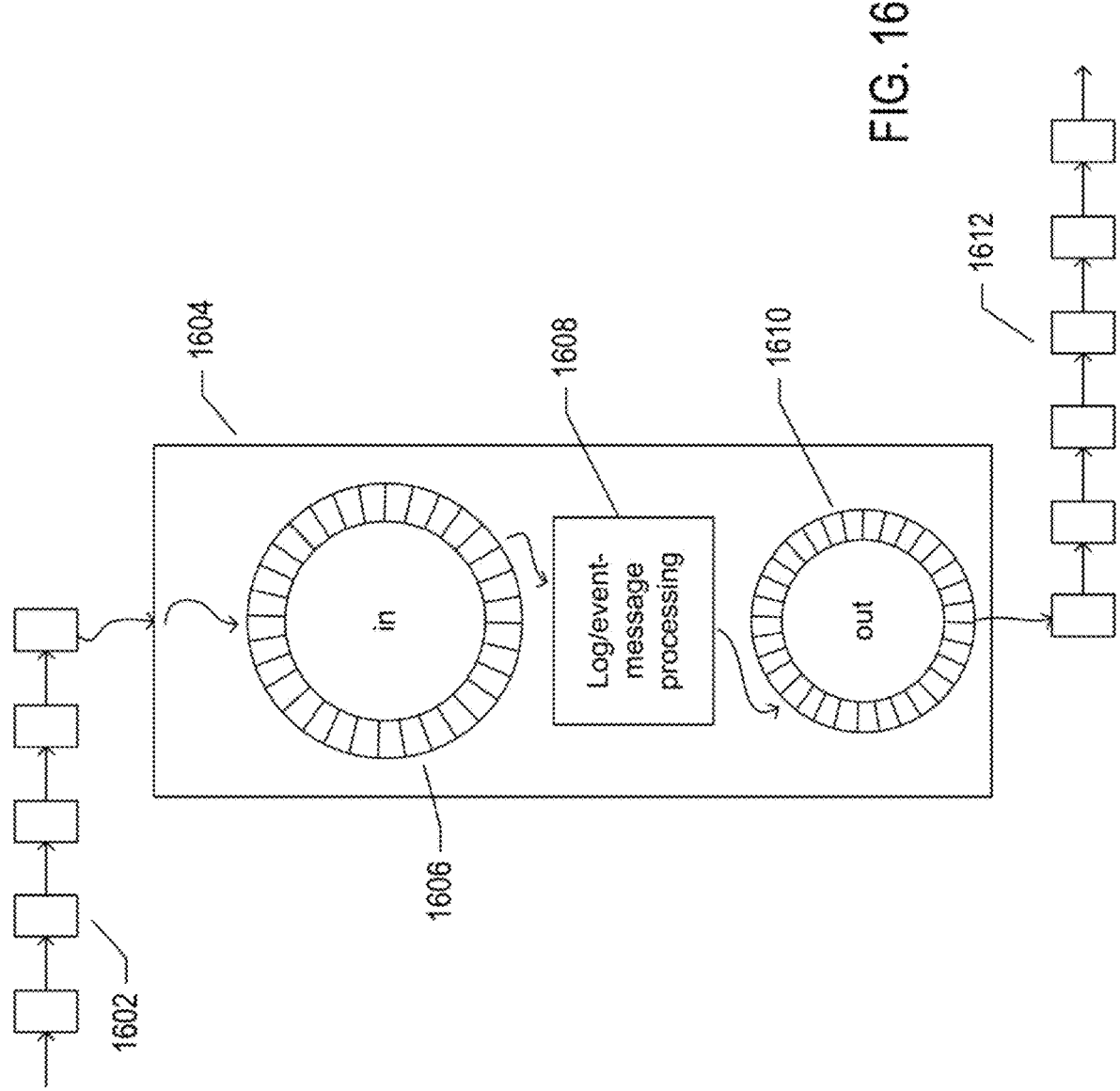
FIG. 16 illustrates processing of log/event messages by a message-collector system or a message-ingestion-and-processing system.

FIG. 16 illustrates processing of log/event messages by a message-collector system or a message-ingestion-and-processing system. An input stream of event/log messages 1602 is received by data-transmission components of the system 1604 and placed in an in queue 1606. Log/event-message processing functionality 1608 processes log/event messages removed from the in queue and places resulting processed log/event messages for transmission to downstream processing components in an out queue 1610. Data-transmission components of the system remove processed log/event messages from the out queue and transmit them via electronic communications to downstream processing components as an output log/event-message stream 1612. Downstream components for message-collector systems primarily include message-ingestion-and-processing systems, but may include additional targets, or destinations, to which log/event-messages are forwarded or to which alerts and notifications are forwarded. Downstream components for message-ingestion-and-processing systems primarily include log/event-message query systems, which store log/event messages for subsequent retrieval by analytics systems and other log/event-message-consuming systems within a distributed computer system, but may also include additional targets, or destinations, to which log/event-messages are forwarded or to which alerts and notifications are forwarded as well as long-term archival systems.

Figure 17A:
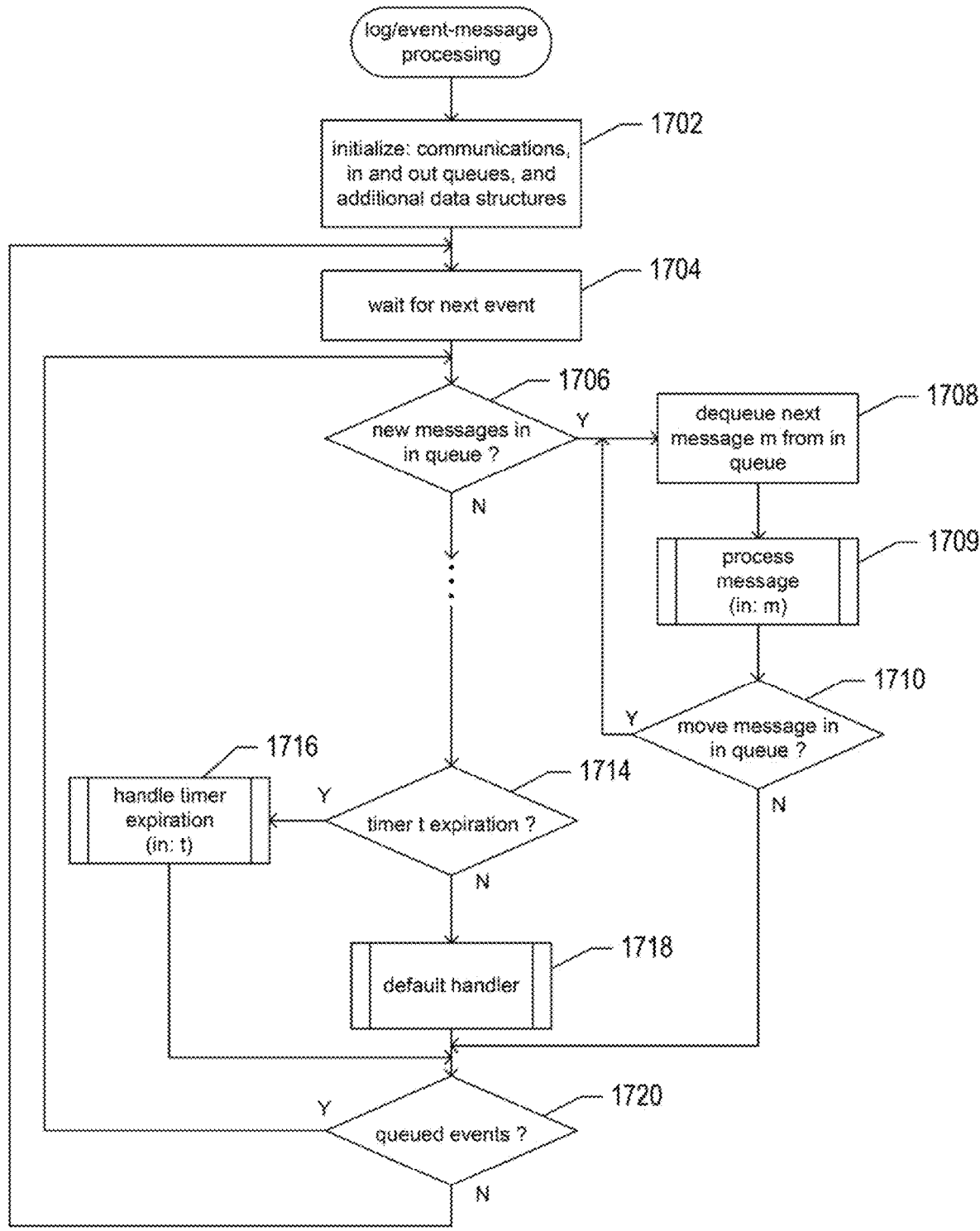
FIGS. 17A-C provide control-flow diagrams that illustrate log/event-message processing within currently available message-collector systems and message-ingestion-and-processing systems.
Figure 17B:
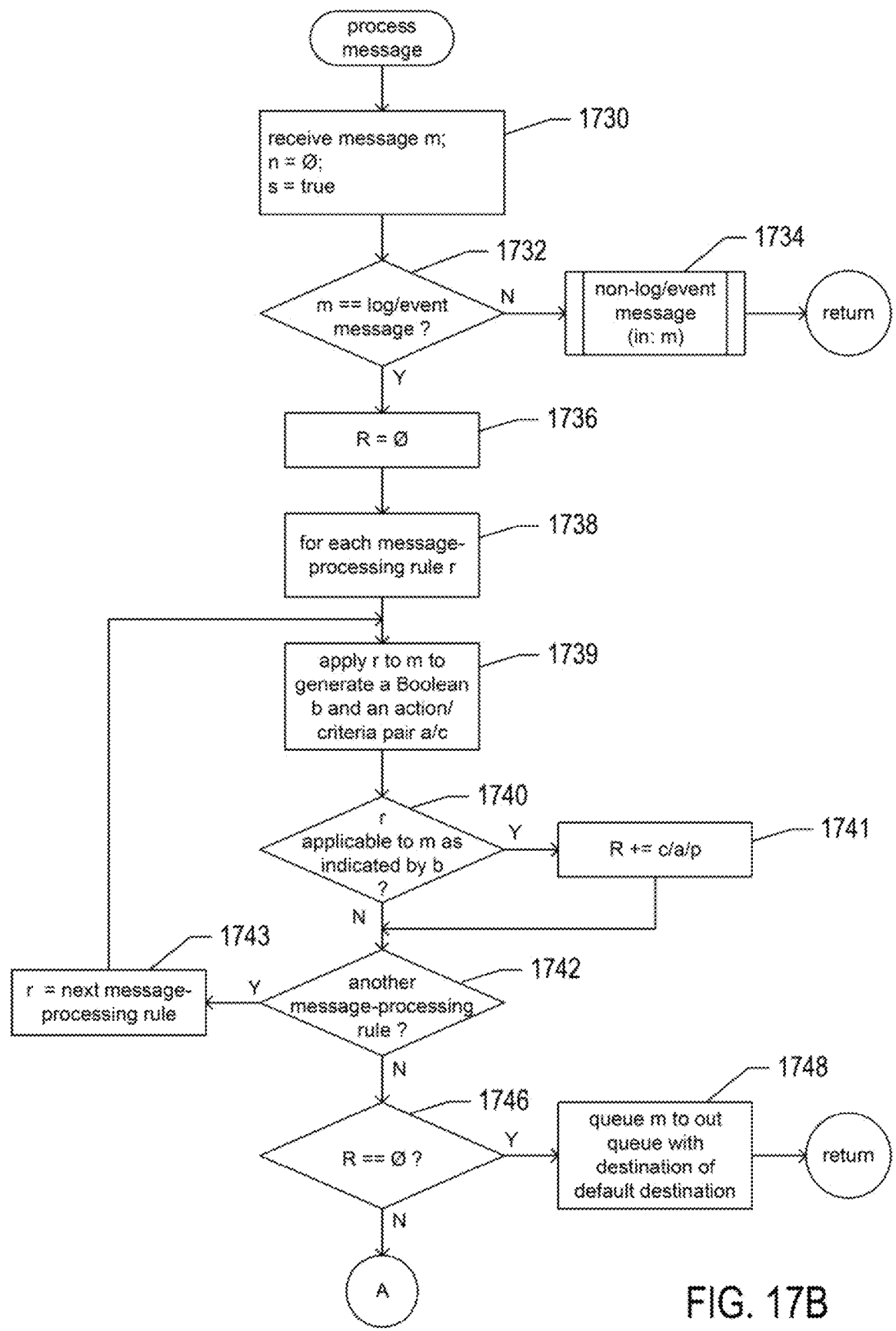
Figure 17C:
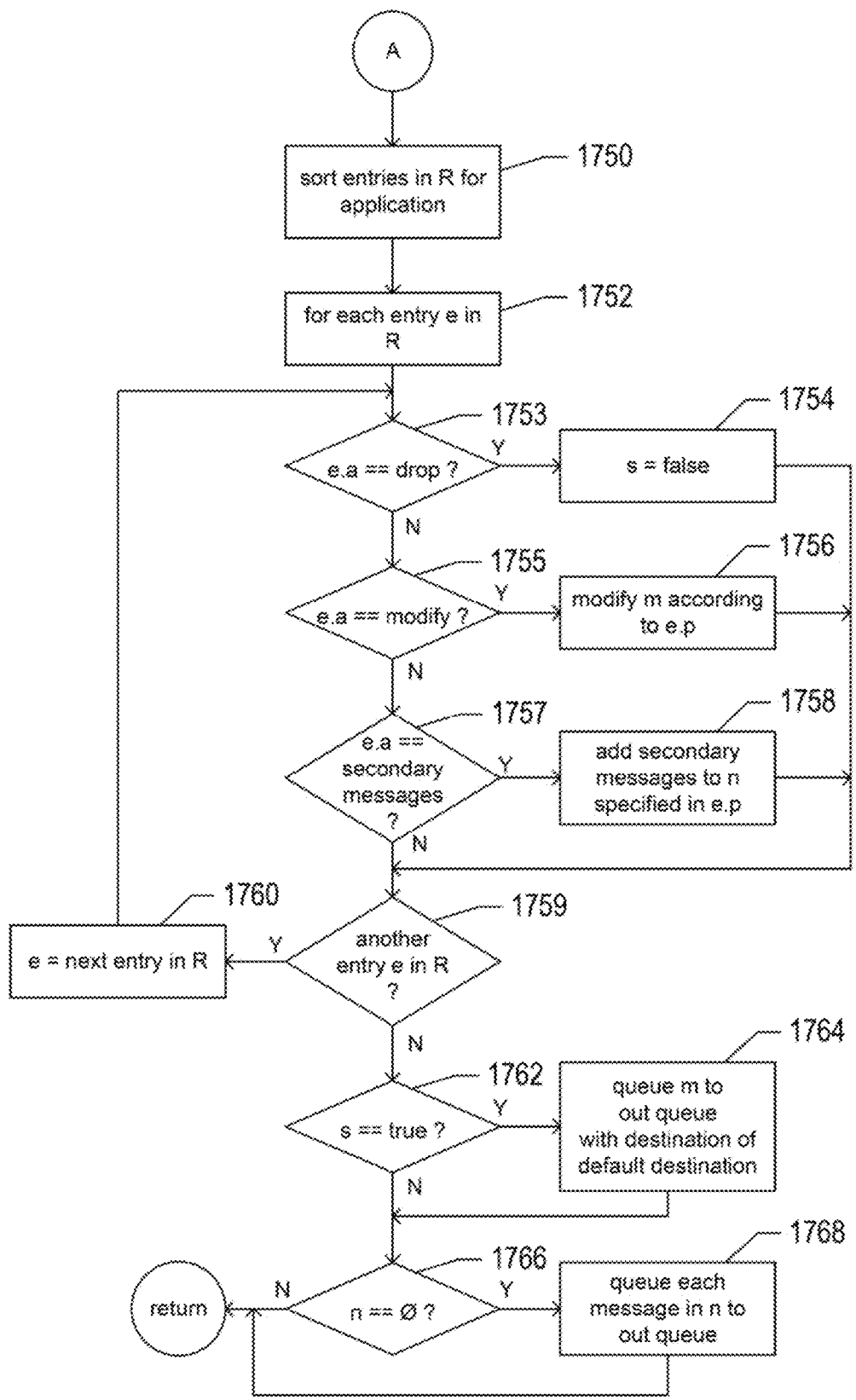

FIGS. 17A-C provide control-flow diagrams that illustrate log/event-message processing within currently available message-collector systems and message-ingestion-and-processing systems. FIG. 17A shows a highest-level control-flow diagram in which the log/event-message processing logic is represented as an event loop. In step 1702, log/event-message processing is initialized by initializing communications connections, through which log/event messages are received and to which processed log/event messages are output for transmission to downstream components, by initializing the in and out queues, and by initializing additional data structures. In step 1704, the log/event-message processing logic waits for a next event to occur. When a next event occurs, and when the next-occurring event is reception of one or more new messages, as determined in step 1706, messages are dequeued from the in queue and processed in the loop of steps 1708-1710. For each dequeued message, the routine "process message" is called in step 1709. Ellipsis 1712 indicates that there may be many additional types of events that are handled by the event loop shown in FIG. 17A. When the next-occurring event is a timer expiration, as determined in step 1714, a timer-expiration handler is called in step 1716. A default handler 1718 handles any rare or unexpected events. When there are more events queued for processing, as determined in step 1720, control returns to step 1706. Otherwise, control returns to step 1704, where the log/event-message-processing logic waits for the occurrence of a next event.

FIGS. 17B-C provide a control-flow diagram for the routine "process message" called in step 1709 of FIG. 17A. In step 1730, the routine "process message" receives a message m, sets a set variable n to null, and sets a Boolean variable s to TRUE. When the received message is not a log/event message, as determined in step 1732, a routine is called to process the non-log/event message, in step 1734, and the routine "process message" terminates. Processing of non-log/event messages is not further described. When the received message is a log/event message, as determined in step 1732, a set variable R is set to null, in step 1736. In the for-loop of steps 1738-1743, the routine "process message" attempts to apply each rule r of a set of processing rules to the received message to determine whether or not the rule r applies to the message. When the currently considered processing rule r is applicable to the message, as determined in steps 1739 and 1740, the rule is added to the set of rules contained in the set variable R, in step 1741. As discussed below, a processing rule consists of a Boolean expression representing the criteria for applicability of the rule, c, an action a to be taken when the rule applies to a message, and any of various parameters p used for rule application. Thus, in step 1741, the rule added to the set of rules contained in set variable R is shown as the criteria/action/parameters triple c/a/p. When, following execution of the for-loop of steps 1738-1743, the set variable R contains no applicable rules, as determined in step 1746, the received message m is added to the out queue, in step 1748, for transmission to downstream processing components. Otherwise, the applicable rules are applied to the received message m as shown in FIG. 17C. First, the rules stored in set variable R are sorted into an appropriate rule sequence for application to the message, in step 1750. Sorting of the rules provides for message-processing efficiency and correctness. For example, if one of the applicable rules specifies that the message to be dropped, but another of the applicable rules specifies that a copy of the message needs to be forwarded to a specified target or destination, the rule that specifies forwarding of the copy of the message should be processed prior to processing the rule that specifies that the message is to be dropped, unless the latter rule is meant to exclude prior message forwarding. In the for-loop of steps 1752-1760, each rule of the sorted set of rules in the set variable R is applied to the received message m. When the currently considered rule indicates that the message should be dropped, as determined in step 1753, the local variable s is set to FALSE, in step 1754. When the currently considered rule indicates that the received message m needs to be modified, as determined in step 1755, the modification is carried out in step 1756. When the currently considered rule indicates that secondary messages, such as forwarded copies, notifications, or alerts should be transmitted to target destinations, as determined in step 1757, the secondary messages are generated and placed in the set variable n, in step 1758. Following completion of the for-loop of steps 1752-1760, when the local variable s has the value TRUE, as determined in step 1762, the received message m is queued to the out queue, and step 1764, for transmission to the default destination for messages for the system, such as a message-ingestion-and-processing system, in the case of a message collector system, or a log/event-message query system, in the case of a message-ingestion-and-processing system. When the local set variable n is not empty, as determined in step 1766, each secondary message contained in local set variable n is queued to the out queue for transmission, in step 1768.

Figure 18:
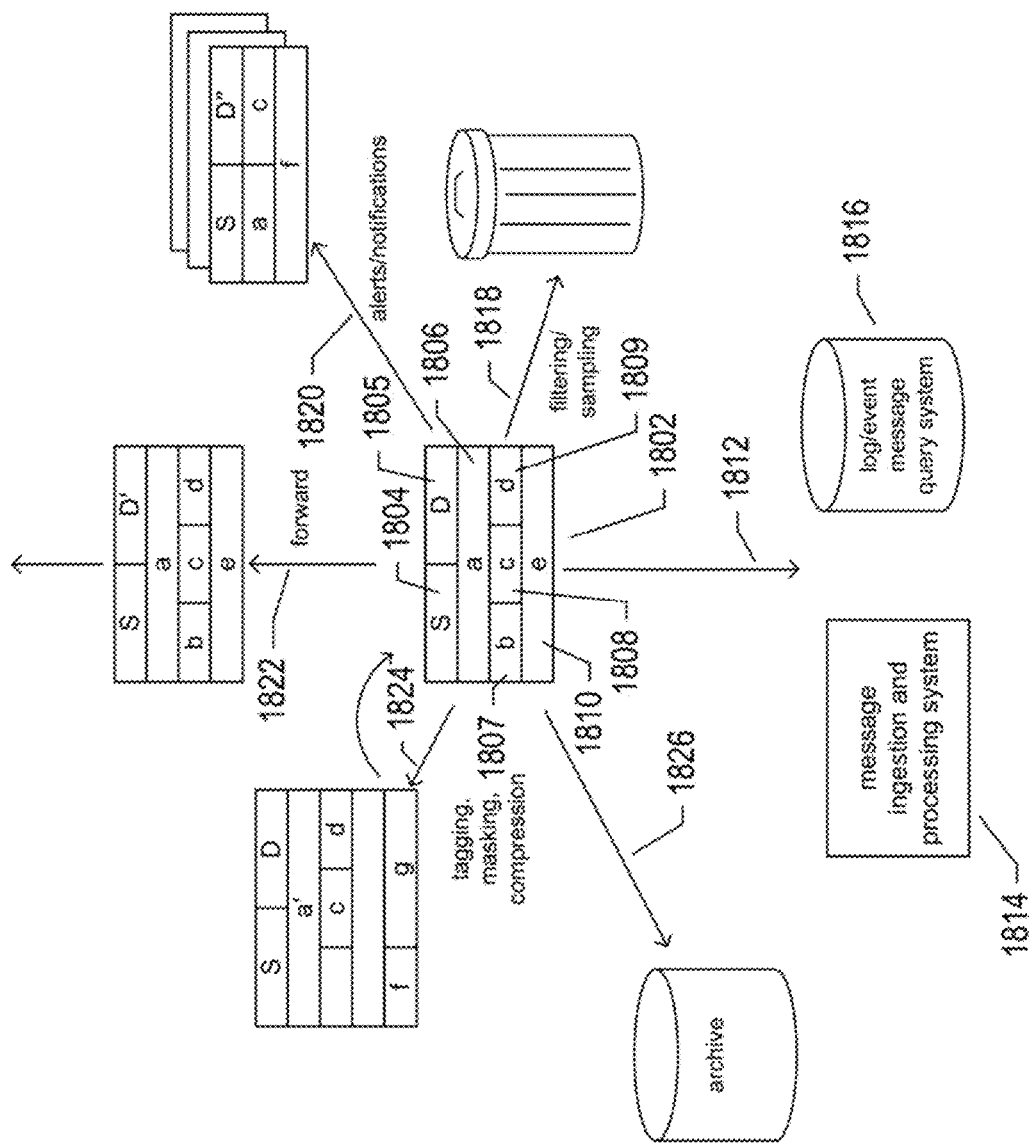
FIG. 18 illustrates various common types of initial log/event-message processing carried out by message-collector systems and/or message-ingestion-and-processing systems.

FIG. 18 illustrates various common types of initial log/event-message processing carried out by message-collector systems and/or message-ingestion-and-processing systems. A received log/event message 1802 is shown in the center of FIG. 18. In this example, the message contains source and destination addresses 1804-1805 in a message header as well as five variable fields 1806-1810 with field values indicated by the symbols "a," "b," "c," "d," and "e," respectively. The message is generally transmitted to a downstream processing component, as represented by arrow 1812, where downstream processing components include a message-ingestion-and-processing system 1814 and a log/event-message query system 1860. Transmission of the message to a downstream processing component occurs unless a processing rule specifies that the transmission should not occur. Alternatively, the message may be dropped, as indicated by arrow 1818, due to a filtering or sampling action contained in a processing rule. Sampling involves processing only a specified percentage p of log/event messages of a particular type or class and dropping the remaining 1-p percentage of the log/event messages of the particular type or class. Filtering involves dropping, or discarding, those log/event messages that meet a specified criteria. Rules may specify that various types of alerts and notifications are to be generated, as a result of reception of a message to which the rule applies, for transmission to target destinations specified by the parameters of the rule, as indicated by arrow 1820. As indicated by arrow 1822, a received log/event message may be forwarded to a different or additional target destinations when indicated by the criteria associated with a processing rule. As indicated by arrow 1824, processing rules may specify that received log/event messages that meet specified criteria should be modified before subsequent processing steps. The modification may involve tagging, in which information is added to the message, masking, which involves altering field values within the message to prevent access to the original values during subsequent message processing, and compression, which may involve deleting or abbreviating fields within the received log/event message. Arrow 1826 indicates that a rule may specify that a received message is to be forwarded to a long-term archival system. These are but examples of various types of initial log/event-message processing steps that that may be carried out by message collectors and/or message-ingestion-and-processing systems when specified by applicable rules.

FIG. 19 illustrates processing rules that specify various types of initial log/event-message processing. The processing rules are contained in a table 1902 shown in FIG. 19. As discussed above, each rule comprises a Boolean expression that includes the criteria for rule applicability, an action, and parameters used for carrying out the actions. In the table 1902 shown in FIG. 19, each row of the table corresponds to a rule. A first, rule 1, 1904, is applied to a log/event message when application of the Boolean expression 1906 to the log/event message returns a value TRUE. This expression indicates that rule 1 is applicable to a log/event message msg when the message includes a first phrase phrase_1, does not include a first term term_1, and includes, as the value of a first field, a second phrase phrase_2 or when the message includes the first phrase phrase_1 as well as a second term term_2. When the criteria are met by a log/event message, the log/event message is specified, by the rule, to be forwarded to four destinations with addresses add1, add2, add3, and add4. The placeholders phrase_1, phrase_2, term_1, term_2, add1, add2, add3, and add4 in the expression stand for various particular character strings and/or alphanumeric strings. The rules shown in FIG. 19, of course, are only hypothetical examples of the types of log/event-message processing rules that might be employed by initial-log/event-message-processing logic within message collectors and message-ingestion-and-processing systems.

While use of message-processing rules provides for flexible implementation and control of initial message processing by message collectors and message-ingestion-and-processing systems, message-processing-rule-based implementations are associated with many serious problems in current log/event-message systems. One problem is that there may be a huge number of different types of log/event messages that may be generated and collected within a distributed computer system, from hundreds, thousands, to many thousands of different log/event-message types. Specifying rules for initial log/event-message processing may therefore involve constructing thousands, tens of thousands, or more rules, which is generally infeasible or practically impossible. Another problem is that, in current systems, determination of whether a particular message-processing rule is applicable to a particular log/event message involves computationally intensive, character-by-character log/event-message-processing to match term-and-phrase literals or placeholders in the Boolean criteria expression of a message-processing rule to terms and phrases in the log/event message. As discussed above, message collectors and message-ingestion-and-processing systems are often hard-pressed to keep up with the volume of log/event messages generated within a distributed computing system, and any unnecessary computational overheads involved in initial log/event-message processing can result in log/event messages being discarded or dropped because of the lack of computational bandwidth for processing the log/event messages. When message-processing rules are manually specified, and even when message-processing rules are programmatically generated, the probability that human error will result in incorrect messages that lead to faulty message processing is quite high.

Figure 20B:
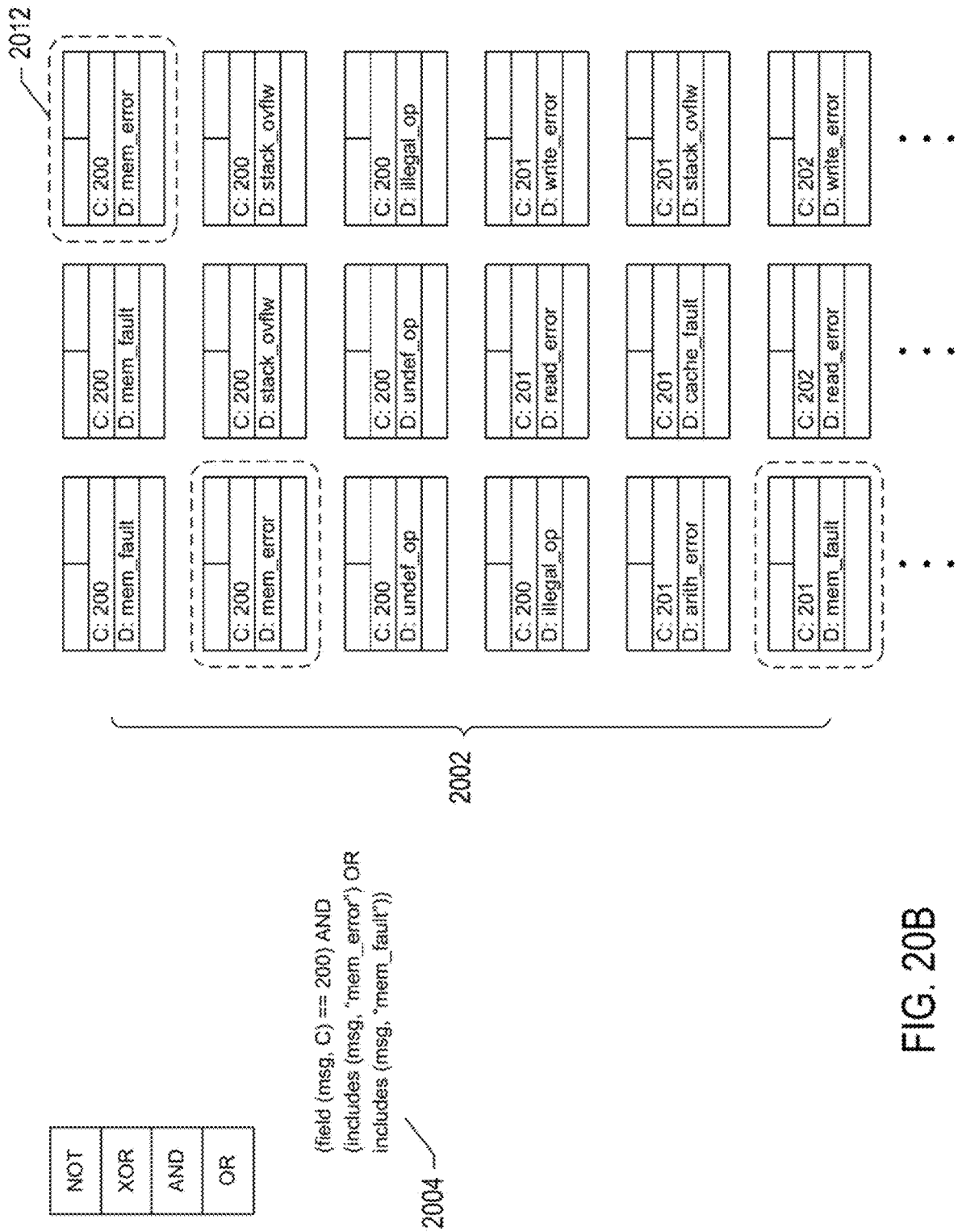

FIGS. 20A-B provide a simple example of the types of errors that may be encountered when message-processing rules are manually specified or programmatically generated. In FIG. 20A, a set of log/event messages 2002 is shown in the right-hand portion of the figure. Values are shown for two different fields C and D in each message. A hypothetical criteria for applicability of a rule is indicated by Boolean expression 2004. Boolean operators are each generally associated with a precedence, as indicated by the ordered vector of Boolean operators 2006. The Boolean operator NOT 2007 has the highest precedence and the Boolean operator OR 2008 as the lowest precedence. For clarity and to ensure lack of ambiguity, parentheses are used in Boolean expression 2004 to make it clear that the Boolean operator AND operates on a first sub-expression indicating that the value of field C must be equal to 200 and a second sub-expression indicating that the log/event message must include either the phrase "mem_fault" or the phrase "mem_error." The log/event messages in the set of log/event messages which satisfy the criteria represented by Boolean expression 2004 are surrounded by the dashed curve 2010. As shown in FIG. 20B, where the sub-expression parentheses have been inadvertently omitted from criteria expression 2004, the meaning of the criteria expression is changed, because the AND operator has higher precedence than OR, and now specifies that for the rule to be applicable to a log/event message, the field C must have a value of 200 and the message must contain the phrase "mem_error" or, alternatively, the message must contain the phrase "mem_fault." The messages in the set of messages 2002 for which the criteria expression shown in FIG. 20B returns the value TRUE are surrounded by dashed curves, such as dashed curve 2012 in FIG. 20B. The messages for which the criteria expression without sub-expression parentheses evaluates to TRUE can be seen to be quite different than the messages for which the criteria expression shown in FIG. 20A returns the value TRUE. This type of error is common, both for human rule constructors as well as for human programmers. There are many other types of examples of common errors that can drastically alter the set of log/event messages to which an improperly specified rule applies.

Because of the many problems associated with message-processing rules, message-processing rules tend not to be used to the extent that they could be used for control of log/event-message systems. As a result, log/event-message systems often fail to carry out many of the initial-log/event-message-processing steps that would increase the efficiency of log/event-message systems and that would provide fine-grain control of log/event-message systems to facilitate desired distributed-computer-system management-and-administration operations and tasks. The currently disclosed methods and systems are directed to improving log/event-message systems by addressing problems associated with the specification of message-processing rules and with application of message-processing rules to high volumes of log/event messages.

The currently disclosed methods and systems rely on accurate generation of log/event-message types during initial log/event-message processing. Certain currently available log/event-message systems already employ log/event-message-type-generation methods for various reasons, including for log/event-message compression. For those log/event-message systems that do not already included log/event-message-type generation methods, such methods can be incorporated into message collectors and/or message-ingestion-and-processing systems in order to support the currently disclosed methods and systems for specifying message-processing rules and for applying message-processing rules.

Figure 21A:
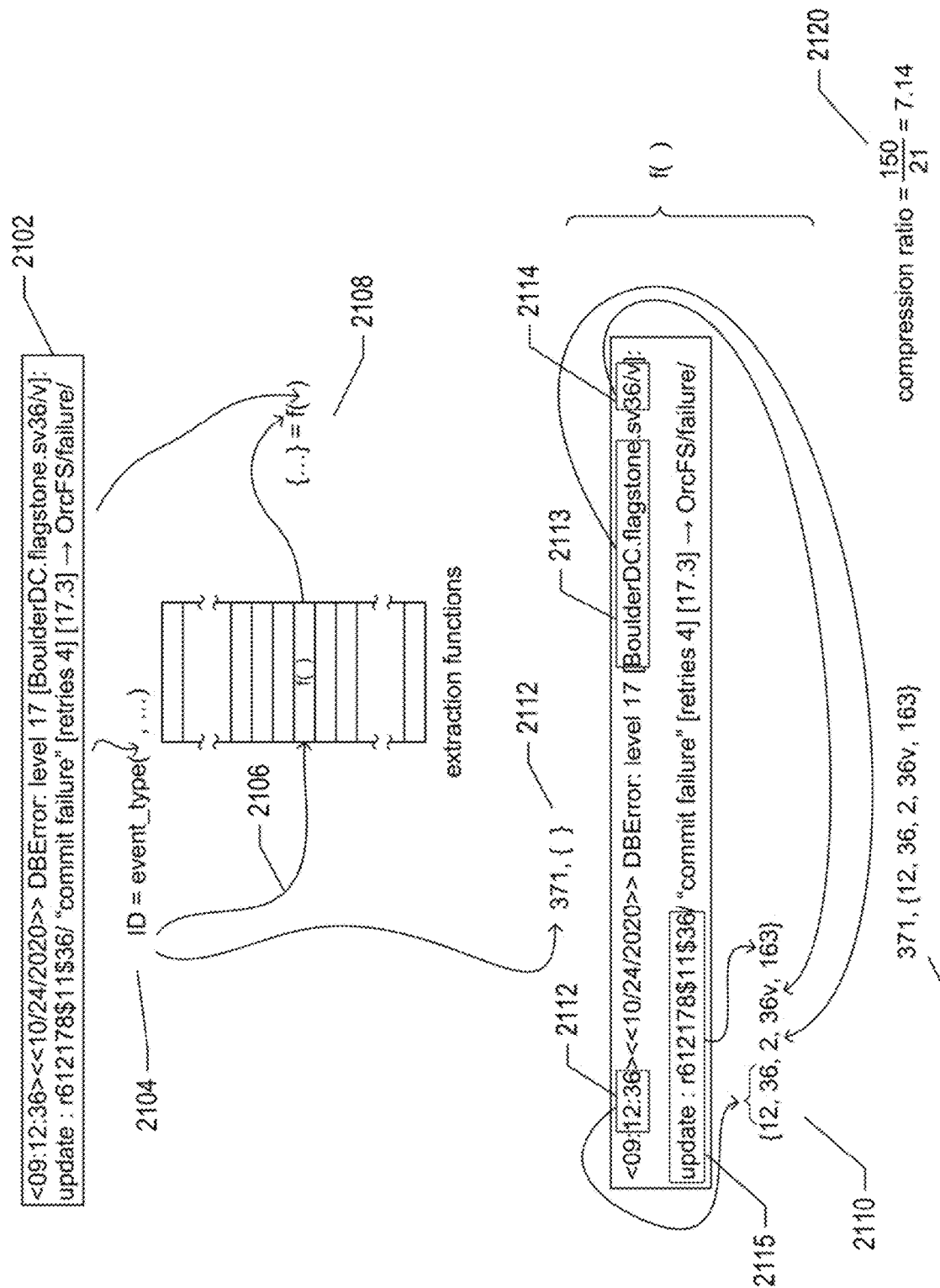
FIGS. 21A-B illustrate a log/event-message-type generation method.
Figure 21B:
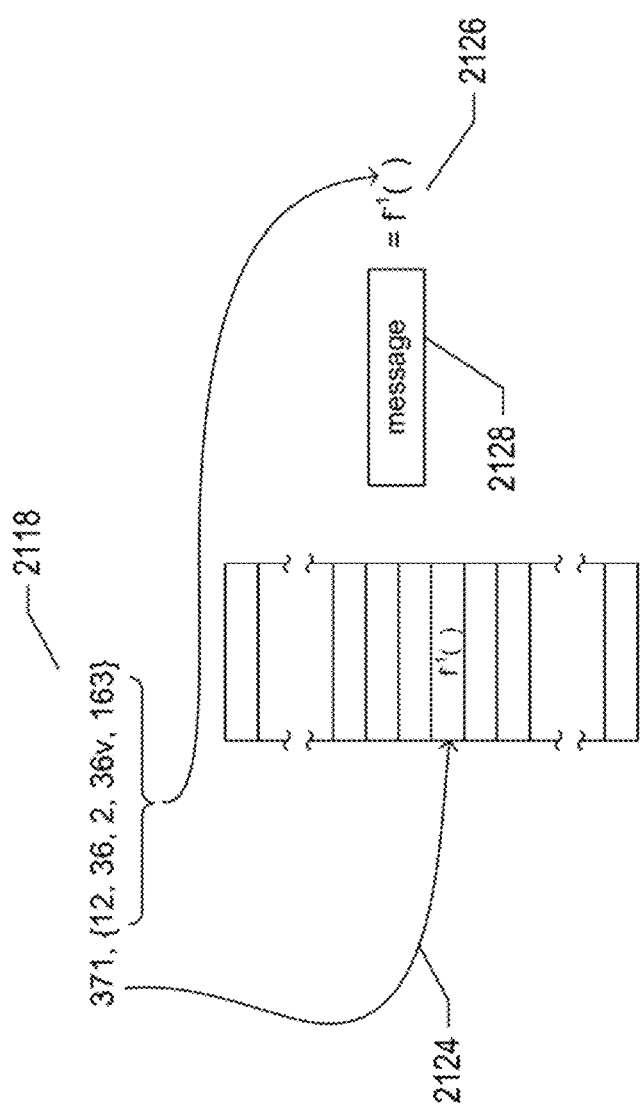

FIGS. 21A-B illustrate a log/event-message-type generation method. A hypothetical log/event message 2102 is shown at the top of FIG. 21A. As is typical for log/event messages, log/event message 2102 includes numerous formatted fields and phrases with significant meanings that cannot be discerned from the contents of the log/event message, alone. Either by automated, semi-automated, or manual means, a log/event message can be processed to determine a message type, referred to below as an "event type," corresponding to the message and to determine a list of numeric values and/or character strings that correspond to variables within a log/event message. In other words, log/event messages are associated with types and log/event messages contain static and relatively static portions with low information content and variable portions with high information content. As shown in FIG. 21 A, log/event message 2102 can be automatically processed 2104 to generate an event type, referred to as "ID" in FIGS. 21A-B. This processing is encapsulated in the function event_type( ) Implementation of the function event_type( ) can vary, depending on the distributed computing systems that generate the log/error messages. In certain cases, relatively simple pattern-matching techniques can be used, along with regular expressions, to determine the event type for a given log/error message. In other implementations, a rule-based system or a machine-learning system, such as a neural network, can be used to generate an event type for each log/error message and/or parse the log/error message. In certain cases, the event type may be extracted from an event-type field of event messages as a numerical or character-string value. The event type can then be used, as indicated by curved arrow 2106 in FIG. 21A, to select a parsing function $f()$ for the event type that can be used to extract the high-information-content, variable values from the log/event message 2108. The extracted variable values are represented, in FIG. 21A and subsequent figures, by the notation "{ ... }," or by a list of specific values within curly brackets, such as the list of specific values "{12, 36, 2, 36v, 163}" 2110 shown in FIG. 21A. As a result, each log/event message can be alternatively represented as a numerical event type, or identifier, and a list of 0, 1, or more extracted numerical and/or character-string values 2112. In the lower portion of FIG. 21A, parsing of log/event message 2102 by a selected parsing or extraction function $f()$ is shown. The high-information variable portions of the log/event message are shown within rectangles 2112-2115. These portions of the log/event message are then extracted and transformed into the list of specific values "{12, 36, 2, 36v, 163}" 2110. Thus, the final form of log/event message 2102 is an ID and a compact list of numeric and character-string values 2118, referred to as an "event tuple." As shown in FIG. 21B, there exists an inverse process for generating the original log/error message from the expression 2118 obtained by the compression process discussed above with reference to FIG. 21A. The event type, or ID, is used to select, as indicated by curved arrow 2124, a message-restoration function $f^{-1}()$ which can be applied 2126 to the expression 2118 obtained by the event-tuple-generation process to generate the original message 2128. In certain implementations, the decompressed, or restored, message may not exactly correspond to the original log/event message, but may contain sufficient information for all administration/management needs. In other implementations, message restoration restores the exact same log/event message that was compressed by the process illustrated in FIG. 21A.

A variety of techniques and approaches to generating or implementing the above-discussed event_type() function and extraction and message-restoration functions $f()$ and $f^{-1}()$ are possible. In certain cases, these functions can be prepared manually from a list of well-understood message types and message formats. Alternatively, these functions can be generated by automated techniques, including clustering techniques, or implemented by machine-learning techniques.

Figure 22A:
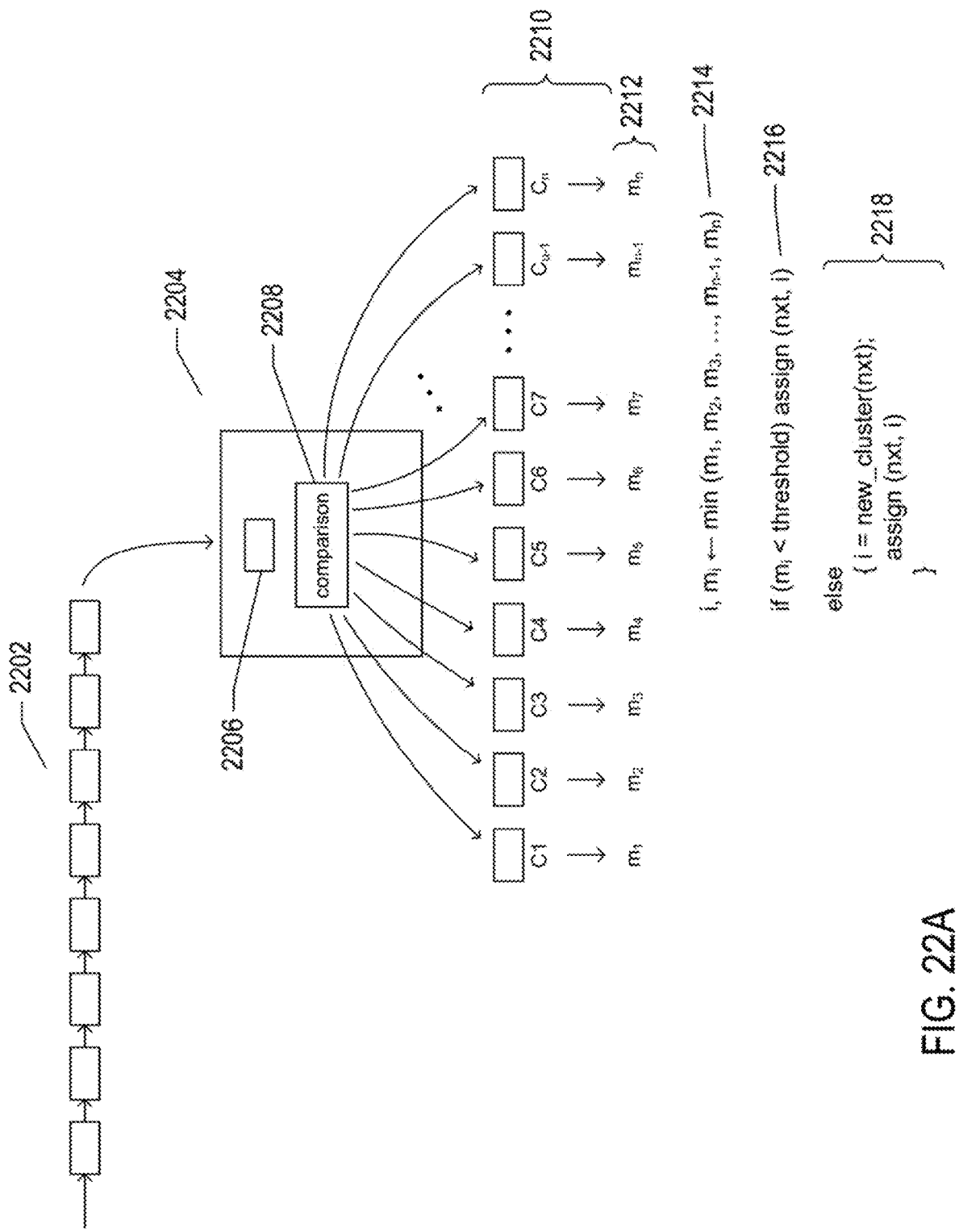
FIGS. 22A-C illustrate a clustering technique for generating an event_type( ) function and extraction and message-restoration functions $f( )$ and $f^{-1}( )$.
Figure 22B:
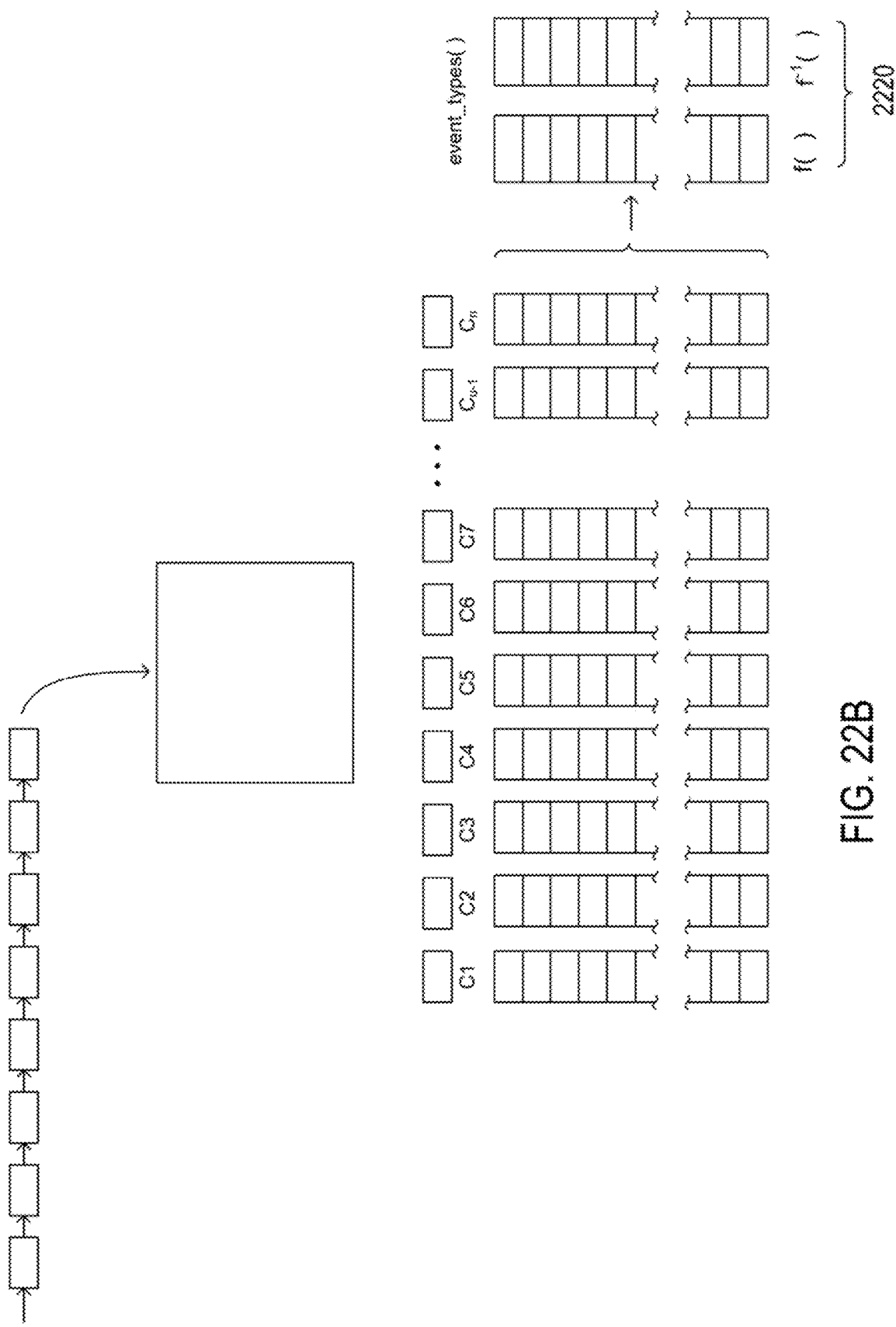
Figure 22C:
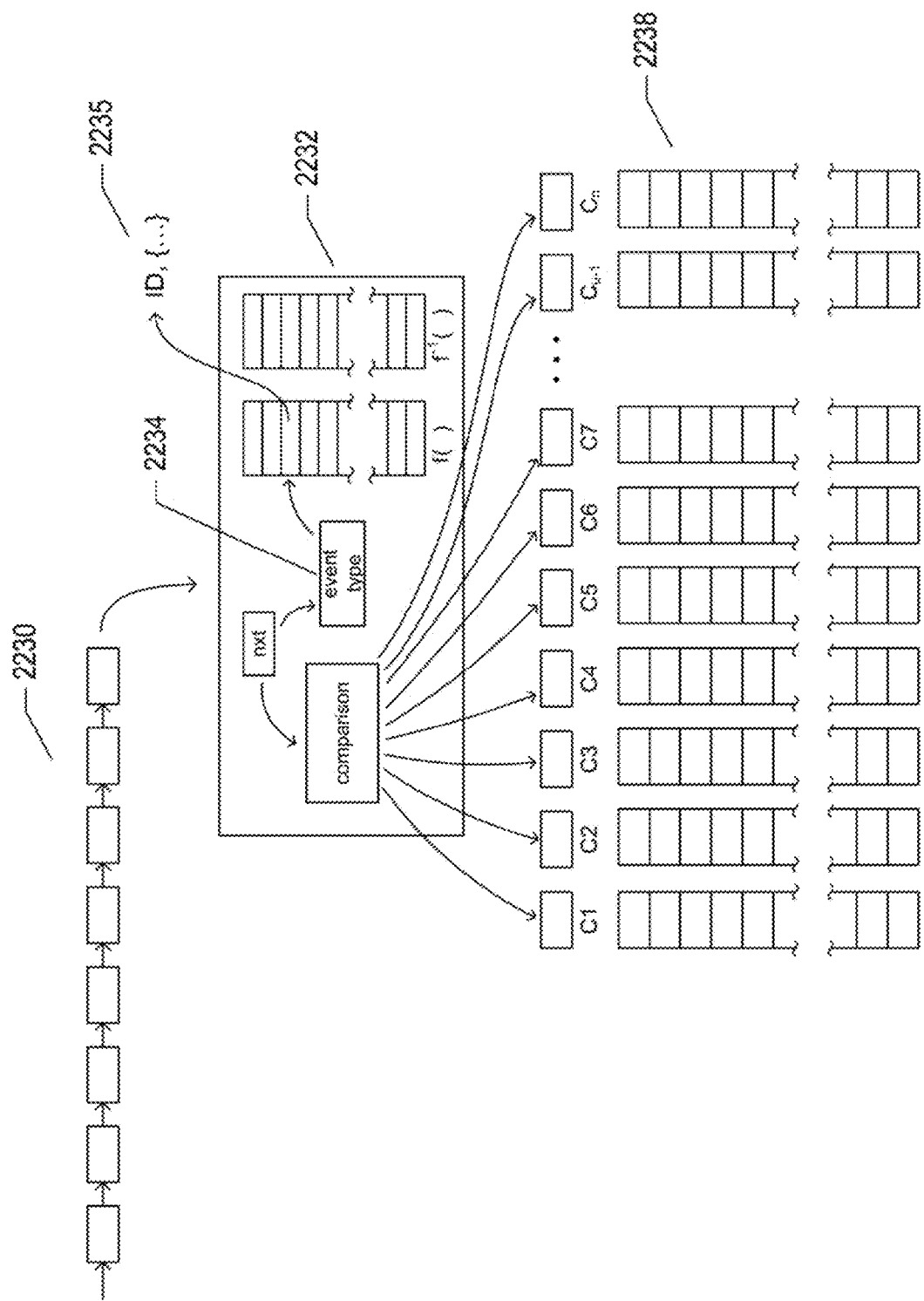

FIGS. 22A-C illustrate a clustering technique for generating an event_type() function and extraction and message-restoration functions $f()$ and $f^{-1}()$.

As shown in FIG. 22A, incoming log/event messages 2202 are input sequentially to a clustering system 2204. Each message 2206 is compared, by a comparison function 2208, to prototype messages representative of all of the currently determined clusters 2210. Of course, initially, the very first log/event message becomes the prototype message for a first cluster. A best comparison metric and the associated cluster are selected from the comparison metrics 2212 generated by the comparison function 2214. An example shown in FIG. 22A, the best comparison metric is the metric with the lowest numerical value. In this case, when the best comparison metric is a value less than a threshold value, the log/event message 2206 is assigned to the cluster associated with the best comparison metric 2216. Otherwise, the log/event message is associated with the new cluster 2218. As shown in FIG. 22B, this process continues until there are sufficient number of log/event messages associated with each of the different determined clusters, and often until the rate of new-cluster identification falls below a threshold value, at which point the clustered log/event messages are used to generate sets of extraction and message-restoration functions $f()$ and $f^{-1}()$ 2220. Thereafter, as shown in FIG. 22C, as new log/event messages 2230 are received, the fully functional clustering system 2232 generates the event-type/variable-portion-list expressions for the newly received log/event messages 2234-2235 using the current event_type() function and sets of extraction and message-restoration functions $f()$ and $f^{-1}()$, but also continues to cluster a sampling of newly received log/event messages 2238 in order to dynamically maintain and evolve the set of clusters, the event_type() function, and the sets of extraction and message-restoration functions $f()$ and $f^{-1}()$.

Figure 23A:
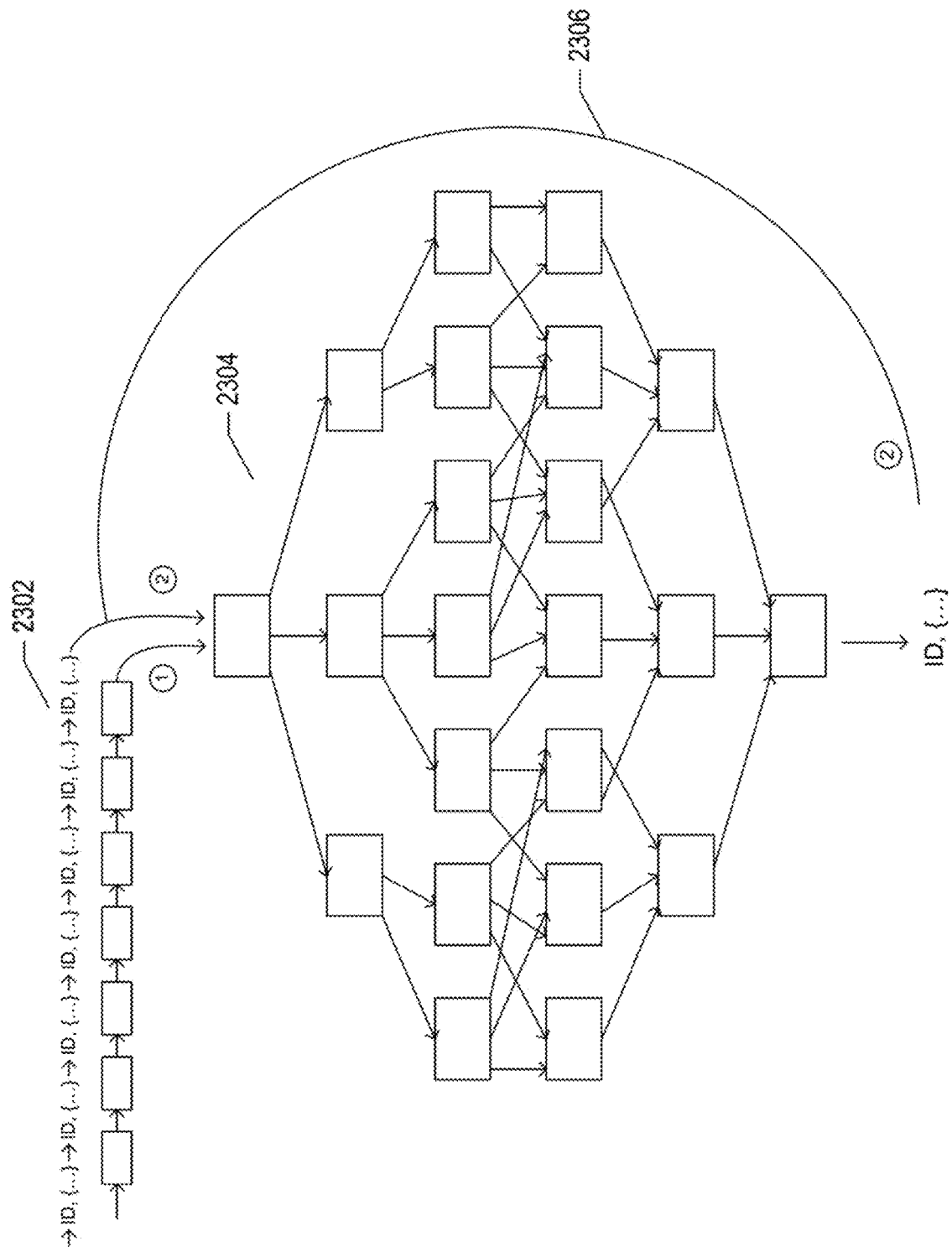
FIGS. 23A-B illustrate a machine-learning technique for generating an event_type( ) function and extraction and message-restoration functions $f( )$ and $f^{-1}( )$.
Figure 23B:
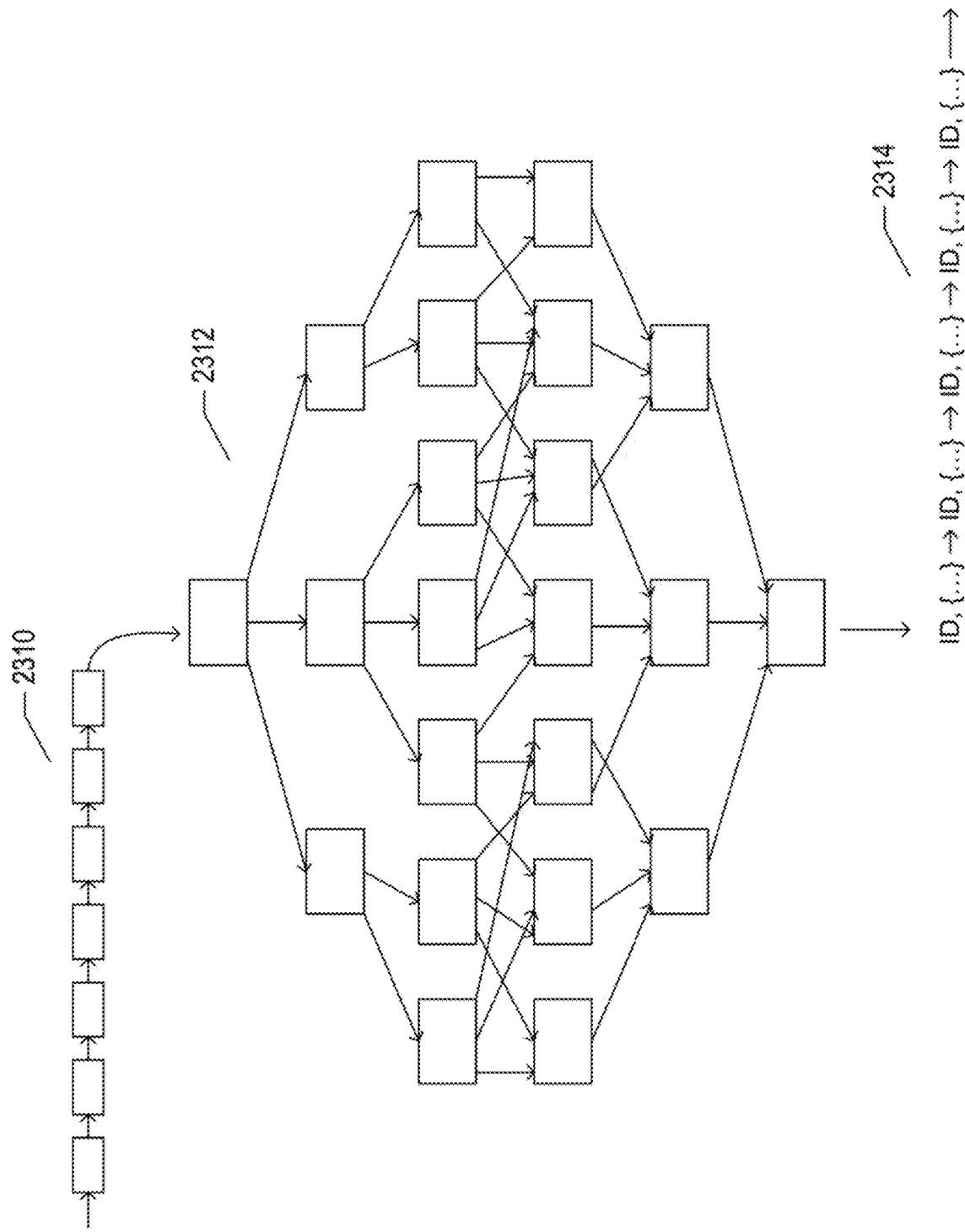

FIGS. 23A-B illustrate a machine-learning technique for generating an event_type() function and extraction and message-restoration functions $f()$ and $f^{-1}()$. As shown in FIG. 23A, a training data set of log/event messages and corresponding compressed expressions 2302 is fed into a neural network 2304, which is modified by feedback from the output produced by the neural network 2306. The feedback-induced modifications include changing weights associated with neural-network nodes and can include the addition or removal of neural-network nodes and neural-network-node levels. As shown in FIG. 23B, once the neural network is trained, received log/event messages 2310 are fed into the trained neural network 2312 to produce corresponding compressed-message expressions 2314. As with the above-discuss clustering method, the neural network can be continuously improved through feedback-induced neural-network-node-weight adjustments as well as, in some cases, topological adjustments.

FIGS. 24A-C illustrate one approach to extracting fields from a log/event message. Log/event messages may be understood as containing discrete fields, but, in practice, they are generally alphanumeric character strings. An example log/event message 2402 is shown at the top of FIG. 24A. The five different fields within the log/event message are indicated by labels, such as the label "timestamp" 2404, shown below the log/event message. FIG. 24B includes a variety of labeled regular expressions that are used, as discussed below with reference to FIG. 24C, to extract the values of the discrete fields in log/event message 2402. For example, regular expression 2406 follows the label YEAR 2408. When this regular expression is applied to a character string, it matches either a four-digit indication of a year, such as "2020," or a two-digit indication of the year, such as "20." The string "\d\d" matches two consecutive digits. The "(?>" and ")" characters surrounding the string "\d\d" indicates an atomic group that prevents unwanted matches to pairs of digits within strings of digits of length greater than two. The string "{1, 2}" indicates that the regular expression matches either one or two occurrences of a pair of digits. A labeled regular expression can be included in a different regular expression using a preceding string "%{" and a following symbol "}," as used to include the labeled regular expression MINUTE (2410 in FIG. 24B) in the labeled regular expression TIMESTAMP_ISO8601 (2412 in FIG. 24B). There is extensive documentation available for the various elements of regular expressions.

Grok parsing uses regular expressions to extract fields from log/event messages. The popular Logstash software tool uses grok parsing to extract fields from log/event messages and encode the fields according to various different desired formats. For example, as shown in FIG. 24C, the call to the grok parser 2420 is used to apply the quoted regular-expression pattern 2422 to a log/event message with a format of the log/event message 2402 shown in FIG. 24A, producing a formatted indication of the contents of the fields 2424. Regular-expression patterns for the various different types of log/event messages can be developed to identify and extract fields from the log/event messages input to message collectors. When the grok parser unsuccessfully attempts to apply a regular-expression pattern to a log/event message, an error indication is returned. The Logstash tool also provides functionalities for transforming input log/event messages into event tuples. The regular-expression patterns, as mentioned above, can be specified by log/event-message-system users, such as administrative personnel, can be generated by user interfaces manipulated by log/event-message-system users, or may be automatically generated by machine-learning-based systems that automatically develop efficient compression methods based on analysis of log/event-message streams.

A particular approach to generating a log/event-message types or log/event-message identifier for each log/event message received by the log/event-message system can be selected from a variety of different approaches and combinations of approaches. Once a log/event-message types or log/event-message identifier has been generated for a received log/event message, the log/event message can be represented in event-tuple form. Event-tuple form comprises a log/event-message type followed by an ordered list of extracted variable-field values, such as the event-tuple form "106, {'2020-07-30', '13:17:39—08:00', 'INFO', '[TransApp]', 'T-comp', 'ID-a3651f8'}" for the example log/event message 2402 shown at the top of FIG. 24A, where the log/event-message type is 106. Many alternative approaches to generating an event-tuple form of a log/event message are, of course, possible.

Figure 25A:
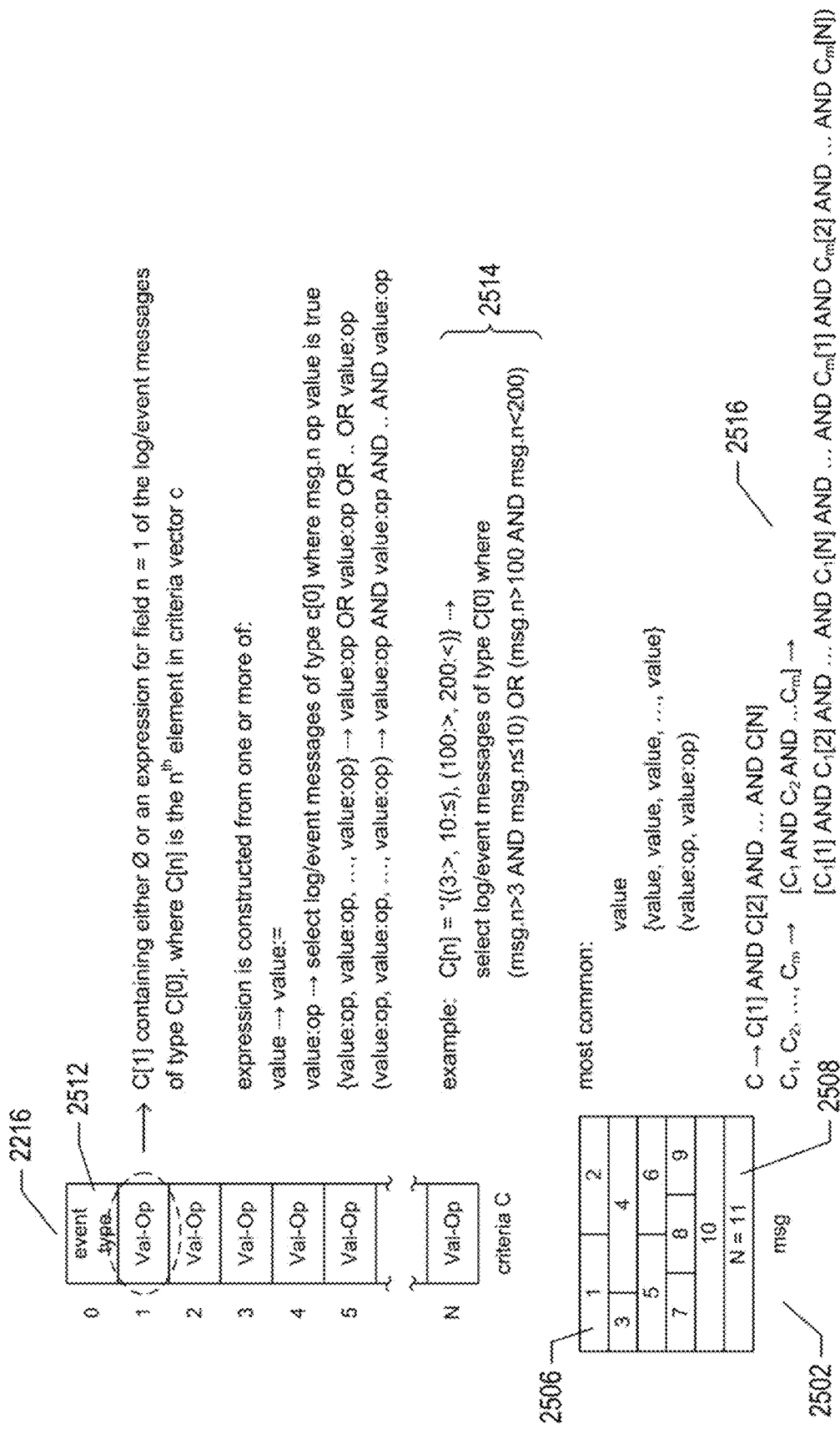
FIGS. 25A-B illustrate the criteria tuple.
Figure 25B:
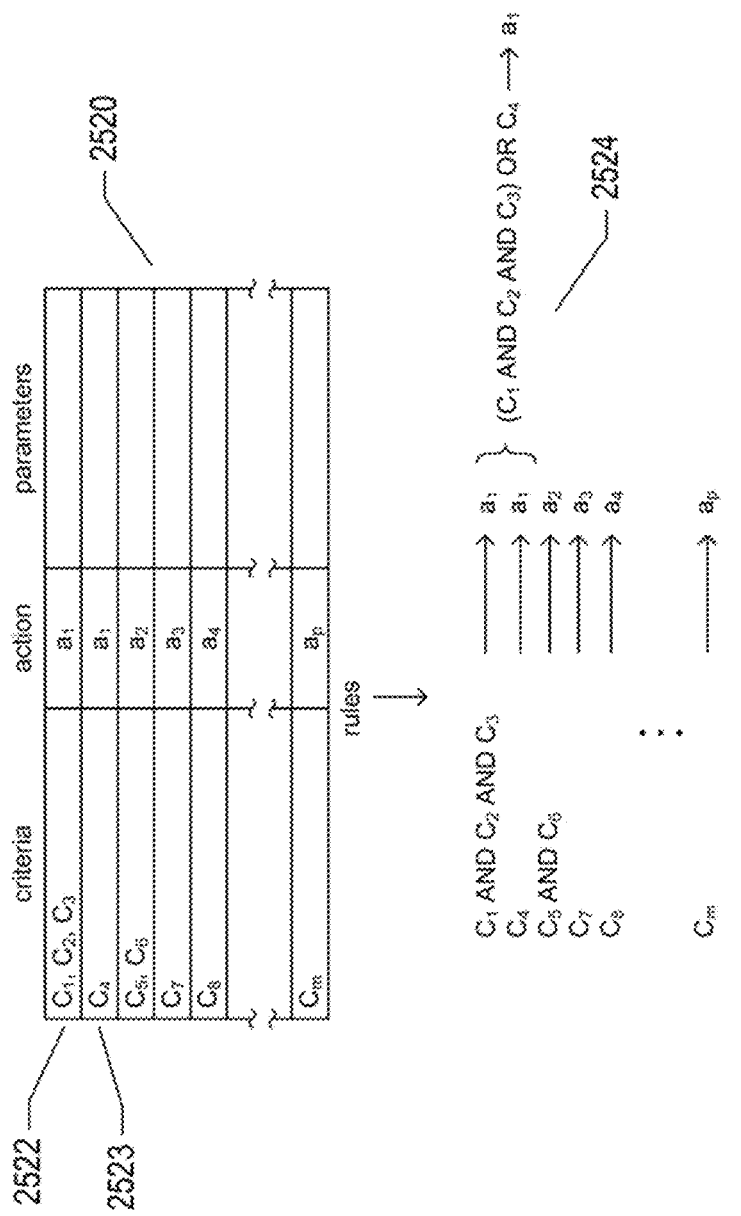

FIGS. 25A-B illustrate the criteria tuple. Given that event types are generated for each log/event message received by a message collector or a message-ingestion-and-processing system, and that event-type-specific templates or functions are generated for extraction of field values from a log/event messages of specific event types, a criteria tuple can be generated for a specific event type to efficiently encode a Boolean criteria expression for a message-processing rule. Criteria tuples, having event-type-constrained formats, can be more accurately and easily constructed than general Boolean expressions. Thus, as shown in FIG. 25A, for a particular type of log/event message 2502, one or more criteria tuples, such as criteria tuple 2504, can be constructed to encode the criteria for applicability of a rule to log/event messages of one or more particular event types. Each variable field in the log/event messages of the event type are associated with an indication of the order of the field within the sequence of fields in the log/event messages, with the order indications comprising integer values monotonically increasing from the value 1 associated with the first variable field 2506 to the numeric value N associated with the final variable field 2508. A criteria tuple 2510 includes N elements, where N is equal to the number of variable fields in log/event messages of the event type associated with the criteria tuple. The event type is encoded in the first element of the criteria tuple 2512 with index 0. An expression for a variable field in log/event messages of the event type may be included in the element with index equal to the integer value associated with the variable field that specified the order of the field in log/event messages. Thus, there may be an expression associated with each variable field in the log/event messages of the event type. However, an element of the criterion tuple with an index selected from the range [1, N] may alternatively include a null value to indicate the absence of an expression for a particular field. A field expression is constructed from: (1) sub-expression-delimiter tokens {,}, (, and); (2) value/operator-pair separator token ":"; (3) relational-comparison-operator tokens=, !=, <, <=, >, and >; and (4) field values expressed as character strings. The simplest field expression is a character-string-encoded value s for a field, such as the character string "mem_fault." This simplest type of field expression is logically automatically expanded to "s:=", meaning that the expression requires that the value of the field with the numeric value of the index of the element of the criteria tuple containing the expression must be equal to s. The second simplest type of field expression comprises a value/relational-comparison-operator pair, such as "s:op", where s is a value that can be included in the corresponding field of a log/event message and op is one of the relational-comparison-operator tokens. A values/relational-comparison-operator pair means that, when a log/event-message includes the value v in the corresponding field $f$, the expression v op s must evaluate to TRUE. Two or more comma-separated value/relational-comparison-operator pairs within parentheses, such as "(s1:op1, s2:op2, s3:op3)", means that all of the value/relational-comparison-operator pairs must evaluate to TRUE or, in other words, that the commas in the comma-separated value/relational-comparison-operator pairs are each replaced by the Boolean operator AND, such as "s1:op1 AND s2:op2 AND s3:op3". Two or more comma-separated value/relational-comparison-operator pairs within curly brackets, such as "{s1:op1, s2:op2, s3:op3}", means that at least one of the value/relational-comparison-operator pairs must evaluate to TRUE or, in other words, that the commas in the comma-separated value/relational-comparison-operator pairs are each replaced by the Boolean operator OR, such as "s1:op1 OR s2:op2 OR s3:op3". FIG. 25A provides an example 2514 of the expansion of the field expression "{(3:>, 10:<=), (100:>, 200:<)}" stored in element n of a criteria vector c, c[n], into a corresponding Boolean expression "(msg.n>3 AND msg.n<=10) OR (msg.n>100 AND msg.n<200)," where "msg.n" refers to the $n^{th}$ variable field in the log/event message msg. A criteria vector c is expanded into a full Boolean expression by joining field expressions together with the AND Boolean operator. As shown in expressions 2516 at the bottom of FIG. 25A, a criteria vector c is expanded as "c[1] AND c[2] AND ... AND c[N]." A comma-separated set of criteria vectors $c_1, c_2, \ldots, c_m$ is equivalent to "$c_1$ AND $c_2$ AND ... AND $c_m$," which is further expanded as "$c_1$[1] AND $c_1$[2] AND ... AND $c_1$[N] AND $c_2$[1] AND $c_2$[2] AND ... AND $c_2$[N] AND ... AND $c_m$[1] AND $c_m$[2] AND ... AND $c_m$[N]."

FIG. 25B shows a rules table 2520 equivalent to the rules table discussed above with reference to FIG. 19. As with the rules table discussed above with reference to FIG. 19, rules table 2520 represents each message-processing rule has a row, with the three columns corresponding to the criteria, action, and parameters portions of each rule. The criteria section of a particular rule consists of one or more criteria vectors, in the rules table 2520 shown in FIG. 25B, rather than a complex Boolean expression, as in the case of the rules table shown in FIG. 19. The rules table shown in FIG. 25B is specific to a particular event type. There may either be a separate rules table for each event type or an additional event-type column can be added to a single rules table containing rules for all of the different event types. Two or more rows of the rules table 2520 can be combined using OR Boolean operators to generate a single criteria expression for log/event messages of the event type associated with the rules table. In the example shown in FIG. 25B, since the first and second rules 2522-2523 both include the same action $a_1$, they can be replaced by a single rule with the criteria (c1 AND c2 and c3) OR c4, as indicated by expression 2524 in FIG. 25B, provided that the same parameters are associated with the first and second rules. Thus, even though the elements of a criteria vector are combined using the Boolean operator AND and even though the criteria vectors in a comma-separated list of criteria vectors are combined using the Boolean operator AND, a general criteria expression that includes subexpressions joined by OR can be constructed using multiple rows of the rules table.

Use of the criteria vectors, rather than general Boolean expressions, for specifying the criteria for applicability of a rule provides many advantages. First, the format of the criteria vectors in a rules table that uses criteria vectors constrains construction of a field sub-expression to include only constraints on the values of a particular field of a given event type. This greatly simplifies construction of the criteria portion of rules, and helps ensure that difficult problems related to attempting to compare fields with different types of values cannot arise. Use of criteria vectors also facilitates straightforward, simple-to-use graphical tools that users can employ to create message-processing rules.

Figure 26A:
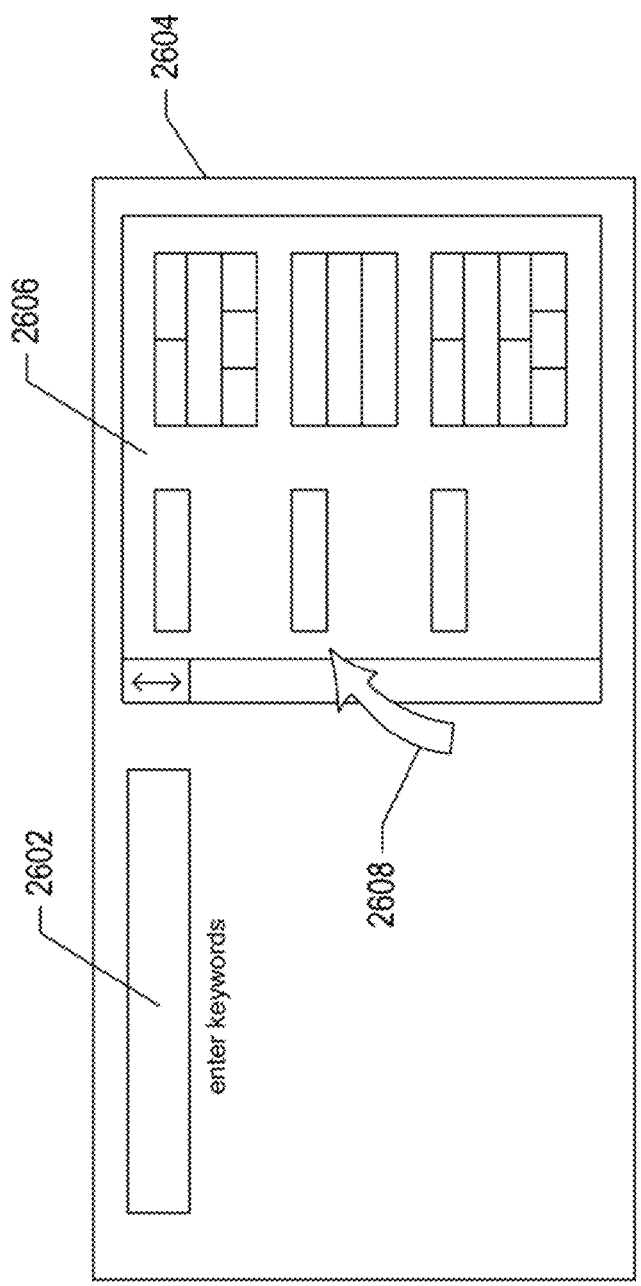
FIGS. 26A-C illustrate portions of a graphical-user-interface ("GUI") rule-generation tool that allows users to construct message-processing rules.
Figure 26B:
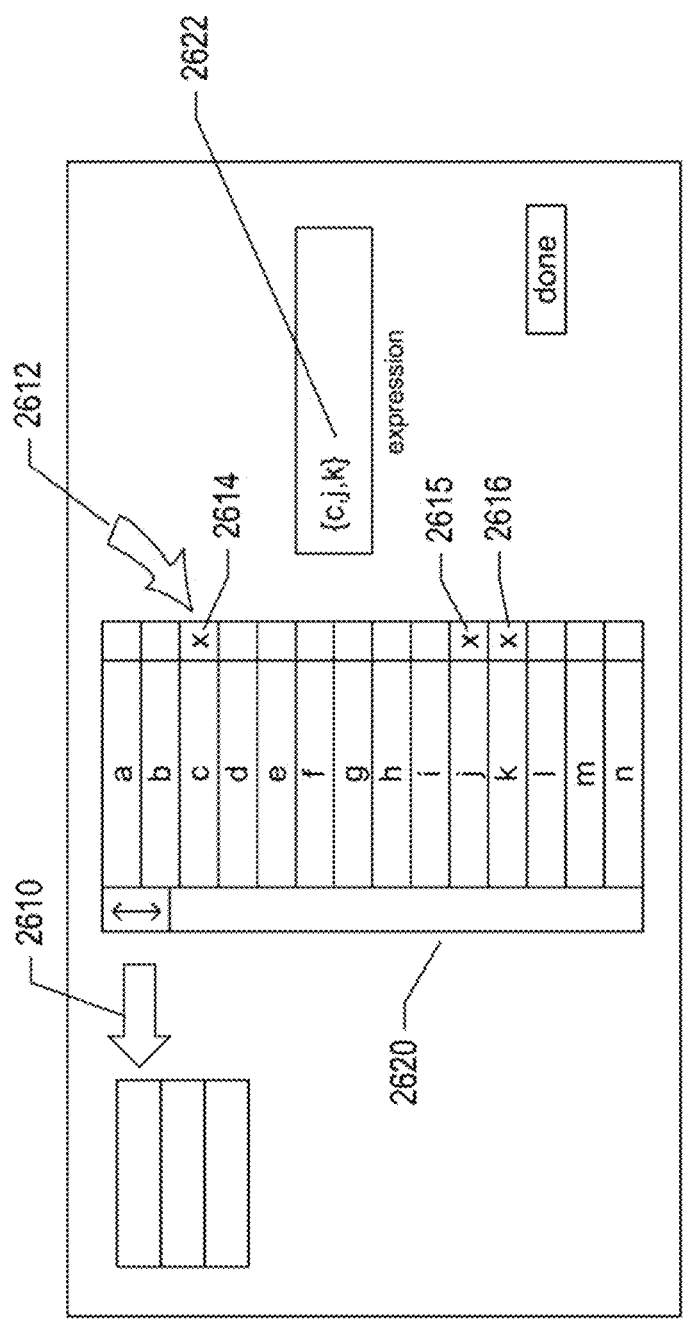
Figure 26C:
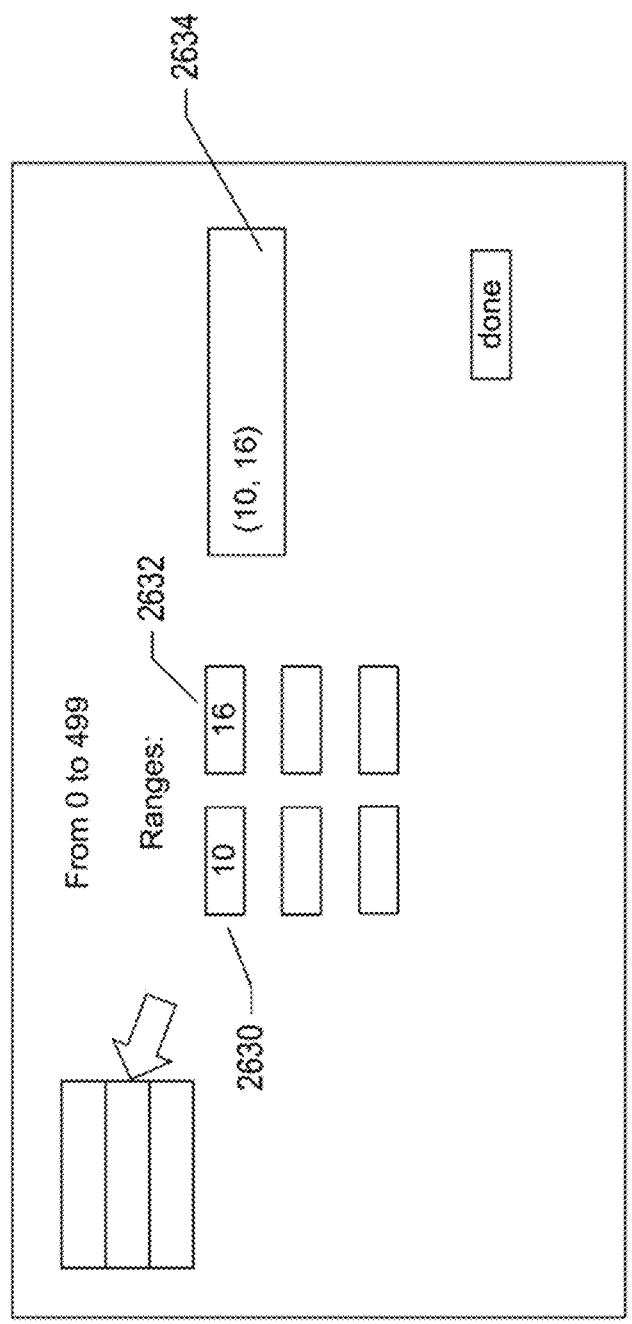

FIGS. 26A-C illustrate portions of a graphical-user-interface ("GUI") rule-generation tool that allows users to construct message-processing rules. The portions of the tool illustrated in FIGS. 26A-C are related to specifying the criteria for rule applicability. FIG. 26A illustrates the initial steps in specifying criteria for rule applicability. The user begins to enter keywords into a keyword-entry window 2602 of a first GUI screen 2604 and the rule-generation tool begins to search for event types associated with log/event messages that include the keywords, listing representations of the log/event messages in a scrollable event-type window area 2606. A user can then select a particular event type from this list, as represented by arrow 2608, in order to select the event type for a particular criteria vector. Additional GUI screens are then used to construct the criteria vector. As one example, the GUI screen shown in FIG. 26B allows a user to select a particular field of the log/event messages represented by the event type, as represented by arrow 2610, and then to select particular field values, as represented by arrow 2612 and the "X" symbols 2614-2616 from a scrollable list of possible field values 2620. A field expression 2622 is automatically generated from the selected values. As another example, the GUI screen shown in FIG. 26C allows a user to select ranges of values for a numerically valued field. In this example, the range of values [10, 16] is specified in numeric-entry windows 2630 and 2632 and a field expression 2634 has been automatically generated for this range. These types of GUI screens can be provided to allow a user to construct arbitrarily complex field expressions and criteria vectors in a controlled manner that avoids inadvertent erroneous criteria expressions. The rule-construction tool can also employ an example set of log/event messages to illustrate, to a user, the subset of messages selected from the example set by application of one or more criteria vectors constructed by the user, enabling a user to fully understand the implications of the criteria portion of each specified rule. The rule-generation tool can even automatically generate criteria for rules by allowing a user to select specific log/event messages from a set of exemplary log/event messages.

Figure 27:
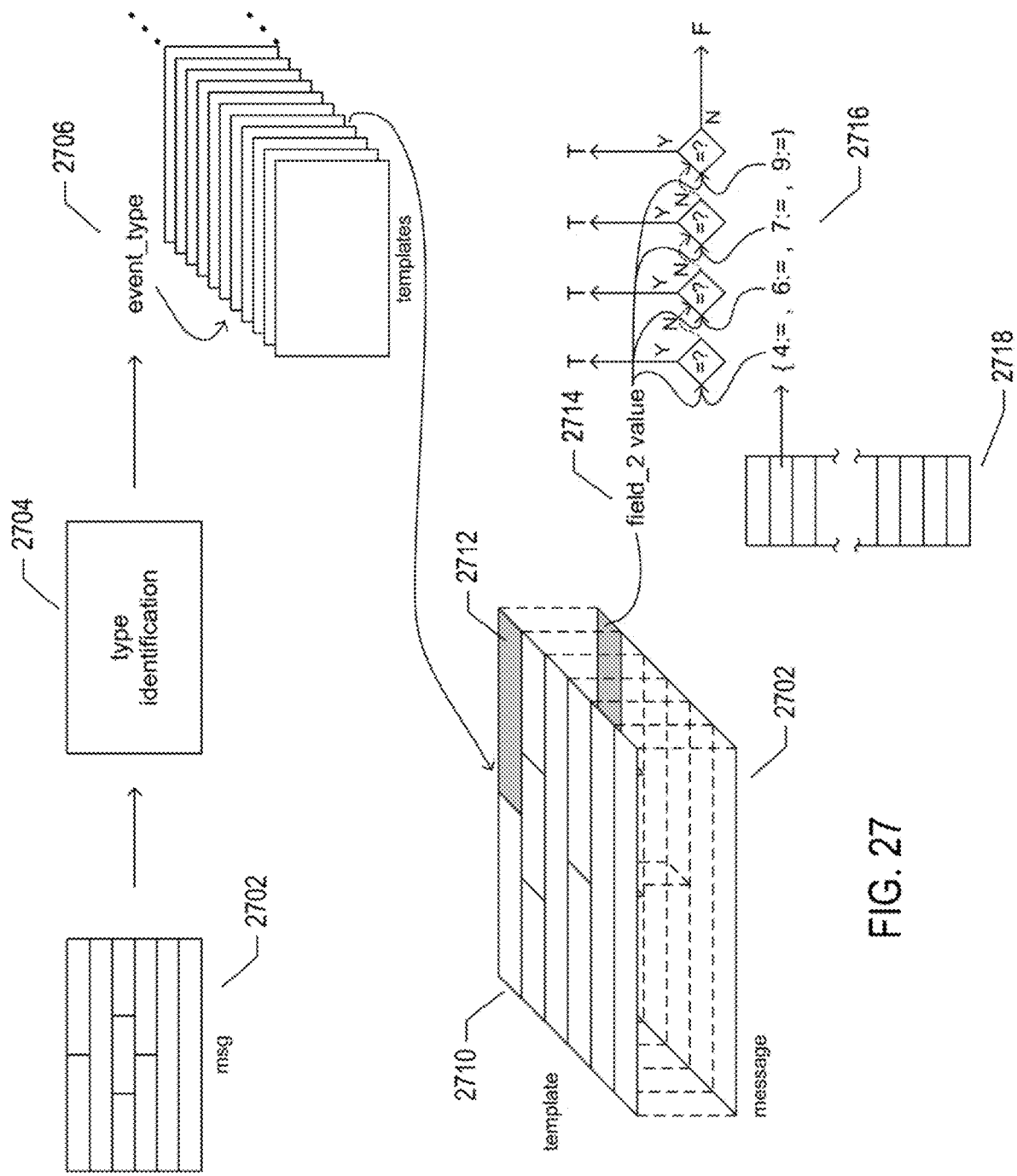
FIG. 27 illustrates how the currently disclosed methods and systems facilitate application of message-processing rules by message collectors and/or message-ingestion-and-processing systems.

FIG. 27 illustrates how the currently disclosed methods and systems facilitate application of message-processing rules by message collectors and/or message-ingestion-and-processing systems. An incoming log/event message 2702 is first processed by a type-identification method 2704, examples of which are provided above, to generate an event type 2706 for the received log/event message. The event type allows message-processing logic to select an appropriate template from a set of templates corresponding to different event types. The template can be thought of as a description of the variable fields and corresponding field types for log/event messages of the event type 2710 that is logically superimposed over the received message 2702 in order to extract the values from the variable fields. For example, in the example shown in FIG. 27, the template information for the second variable field 2712 can be used to extract the value of the second variable field 2714 from the received log/event message 2702. The extracted value can then be used to evaluate a field expression 2716 contained in a criteria vector 2718 for the event type as part of the process of determining whether or not the rule associated with the criteria vector is applicable to the receive log/event message. As discussed above, one implementation of the template is a set of field-value extraction routines. Alternative implementations may be based on grok parsing. The template-driven evaluation of field expressions and criteria vectors is far more efficient than repeated parsing of log/event messages.

Figure 28:
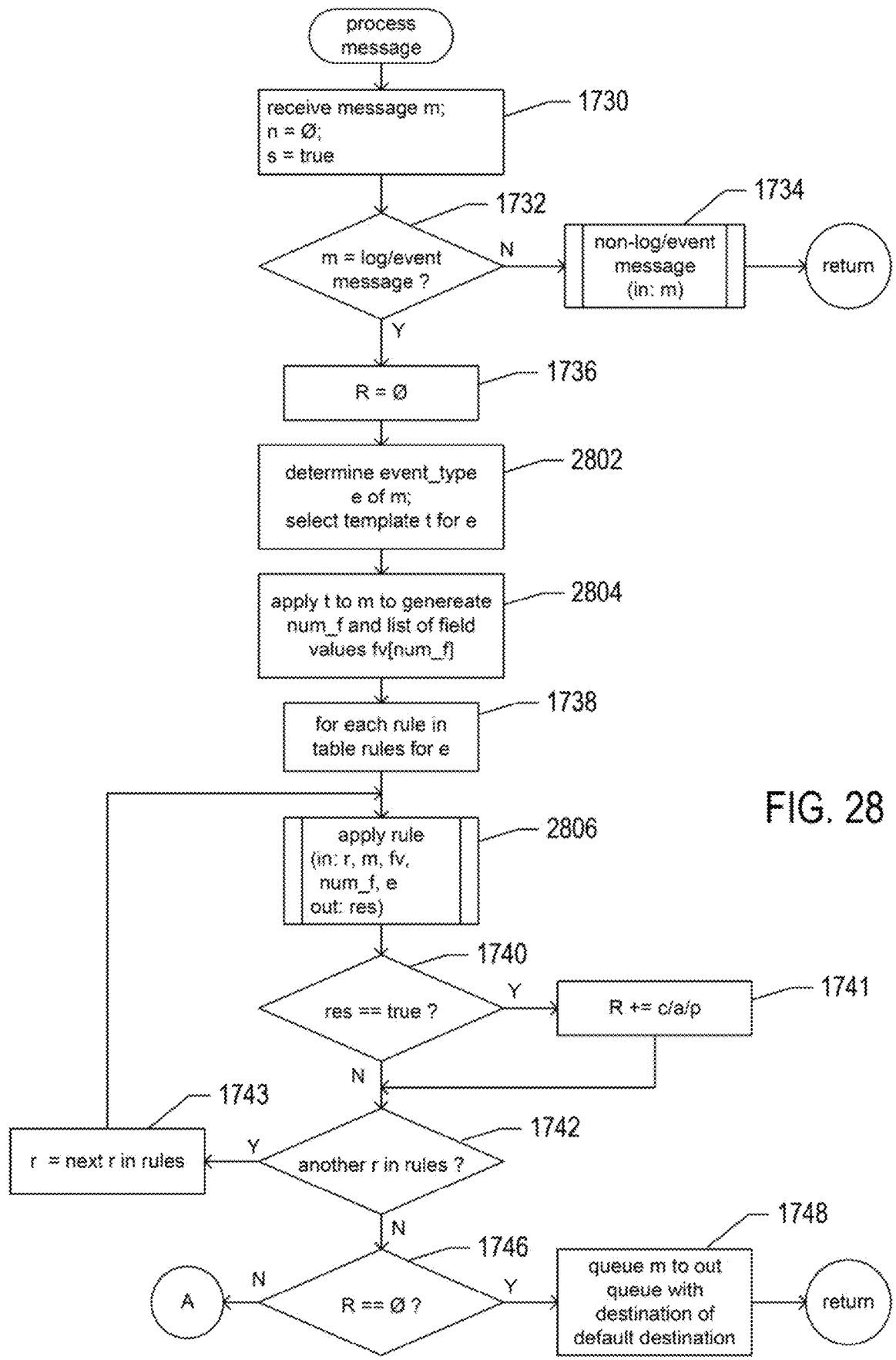
FIG. 28 shows alterations to the first portion of the routine "process message," shown in FIG. 17B, that incorporate an implementation of the currently disclosed methods and systems into a log/event-message processing system FIGS. 29A-E provide control-flow diagrams for the routine "apply rule," called in step 2806 of FIG. 28.

FIG. 28 shows alterations to the first portion of the routine "process message," shown in FIG. 17B, that incorporate an implementation of the currently disclosed methods and systems into a log/event-message processing system. Many of the steps in the control-flow diagram shown in FIG. 28 are identical to corresponding steps in FIG. 17B. These steps are labeled with the same numeric labels, in FIG. 28, as used to label them in FIG. 17B, and are not again discussed. New steps include steps 2802, 2804, and 2806. In step 2802, the improved routine "process message" determines the event type e of the received message m and selects the appropriate template t for event type e. In step 2804, the improved routine "process message" applies template t to the received message m to generate an indication of the number of fields num_f and a list of the values of these fields in the received message m, with the list of field values represented using array notation "fv[num_f]." As mentioned above, steps 2802 and 2804 together represent a more efficient way to obtain the field values for a received log/event message than currently used text-parsing-based methods. In step 2806, the improved routine "process message" calls a routine "apply rule" to determine the applicability of each rule in a set of rules for the event type e. Because the event type is known, only a subset of the total set of message-processing rules need to be evaluated, unlike in currently available message-processing logic, where all of the rules need to be evaluated for each received message.

FIGS. 29A-E provide control-flow diagrams for the routine "apply rule," called in step 2806 of FIG. 28. In step 2902, the routine "apply rule" receives a rule r, a log/event message m, a set of field values fv, a number of field values num_f, and an event type e. In step 2903, the routine "apply rule" sets a local set variable K to null. In the for-loop of steps 2904-2908, the routine "apply rule" considers each criteria vector c in the rule r. When the $0^{th}$ entry of the currently considered criteria vector c includes the event type e, the criteria vector is added to the set of criteria vectors stored in the set variable K, in step 2906. When, at the completion of the for-loop of steps 2905-2908, the set variable K contains no criteria vectors, as determined in step 2910, the routine "apply rule" returns a Boolean value of FALSE, in step 2911, since the rule r contains no criteria vectors that apply to received log/event message m. Otherwise, in the for-loop of steps 2914-2918, the routine "apply rule" calls the routine "apply criteria" for each criteria vector in the local set variable K. When the routine "apply criteria" returns a FALSE value, for a currently considered criteria vector c, as determined in step 2916, the routine "apply rule" returns the Boolean value FALSE, in step 2911. As discussed above, all of the criteria vectors in a rule are joined by the Boolean operator AND, so if any of these criteria vectors evaluate to FALSE, the entire rule evaluates to FALSE.

Figure 29A:
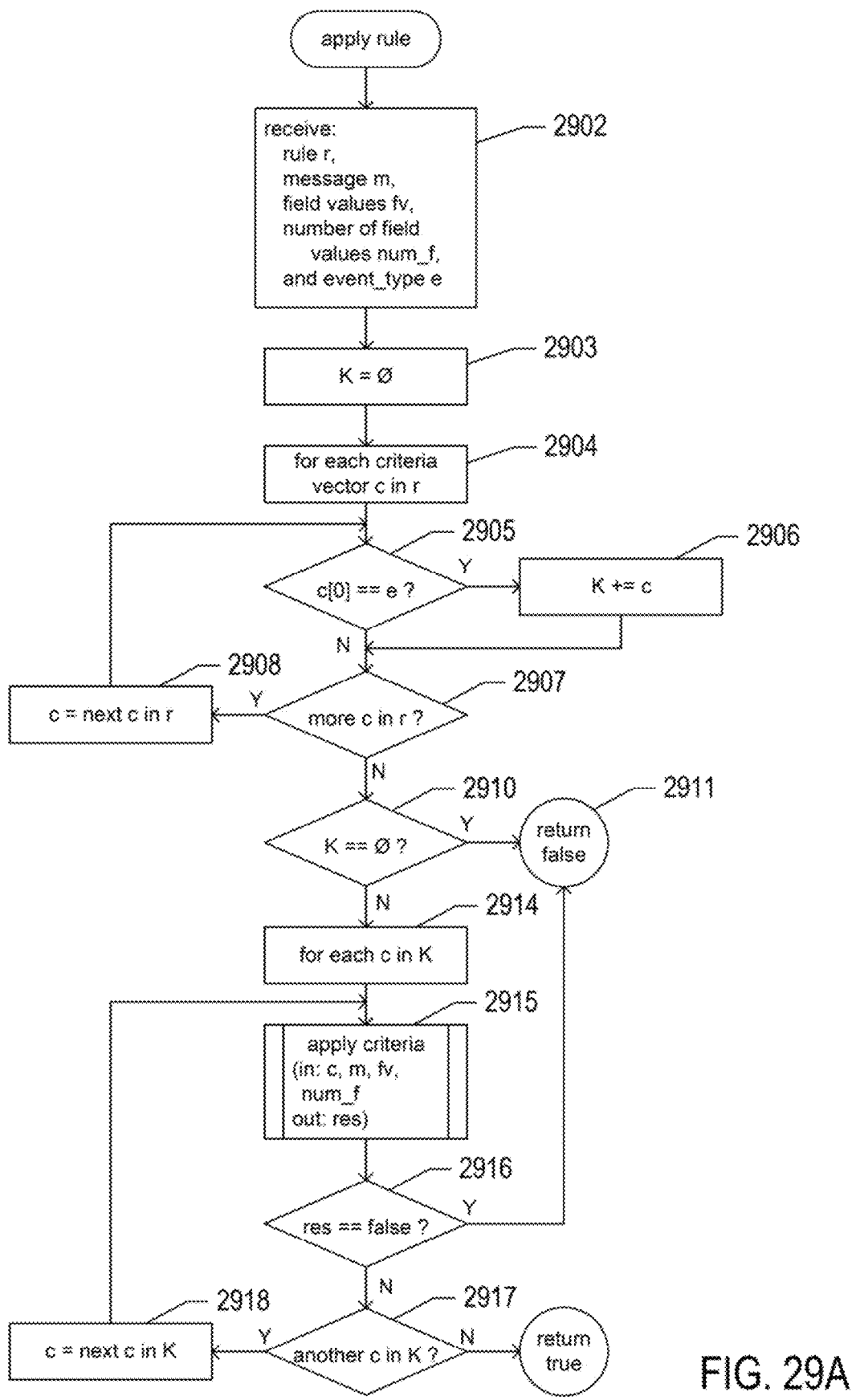
Figure 29B:
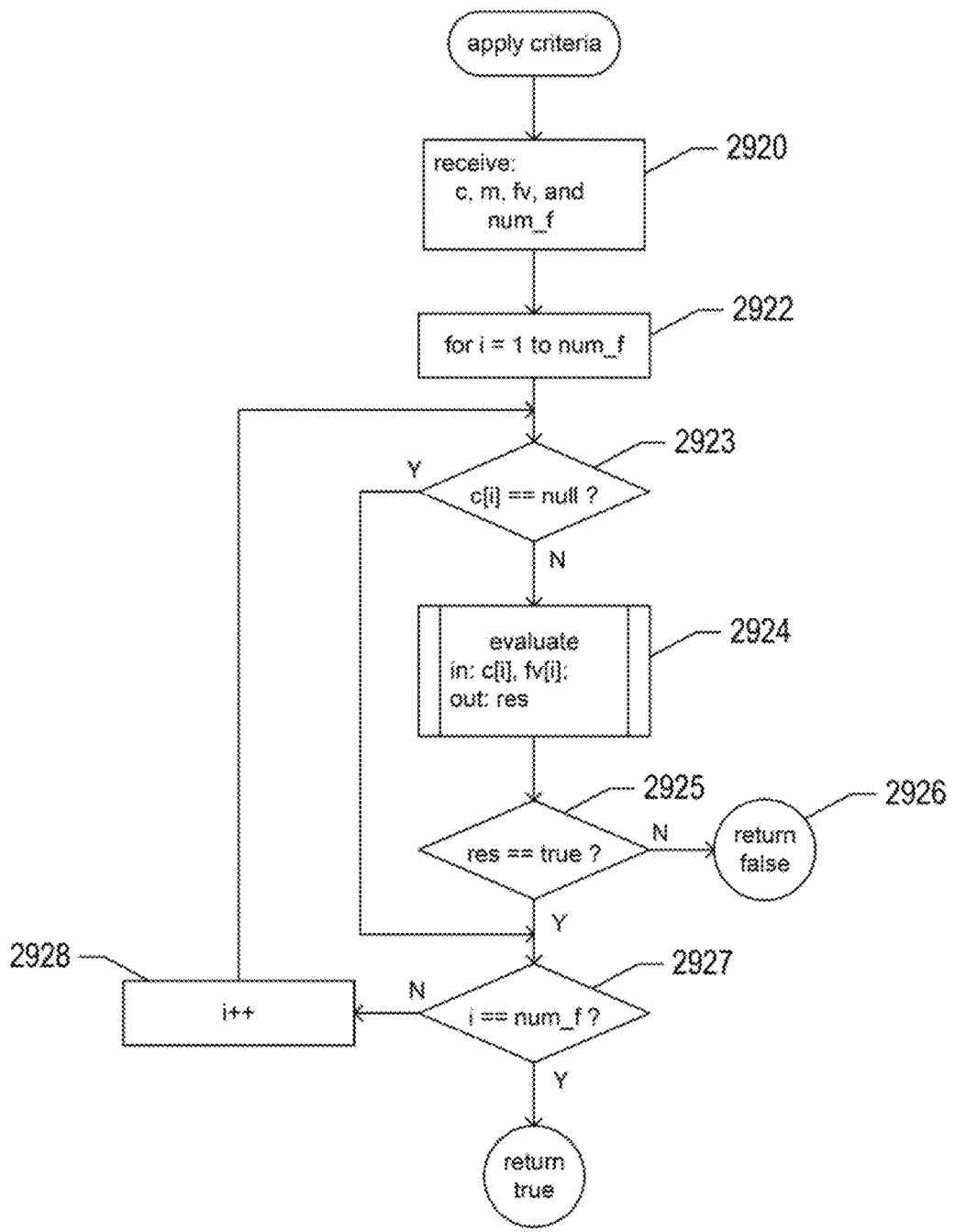

FIG. 29B provides a control-flow diagram for the routine "apply criteria," called in step 2915 of FIG. 29A. In step 2920, the routine "apply criteria" receives a criteria vector c, a log/event message m, a list, or array, of field values fv, and an indication of the number of field values num_f. In the for-loop of steps 2922-2928, the routine "apply criteria" calls the routine "evaluate," in step 2924, to evaluate each of the field-value expressions in the criteria vector c. If the evaluation of any field-value expression produces the Boolean value FALSE, as determined in step 2925, the routine "apply criteria" returns the value FALSE, in step 2926. As discussed above, all of the field-value expressions in a criteria vector are joined by the Boolean operator AND, so if any of these field-value expressions evaluate to FALSE, the entire criteria vector evaluates to FALSE.

Figure 29C:
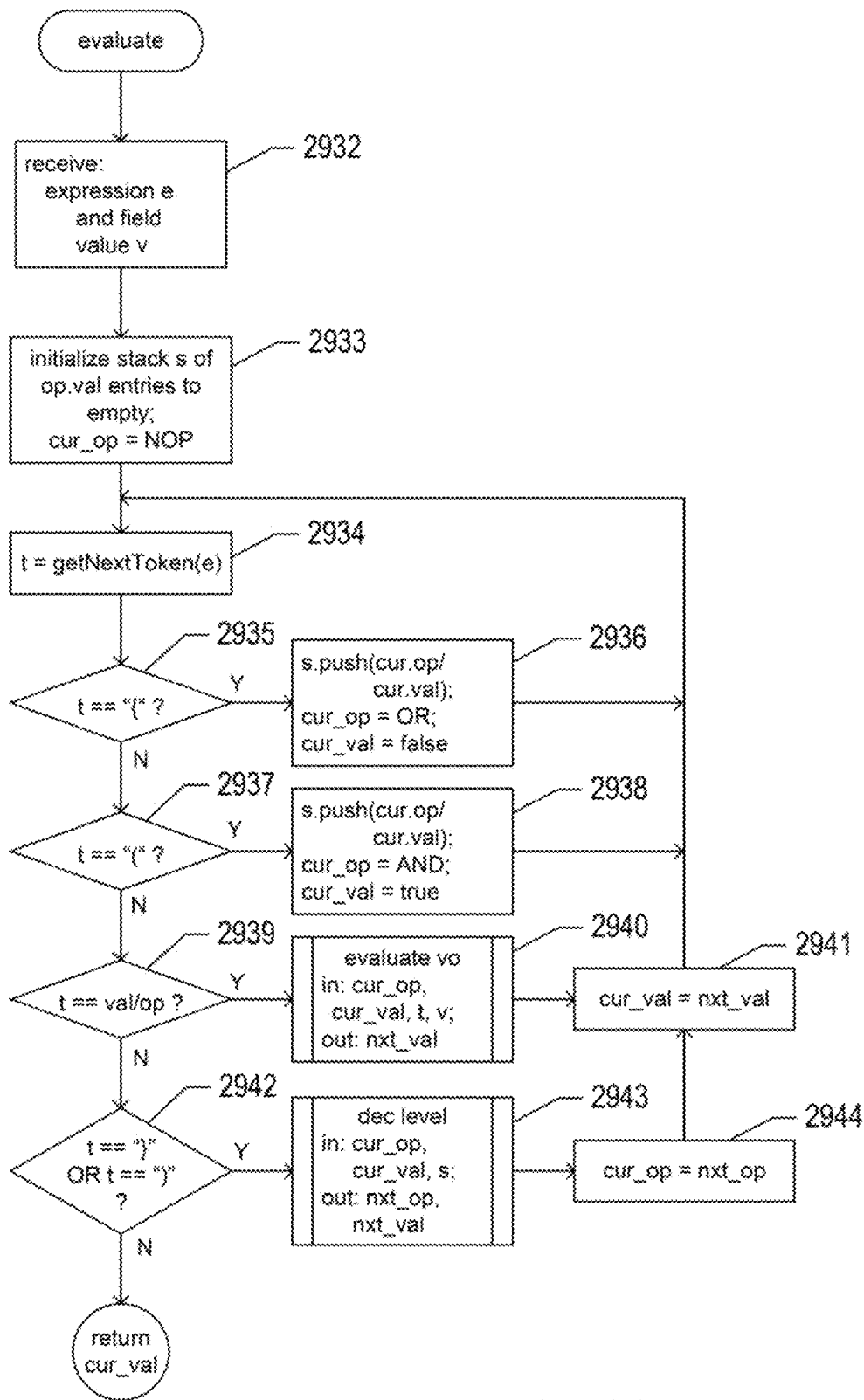

FIG. 29C provides a control-flow diagram for the routine "evaluate," called in step 2924 of FIG. 29B. In step 2932, the routine "evaluate" receives a field-value expression e and a field value v. In step 2933, the routine "evaluate" initializes a stack s for storing operator/value entries and sets the local variable cur_op to indicate no current operator. Local variables cur_op and cur_val represent the joining Boolean operand and the current value of the sub-expression of the field expression that is currently being evaluated. The stack s is used for evaluation of nested { . . . } and ( . . . ) sub-expressions in the field expression e. In step 2934, the routine "evaluate" sets local variable t to the next token parsed from field-expression e. When the next token is "1," as determined in step 2935, the operator/value pair cur_op/cur_val is pushed onto stack s, the local variable cur_op is set to OR, and the local variable cur_val is set to the Boolean value FALSE, in step 2936. Otherwise, when the next token is "C" as determined in step 2935, the operator/value pair cur_op/cur_val is pushed onto stack s, the local variable cur_op is set to AND, and the local variable cur_val is set to the Boolean value TRUE, in step 2938. Otherwise, when the next token is a value/operator pair, as determined in step 2939, the routine "evaluate" calls a routine "evaluate vo," in step 2940, to evaluate the Boolean value of the value/operator pair. The Boolean value returned by the routine "evaluate vo" is stored in the local variable cur_val, in step 2941. Otherwise, when the next token is either "}" or ")," as determined in step 2942, the routine "evaluate" calls a routine "dec level," in step 2943, to finish evaluation of a subexpression and lower the sub-expression level. Then, in step 2944, the routine "evaluate" sets the local variable cur_op to the operator returned by the routine "dec level" and, in step 2941, sets the local variable cur_val to the value returned by the routine "dec level." When the next token returned in step 2934 is not one of the tokens determined in step 2935, 2937, 2939, and 2942, the routine "evaluate" returns the contents of the local variable cur_val as the Boolean value to which the received field-value expression e evaluates.

Figure 29D:
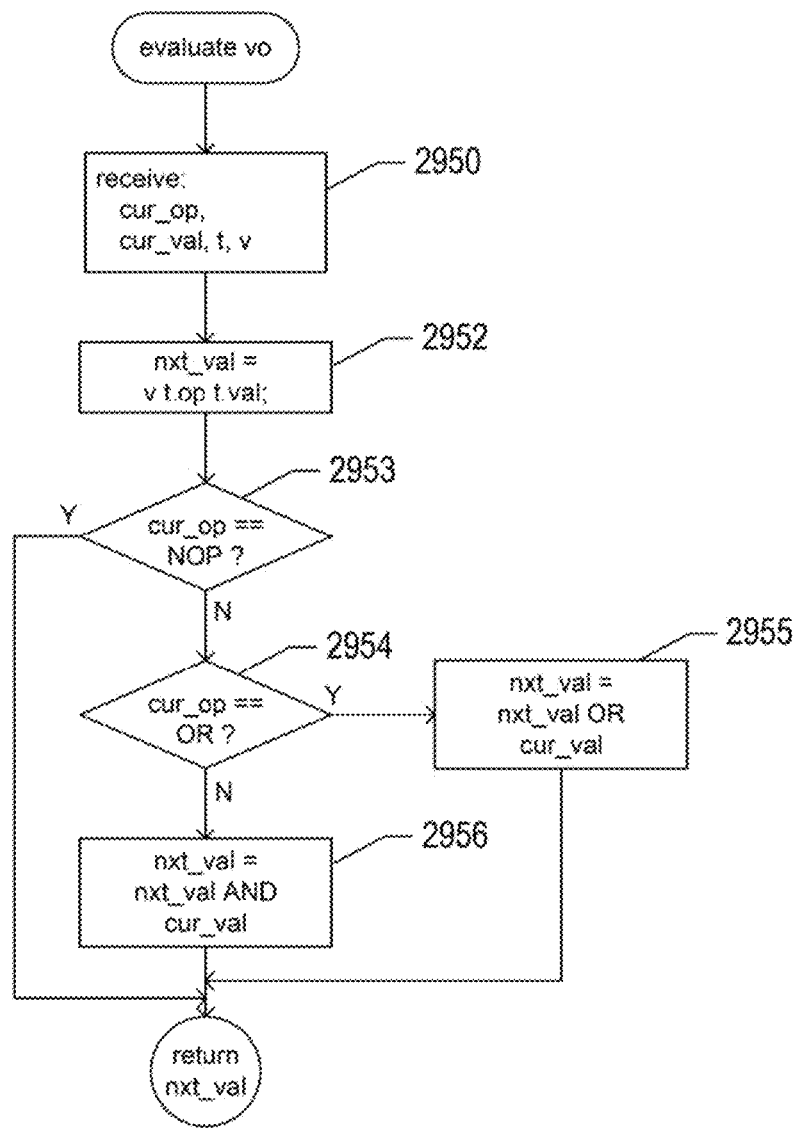

FIG. 29D provides a control-flow diagram for the routine "evaluate vo," called in step 2940 of FIG. 29C. In step 2950, the routine "evaluate vo" receives indications of a current operator and current value, cur_op and cur_val, as well as a token t and a field value v. In step 2952, the routine "evaluate vo" sets variable nxt_val to the Boolean value obtained by evaluating the binary expression comprising the received field value v, the operator portion of the received token t, t.op, and the value portion of the received token t, t.val. When the current operator is neither AND nor OR, as determined in step 2953, the routine "evaluate vo" returns the value stored in the variable nxt_val, since the field expression being evaluated by the routine "evaluate" consists of a simple value/operator pair. Otherwise, when the current operator is OR, as determined in step 2954, the routine "evaluate vo" sets nxt_val to nxt_val OR cur_val, in step 2955, and returns the Boolean value stored in nxt_val. Otherwise, in step 2956, the routine "evaluate vo" sets nxt_val to nxt_val AND cur_val, and returns the Boolean value stored in nxt_val.

Figure 29E:
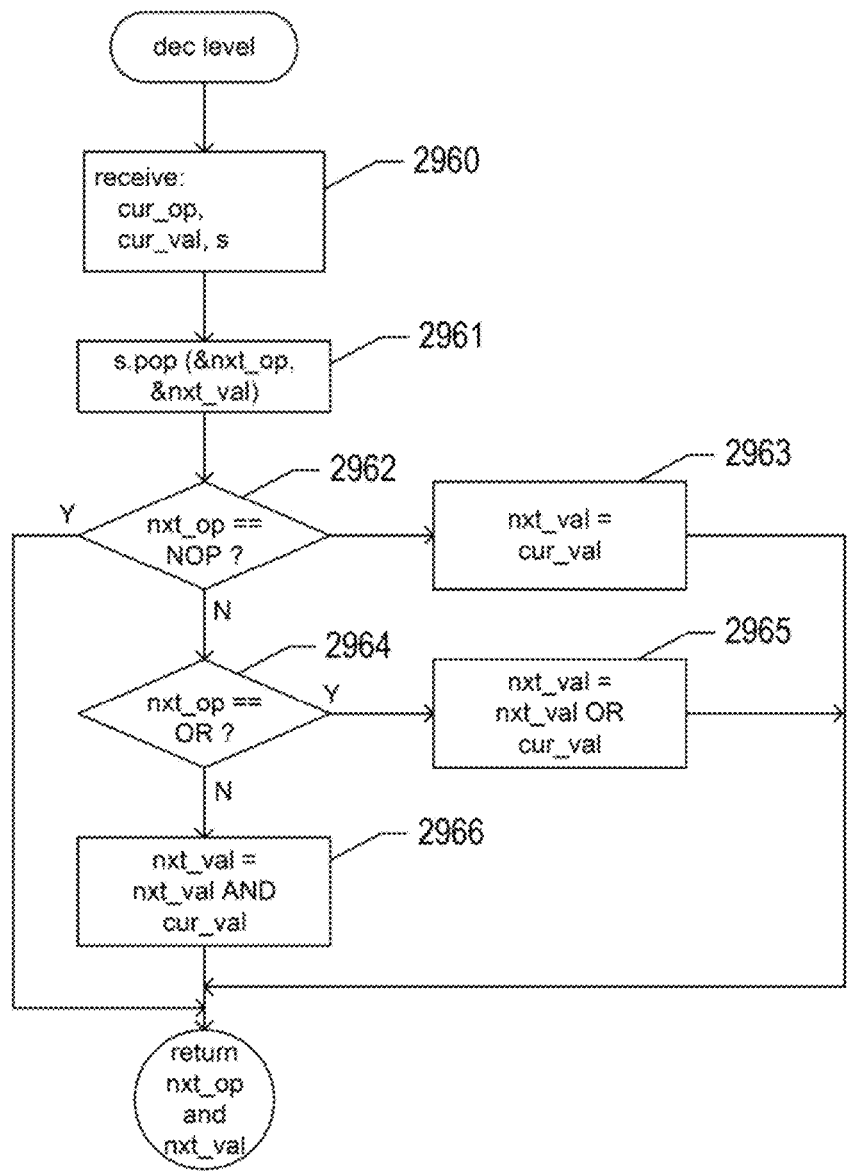

FIG. 29E provides a control-flow diagram for the routine "dec level," called in step 2943 of FIG. 29C. In step 2960, the routine "dec level" receives indications of a current operator and current value, cur_op and cur_val, as well as a reference to the stack s. In step 2961, the routine "dec level" pops an operator/value pair from the stack and places them into local variables nxt_op and nxt_val. When the current operator is neither AND nor OR, as determined in step 2962, the routine "dec level" sets nxt_val to cur_val and returns the operator and value stored in the variables nxt_op and nxt_val, since the field expression being evaluated by the routine "evaluate" has been fully evaluated. Otherwise, when the current operator is OR, as determined in step 2964, the routine "dec level" sets nxt_val to nxt_val OR cur_val, in step 2965, and returns the operator and value stored in the variables nxt_op and nxt_val. Otherwise, in step 2976, the routine "dec level" sets nxt_val to nxt_val AND cur_val, and returns the operator and value stored in the variables nxt_op and nxt_val.

The present invention has been described in terms of particular embodiments, it is not intended that the invention be limited to these embodiments. Modifications within the spirit of the invention will be apparent to those skilled in the art. For example, any of many different implementations of the log/event-message system can be obtained by varying various design and implementation parameters, including modular organization, control structures, data structures, hardware, operating system, and virtualization layers, and other such design and implementation parameters. There are various additional possible encodings of field expressions and criteria vectors, for example, and many different possible GUI approaches to allowing users or automated systems to specify constraints associated with log/event-message-processing rules. Indexes can be used to facilitate selecting message-processing rules for particular event types, to circumvent loops that compare the event type determined for a log/event message and event types in criteria vectors in the full set of message-processing rules.

What is claimed is:

1. An improved log/event-message system, within a distributed computer system, that collects log/event messages from log/event-message sources within the distributed computer system, stores the collected log/event messages, and provides query-based access to the stored log/event-messages, the log/event-message system comprising:

one or more message collectors, incorporated within one or more computer systems, each having one or more processors and one or more memories, which each
receives log/event messages,
processes the received log/event messages, and
transmits the log/event messages to one or more downstream processing components, including one or more message-ingestion-and-processing systems; and
the one or more message-ingestion-and-processing systems, incorporated within one or more computer systems, each having one or more processors and one or more memories, which each
receives log/event messages from one or more of the one or more message collectors,
processes the received log/event messages, and
transmits the log/event messages to one or more downstream processing components, including a log/event-message query system,
one or more of the one or more message collectors and the one or more message-ingestion-and-processing systems processing the received log/event messages by applying message-processing rules that contain criteria vectors to the received log/event messages.

2. The log/event-message system of claim 1 wherein log/event-message sources include:
message-generation-and-reporting components of hardware components of the distributed computer system, including network routers and bridges, network-attached storage devices, network-interface controllers, and other hardware components and devices; and
message-generation-and-reporting components within computer-instruction-implemented components of the distributed computer system, including virtualization layers, operating systems, and applications running within servers and other types of computer systems.

3. The log/event-message system of claim 1 wherein log/event-messages include text, alphanumeric values, and/or numeric values that represent various types of information, including notification of completed actions, errors, anomalous operating behaviors and conditions, various types of computational events, warnings, and other such information.

4. The log/event-message system of claim 1 wherein message-processing rules that contain criteria vectors each comprises:
a criteria portion that consists of one of
a single criteria vector, and
multiple criteria vectors;
an action portion; and
a parameter portion.

5. The log/event-message system of claim 4 wherein the criteria portion of a message-processing rule is evaluated with respect to a received log/event message to determine whether the message-processing rule is applicable to the received log/event message.

6. The log/event-message system of claim 4 wherein the action portion of a message-processing rule specifies a log/event-message-processing action carried out when the message-processing rule is applied to a log/event-message-processing action.

7. The log/event-message system of claim 4 wherein the parameter portion of a message-processing rule includes additional information needed by a message collector and/or a message-ingestion-and-processing system to carry out the log/event-message-processing action specified by the action portion of the message-processing rule.

8. The log/event-message system of claim 4 wherein a criteria vector is associated with a log/event-message type and includes a number of elements N+1, where N is the number of variable fields within log/event messages of the log/event-message type.

9. The log/event-message system of claim 8 wherein the first element of the criteria vector indicates the log/event-message type.

10. The log/event-message system of claim 8 wherein the second through $N^{th}$ elements of the criteria vector each contains either a null value or a field expression.

11. The log/event-message system of claim 10 wherein a field expression in the $n^{th}$ element of a criteria vector comprises one or more sub-expressions.

12. The log/event-message system of claim 11 wherein a sub-expression comprises one of:
a value representing a possible value of the $n^{th}$ log/message field in log/event messages of the log/event-message type associated with the criteria vector and the operator a relational-comparison operator;
a value/operator pair, the value representing a possible value of the $n^{th}$ log/message field in log/event messages of the log/event-message type associated with the criteria vector and the operator a relational-comparison operator;
a sub-expression containing two or more values, value/operator pairs, or sub-expressions logically joined by OR Boolean operators; and
a sub-expression containing two or more values, value/operator pairs, or sub-expressions logically joined by AND Boolean operators.

13. The log/event-message system of claim 4 wherein the criteria portion of a message-processing rule is evaluated with respect to a received log/event message by:
determining a log/event-message type to which the log/event message belongs;
when a criteria vector contained in the criteria portion of the message-processing rule evaluates to FALSE when evaluated with respect to the received log/event message or when no criteria vector contained in the criteria portion of the message-processing rule includes log/event-message type, determining that the message-processing rule is not applicable to the received log/event message; and
otherwise determining that the message-processing rule is applicable to the received log/event message.

14. The log/event-message system of claim 13 wherein a criteria vector is evaluated with respect to the received log/event message by:
when a field expression contained in any element of the criteria vector other than the first element of the criteria vector evaluates to FALSE with respect to the corresponding field of the received log/event message, determining that the criteria vector evaluates to FALSE with respect to the log/event message; and
otherwise determining that the criteria vector evaluates to TRUE with respect to the received log/event message.

15. The log/event-message system of claim 14 wherein a field expression evaluates to TRUE when no sub-expression within the field expression evaluates to FALSE.

16. The log/event-message system of claim 15 wherein a sub-expression within a field expression is evaluated with respect to a corresponding field of the received log/event message by:
when the sub-expression is a value representing a possible value of the corresponding field, determining that the sub-expression within the field expression evaluates to TRUE when the corresponding field of the received log/event message is equal to the sub-expression value, and otherwise determining that the sub-expression within the field expression evaluates to FALSE;

when the sub-expression is a value/operator pair, determining that the sub-expression within the field expression evaluates to TRUE when a Boolean expression constructed from corresponding field of the received log/event message followed by the operator of the value/operator pair followed by the value of the value/operator pair is TRUE, and otherwise determining that the sub-expression within the field expression evaluates to FALSE;

when the sub-expression is a sub-expression containing two or more values, value/operator pairs, or sub-expressions logically joined by OR Boolean operators, determining that the sub-expression within the field expression evaluates to TRUE when any of the two or more values, value/operator pairs, or sub-expressions evaluates to TRUE, and otherwise determining that the sub-expression within the field expression evaluates to FALSE; and when the sub-expression is a sub-expression containing two or more values, value/operator pairs, or sub-expressions logically joined by AND Boolean operators, determining that the sub-expression within the field expression evaluates to TRUE when all of the two or more values, value/operator pairs, or sub-expressions evaluates to TRUE, and otherwise determining that the sub-expression within the field expression evaluates to FALSE.

17. A method that improves a log/event-message system within a distributed computer system that collects log/event messages from log/event-message sources within the distributed computer system, stores the collected log/event messages, and provides query-based access to the stored log/event-messages, the method comprising:

processing received log/event messages, by one or more message collectors that are each incorporated within one or more computer systems having one or more processors and one or more memories and that each receives log/event messages and transmits the log/event messages to one or more downstream processing components, including one or more message-ingestion-and-processing systems, by applying message-processing rules that contain criteria vectors to the received log/event messages; and/or processing received log/event messages, by one or more of the message-ingestion-and-processing systems that are each incorporated within one or more computer systems having one or more processors and one or more memories and that each receives log/event messages and transmits the log/event messages to one or more downstream processing components, including, including a log/event-message query system, by applying message-processing rules that contain criteria vectors to the received log/event messages.

18. The method of claim 17 wherein message-processing rules that contain criteria vectors each comprises a criteria portion that consists of one of
a single criteria vector, and
multiple criteria vectors,
an action portion, and
a parameter portion;

wherein the criteria portion of a message-processing rule is evaluated with respect to a received log/event message to determine whether the message-processing rule is applicable to the received log/event message;

wherein the action portion of a message-processing rule specifies a log/event-message-processing action carried out when the message-processing rule is applied to a log/event-message-processing action; and wherein the parameter portion of a message-processing rule includes additional information needed by a message collector and/or a message-ingestion-and-processing system to carry out the log/event-message-processing action specified by the action portion of the message-processing rule.

19. The method of claim 18 wherein a criteria vector is associated with a log/event-message type and includes a number of elements N+1, where N is the number of variable fields within log/event messages of the log/event-message type;

wherein the first element of the criteria vector indicates the log/event-message type;

wherein the second through $N^{th}$ elements of the criteria vector each contains either a null value or a field expression;

wherein a field expression in the $n^{th}$ element of a criteria vector comprises one or more sub-expressions; and wherein a sub-expression comprises one of
a value representing a possible value of the $n^{th}$ log/message field in log/event messages of the log/event-message type associated with the criteria vector and the operator a relational-comparison operator, a value/operator pair, the value representing a possible value of the $n^{th}$ log/message field in log/event messages of the log/event-message type associated with the criteria vector and the operator a relational-comparison operator, a sub-expression containing two or more values, value/operator pairs, or sub-expressions logically joined by OR Boolean operators, and a sub-expression containing two or more values, value/operator pairs, or sub-expressions logically joined by AND Boolean operators, message-generation-and-reporting functionality incorporated within hardware components of the distributed computer system, including network routers and bridges, network-attached storage devices, network-interface controllers, and other hardware components and devices; and message-generation-and-reporting functionality incorporated within computer-instruction-implemented components of the distributed computer system, including virtualization layers, operating systems, and applications running within servers and other types of computer systems.

20. A physical data-storage device that stores computer instructions that, when executed by processors within computer systems of a log/event-message system within a distributed computer system, control the log/event-message system to:

process received log/event messages, by one or more message collectors that are each incorporated within one or more computer systems having one or more processors and one or more memories and that each receives log/event messages and transmits the log/event messages to one or more downstream processing components, including one or more message-ingestion-and-processing systems, by applying message-processing rules that contain criteria vectors to the received log/event messages; and/or process received log/event messages, by one or more of the message-ingestion-and-processing systems that are each incorporated within one or more computer systems having one or more processors and one or more memories and that each receives log/event messages and transmits the log/event messages to one or more downstream processing components, including, including a log/event-message query system, by applying message-processing rules that contain criteria vectors to the received log/event messages.

\* \* \* \* \*